US011902900B2

(12) United States Patent
Kim et al.

(10) Patent No.: US 11,902,900 B2
(45) Date of Patent: Feb. 13, 2024

(54) USER EQUIPMENT (UE)-BASED DISCONTINUOUS CONTROL CHANNEL MONITORING

(71) Applicant: QUALCOMM Incorporated, San Diego, CA (US)

(72) Inventors: Yuchul Kim, San Diego, CA (US); Jay Kumar Sundararajan, San Diego, CA (US); Naga Bhushan, San Diego, CA (US); Hwan Joon Kwon, San Diego, CA (US); Krishna Kiran Mukkavilli, San Diego, CA (US); Peter Pui Lok Ang, San Diego, CA (US); Yeliz Tokgoz, San Diego, CA (US); Wei Yang, San Diego, CA (US); Huilin Xu, Temecula, CA (US); Jing Lei, San Diego, CA (US); Ravi Agarwal, San Diego, CA (US); Seyedkianoush Hosseini, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 189 days.

(21) Appl. No.: 17/332,828

(22) Filed: May 27, 2021

(65) Prior Publication Data
US 2021/0377866 A1 Dec. 2, 2021

Related U.S. Application Data

(60) Provisional application No. 63/032,509, filed on May 29, 2020.

(51) Int. Cl.
*H04W 52/02* (2009.01)

(52) U.S. Cl.
CPC .................. *H04W 52/0251* (2013.01)

(58) Field of Classification Search
CPC ............... H04W 52/0251; H04W 76/28
See application file for complete search history.

(56) References Cited

U.S. PATENT DOCUMENTS

| 5,594,491 A * | 1/1997 | Hodge ............... H04Q 3/002 725/101 |
| 11,082,637 B2 * | 8/2021 | Talmor Marcovici .. G06F 3/011 |
| 2012/0297081 A1 * | 11/2012 | Karlsson ........ H04N 21/440227 709/231 |
| 2016/0261367 A1 * | 9/2016 | Lee .................. H04L 12/18 |
| 2020/0304329 A1 * | 9/2020 | Huang ............. H04N 21/2385 |

FOREIGN PATENT DOCUMENTS

EP 2890188 A1 * 7/2015 ............ H04W 52/02

\* cited by examiner

*Primary Examiner* — Keith Ferguson
(74) *Attorney, Agent, or Firm* — Shumaker & Sieffert, PA

(57) ABSTRACT

Aspects of the disclosure relate to power reduction measures that can be employed by wireless user equipment (UE) participating in an extended reality (XR) application. A wireless UE, while operating in a first power state, may receive, from an XR service provider, a plurality of packets corresponding to a video frame. The UE may reassemble and decode the received packets to reproduce the video frame. Once the UE determines it has received information sufficient to reproduce the video frame, the UE may enter a second power state, different from the first power state, for a predetermined amount of time. Other aspects, embodiments, and features are also claimed and described.

29 Claims, 15 Drawing Sheets

USER EQUIPMENT (UE)-BASED DISCONTINUOUS CONTROL CHANNEL MONITORING

PRIORITY CLAIM

This application claims priority to and the benefit of Provisional Patent Application No. 63/032,509, filed in the United States Patent and Trademark Office on May 29, 2020, the entire content of which is incorporated herein by reference as if fully set forth below in its entirety and for all applicable purposes.

TECHNICAL FIELD

The technology discussed below relates generally to wireless communication systems, and more particularly, to power-saving features of mobile devices. Some aspects may include enabling and providing communication devices and methods configured to utilize low-power states in-between the receiving of one or more video frames to help address and mitigate power consumption scenarios improving device performance and system throughput.

INTRODUCTION

Immersive "extended reality" (XR) services may include augmented reality (AR), virtual reality (VR), and/or mixed reality (MR) services. Applications that utilize XR services may include real-time sharing, multimedia streaming, online gaming, mission critical applications, and multi-party calls/conferences.

In some implementations, an XR service provider may communicate with a user of XR-enabling equipment by way of a wireless communication network. That is, some examples of XR-enabling equipment may be a user equipment (UE) in a wireless communication network. Such XR-enabling equipment may include, for example, head-mounted displays for VR, see-through glasses and camera see-through head-mounted displays for AR, MR, etc. In various examples, XR-enabling equipment may provide some degree of spatial tracking to enable a user interaction with some form of virtual content that the user views. Based on spatial tracking information that XR-enabling equipment generates, an XR application (e.g., an XR service provider, XR application software executed via corresponding circuitry, etc.) may derive a user's pose (e.g., position, orientation, motion). The XR application may then, in some instances, render a view of XR content (e.g., virtual content, etc.) based on the derived pose.

When XR services are provided through a wireless communication network, in order to provide the high desired level of quality of experience (QoE) and quality of service (QoS) for XR services, the underlying radio access network (RAN) may require a combination of a very high data rate, a very high reliability, and a very low latency.

BRIEF SUMMARY OF SOME EXAMPLES

The following presents a simplified summary of one or more aspects of the present disclosure, to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description presented later.

In some examples, wireless user equipment (UE) participating in an extended reality (XR) application may employ one or more power reduction measures by dynamically entering into a discontinuous control channel monitoring mode. A wireless UE may receive a plurality of packets (e.g., transport blocks (TBs)) corresponding to a data frame or information frame (e.g., a video frame). These packets may be spread out over time, and some of the packets may be separated from one another in time by gaps of one or more slots. The UE may reassemble and decode the received packets to generate the video frame. Once the UE determines, at an upper layer (e.g., an application layer) of the UE, that the received packets include information sufficient to reproduce (e.g., replay) the video frame, the upper layer may notify a lower layer that the received packets include the information sufficient to replay the video frame. The lower layer may then communicate with a scheduling entity, such as a base station, to coordinate the UE's entry into a low-power state (e.g., a sleep state) until a time corresponding to an expected beginning of transmission of the next video frame.

Some aspects of the disclosure provide a method of wireless communication operable at a scheduled entity (e.g., a UE). The method includes at least receiving, while operating in a first power state, a plurality of packets corresponding to a video frame of an initial state, determining the plurality of packets satisfy a predetermined frame reproduction threshold, wherein the plurality of packets include information configured to reproduce the video frame in a reproduced state, transmitting a low-power state indicator indicating an intention of the UE to enter a second power state, different from the first power state, and outputting, while operating in the second power state, the video frame in the reproduced state.

Still further aspects of the disclosure provide a method of wireless communication operable at a scheduled entity (e.g., a UE). In a more particular example, the method includes receiving, while operating in a first power state, a plurality of packets corresponding to a video frame; and when the plurality of packets comprises information sufficient to reproduce the video frame, transmitting a low-power state indicator indicating an intention of the UE to enter a low-power state. In some examples, the method may further include entering, in accordance with the low-power state indicator, the low-power state until a time corresponding to an expected beginning of transmission of a next video frame.

Still further aspects of the disclosure provide an apparatus for wireless communication. In a more particular example, the apparatus includes means for receiving, while operating in a first power state, a plurality of packets corresponding to a video frame; and means for transmitting, when the plurality of packets comprises information sufficient to reproduce the video frame, a low-power state indicator that indicates an intention of the apparatus to enter a second power state that utilizes less power relative to the first power state. In some examples, the apparatus may further include means for operating in the low-power state until a time corresponding to an expected beginning of transmission of a next video frame.

Further aspects of the disclosure provide an apparatus configured for wireless communication, including some: means for receiving, while operating in a first power state, a plurality of packets corresponding to a video frame of an initial state, means for determining the plurality of packets satisfy a predetermined frame reproduction threshold, wherein the plurality of packets include video data configured to reproduce the video frame in a reproduced state, transmitting a low-power state indicator that indicates an intention of the apparatus to enter a second state consuming less power of the UE relative to the first power state (e.g., a power-conserving/modulating state), and for operating in the second power state while outputting various content data items (e.g., a decoded video frame).

Still further aspects of the disclosure provide a non-transitory computer-readable medium storing computer-executable code for wireless communication. In a more particular example, the non-transitory computer-readable medium storing computer-executable code, includes code for causing a user equipment (UE) to: receive, while operating in a first power state, a plurality of packets corresponding to a video frame; decode the received packets to generate the video frame; and when the decoded packets comprise information sufficient to reproduce the video frame, transmit a low-power state indicator that indicates an intention of the UE to enter a low-power state. In some examples, the non-transitory computer-readable medium storing computer-executable code, may further include code for causing the UE to: wake from the low-power state at a time corresponding to when the UE expects a next video frame.

Still further aspects of the disclosure provide a non-transitory computer-readable medium storing computer-executable code, including code for causing a user equipment (UE) to, for example, receive, while operating in a first power state, a first plurality of packets corresponding to a video frame of a deconstructed state, assemble the first plurality of packets to generate the video frame in a reproduced state, transmit a low-power state indicator that indicates an intention of the UE to enter a second power state different from the first power state, and provide, while operating in the second power state, the video frame in the reproduced state. At a time corresponding to an arrival of a next video frame at the UE, the UE may, in various instances, wake from the second power state to receive a next burst of packets for additional video frames.

Further aspects of the disclosure provide an apparatus for wireless communication, including at least: a processor; a transceiver communicatively coupled to the processor; and a memory communicatively coupled to the processor. The apparatus may be variously configured to at least: receive, while operating in a first power state (e.g., a wake state, a powered or power-consuming state, etc.), a plurality of data packets (e.g., transport blocks (TBs), encoded video frame slices, etc.) corresponding to a video frame of a first state (e.g., a full video frame for providing in a video stream). The apparatus may determine whether the plurality of packets satisfy one or more picture reconstruction thresholds sufficient to indicate that plurality of packets represent video data sufficient to reproduce (e.g., replay, generate, etc.) the video frame (e.g., in its entirety or at least close thereto, such as based on a user's dynamically changing pose). The apparatus may determine this particular set of packets received over time includes a threshold amount of video data to provide the video frame in a second state.

Further, the apparatus may transmit a low-power state indicator (e.g., a notification, a request, and/or combinations thereof, etc.) to another entity. The indicator may, in various examples, signal the apparatus' intent on entering a second power state (e.g., a low-power state to consume less power relative to the first power state, a sleep state, and/or combinations thereof, etc.). In some instances, the other entity may veto or otherwise override the apparatus' intent to enter the second power. In any case, the apparatus may transmit to the other entity upon determining the apparatus possesses sufficient video frame information for the time being to provide the corresponding video stream (e.g., in an extended reality (XR) application). In some examples, the apparatus may output the video frame in the second state (e.g., a decoded state) while operating in or transitioning to the second power state (e.g., a sleep or other lower-powered state).

In various examples, the apparatus may provide the video frame in the second state to a display device, to a video encoder, to a portion of a video decoder assisting with prediction processing, to a memory device, to one or more other processors for subsequent video/audio processing, and/or to another wireless communication device. The apparatus may perform such outputting activities while operating in the second state (e.g., while discontinuously monitoring one or more serving cells for certain data transmissions, while discontinuously providing power to one or more components of its transceiver, and/or combinations thereof, etc.). In an illustrative example, the apparatus may stream corresponding video for a user to view in a continuous stream of video frames at a particular frame rate. Meanwhile, the apparatus may do so while modulating its consumption of at least some power resources by off and on monitoring certain network communication channels for video data corresponding to the ongoing video stream.

Still further aspects of the disclosure provide an apparatus for wireless communication. In a more particular example, the apparatus includes a processor, a transceiver communicatively coupled to the processor, and a memory communicatively coupled to the processor. The processor and the memory are configured to receive a plurality of packets corresponding to a video frame; and when the plurality of packets comprises information sufficient to reproduce the video frame, transmit a low-power state indicator that indicates an intention of the apparatus to enter a low-power state until a time corresponding to an expected beginning of transmission of a next video frame. In some examples, the apparatus may further include operating in the low-power state until a time corresponding to an expected beginning of transmission of a next video frame.

These and other aspects of the technology discussed herein will become more fully understood upon a review of the detailed description, which follows. Other aspects, features, and examples will become apparent to those skilled in the art upon reviewing the following description of certain examples in conjunction with the accompanying figures. While the following description may discuss various advantages and features relative to certain embodiments and figures, all embodiments can include one or more of the advantageous features discussed herein. In other words, while this description may discuss one or more examples as having certain advantageous features, one or more of such features may also be used in accordance with the various examples discussed herein. In similar fashion, while this description may discuss exemplary embodiments as device, system, or method embodiments, it should be understood that such exemplary embodiments can be implemented in various devices, systems, and methods.

DETAILED DESCRIPTION

Figure 1:
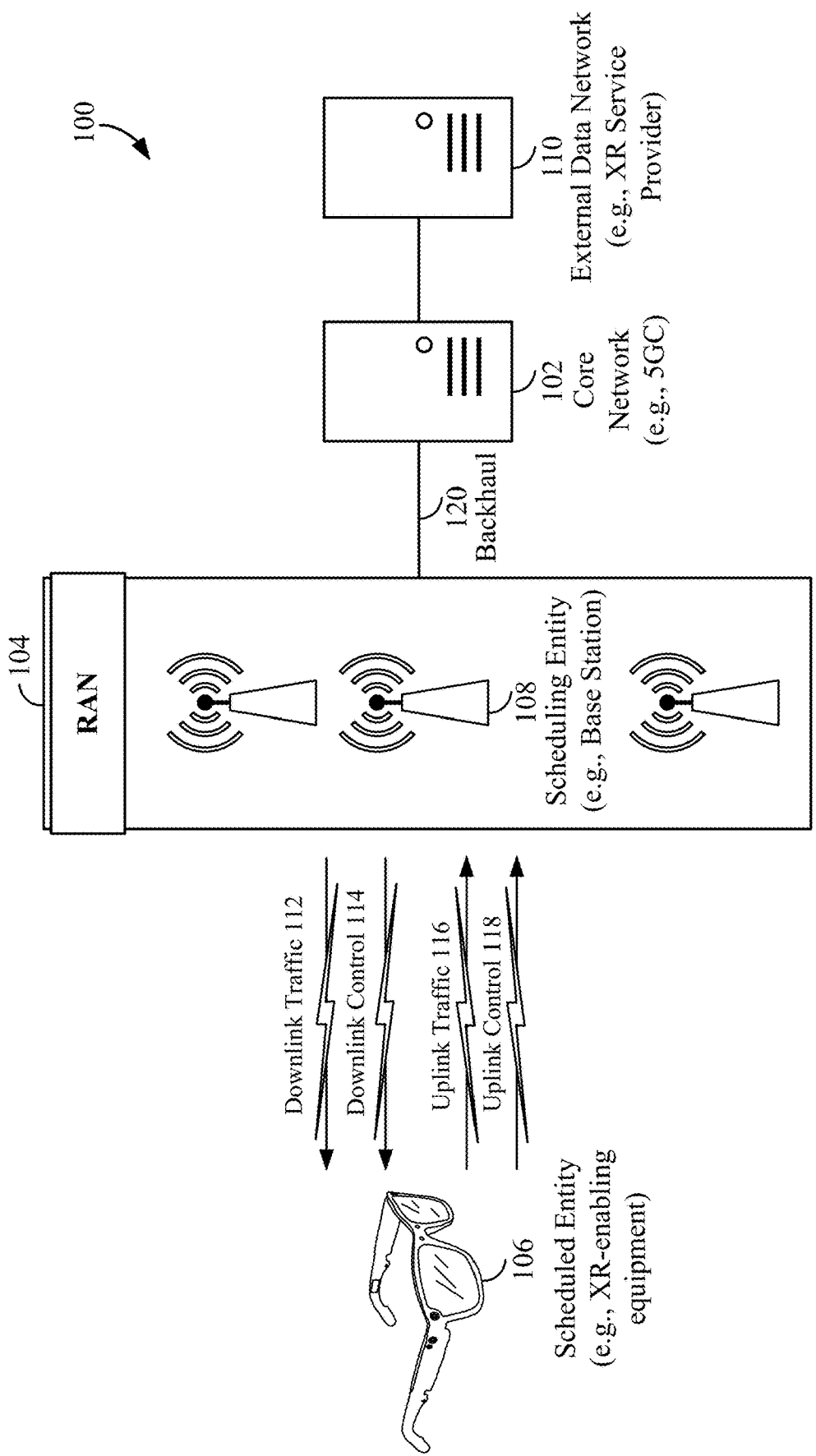
FIG. 1 is a schematic illustration of a wireless communication system according to some embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes aspects and embodiments by illustration to some examples, those skilled in the art will understand that additional implementations and use cases may come about in many different arrangements and scenarios. Innovations described herein may be implemented across many differing platform types, devices, systems, shapes, sizes, and/or packaging arrangements. In an example, embodiments and/or uses may come about via integrated chip (IC) embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may span over a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. In an example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that the disclosed technology may be practiced in a wide variety of devices, chip-level components, systems, distributed arrangements, aggregated or dis-aggregated, end-user devices, etc. of varying sizes, shapes and constitution.

One or more aspects of the present disclosure relate to immersive "extended reality" (XR) services. XR services may include one or more of augmented reality (AR), virtual reality (VR), mixed reality (MR), and/or cinematic reality/rendering (CR) services. Applications that utilize XR services may include but are not limited to real-time sharing, multimedia streaming, online gaming, mission critical applications, multi-party calls/conferences, machine learning, and/or artificial intelligence.

In some implementations, an XR service provider may communicate with a user of XR-enabling equipment by way of a wireless communication network. That is, some examples of XR-enabling equipment may be a user equipment (UE) in a wireless communication network. Such XR-enabling equipment may include e.g., head-mounted displays for VR, see-through glasses and camera see-through head-mounted displays for AR and MR. In addition, XR services may be utilized by mobile devices such as smart phones with positional tracking and a camera.

Broadly, XR-enabling equipment may be any suitable equipment that provides some degree of spatial tracking to enable a user interaction with some form of virtual content that the user views or experiences. In an illustrative example, an XR application (e.g., software executing on a device, such as a UE or external server) may first derive a user's pose, such as their position, orientation, motion, gaze, etc. In an example, the XR application may derive a user's pose based on an indication of such information from a UE. In some examples, the UE may employ spatial tracking circuitry tracking a user's pose over time to provide such pose information. The XR application may then render a view of virtual content based on the user's pose, and cause the UE to draw the view (e.g., an XR video frame) on a display according to a predetermined frame rate for a video stream. That is, the UE reproduces the XR video frame based on a set of downlink (DL) transmissions (e.g., bursts of XR content). In some examples, a UE may reproduce XR video frames in an XR video stream with substantially long periods of time between various bursts of XR content, such as between a first XR content burst, a next XR content burst, and so forth. That is, a UE may be idle for relatively long periods of time between when a UE receives various XR frames across bursts of XR content, relative to the amount of time the UE spends receiving the set of DL transmissions for any given burst.

When XR services are provided through a wireless communication network, in order to provide the high desired level of quality of experience (QoE) and quality of service (QoS) for XR services, the underlying radio access network (RAN) may require a combination of a very high data rate, a very high reliability, and a very low latency. XR traffic is very demanding on a UE. Yet, battery-powered user devices will continue to seek ways to extend their battery life by reducing power consumption. According to some aspects of this disclosure, a UE (e.g., an XR-enabling device) may be configured to exploit the pseudo-periodic, bursty traffic characteristics of XR services. As explained, such services tend to transmit with relatively long periods of time between certain transmissions that a UE may exploit for power savings. In an example, when a scheduling entity schedules one set of downlink (DL) transmissions with XR data packets for a scheduled entity (e.g., a UE) the UE schedules (or is expected to schedule) downlink (DL) data transmissions to the UE in a next XR content burst from when) and save battery power by discontinuing monitoring a downlink control channel (e.g., a physical downlink control channel (PDCCH)) in between bursts of XR content. Other aspects and examples are described in further detail below.

The disclosure that follows presents various concepts that may be implemented across a broad variety of telecommunication systems, network architectures, and communication standards. Referring now to FIG. 1, as an illustrative example without limitation, this schematic illustration shows various aspects of the present disclosure with reference to a wireless communication system 100. The wireless communication system 100 includes several interacting domains: a core network 102, a radio access network (RAN) 104, and a scheduled entity 106 (e.g., a user equipment (UE)). In the illustrated example, the scheduled entity 106 is shown as XR-enabling equipment such as glasses, although any suitable UE may be utilized. By virtue of the wireless communication system 100, the scheduled entity 106 may be enabled to carry out data communication with an external data network 110, such as (but not limited to) an extended reality (XR) service provider.

The RAN 104 may implement any suitable wireless communication technology or technologies to facilitate communication between a scheduled entity 106 and a scheduling entity 108 (e.g., by providing radio access to the scheduled entity 106). In an example, the RAN 104 may operate according to 3rd Generation Partnership Project (3GPP) New Radio (NR) specifications, often referred to as 5G or 5G NR. In some examples, the RAN 104 may operate under a hybrid of 5G NR and Evolved Universal Terrestrial Radio Access Network (eUTRAN) standards, often referred to as Long-Term Evolution (LTE). 3GPP refers to this hybrid RAN as a next-generation RAN, or NG-RAN. Of course, many other examples may be utilized within the scope of the present disclosure.

NR access may support various wireless communication services. This can include enhanced mobile broadband (eMBB) targeting wide bandwidth (e.g., 80 MHz or beyond), millimeter wave (mmW) targeting high carrier frequency (e.g., e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective QoS requirements. In addition, these services may co-exist in the same subframe.

As illustrated, the RAN 104 includes at least one scheduling entity 108, where in some examples, the scheduling entity 108 may be a base station (BS). Broadly, a BS is a network element in a RAN that provides radio transmission and reception in one or more cells to or from a scheduled entity 106 (e.g., a UE). In different technologies, standards, or contexts, those skilled in the art may variously refer to a 'base station' as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The RAN 104 supports wireless communication for multiple mobile apparatuses. Those skilled in the art may refer to a mobile apparatus as a UE, as in 3GPP specifications, but may also refer to a UE as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides access to network services. A UE may take on many forms and can include a range of devices.

Within the present document, a "mobile" apparatus (aka a UE) need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a heads-up display, an XR-enabling device (e.g., a VR device), a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or for relevant QoS for transport of critical service data.

In an example, the wireless communication system 100 may include a number of scheduling entities 108 (each individually referred to herein as a scheduling entity 108) and other network entities. A scheduling entity 108 (e.g., a base station (BS)) may provide communication coverage for a particular geographic area, sometimes referred to as a "cell," which may be stationary or may move according to the location of a mobile scheduling entity 108. In some examples, the scheduling entities 108 may be interconnected to one another and/or to one or more other scheduling entities 108 or network nodes (not shown) in the wireless communication system 100 through various types of backhaul interfaces (e.g., a direct physical connection, a wireless connection, a virtual network, or the like) using any suitable transport network. In some examples, the scheduling entity 108 may be a macro BS for macro cells. In another example, the scheduling entity 108 may be a pico BS for a pico cell, smaller than a macro cell. Further, the scheduling entity 108 may be a femto BS for a femto cell, even smaller than a pico cell. In some examples, a scheduling entity 108 may support one or multiple cells.

The scheduling entity 108 communicates with a number of scheduled entities 106 (each individually referred to herein as a scheduled entity 106) in the wireless communication system 100. The scheduled entities 106 (e.g., a first UE, a second UE, etc.) may be dispersed throughout the wireless communication system 100, and each scheduling entity 108 may be stationary or mobile. The wireless communication system 100 may also include relay stations, also referred to as relays or the like. In some examples, relay stations may be utilized to receive a transmission of data and/or other information from an upstream scheduling entity 108 and send a transmission of the data and/or other information to a downstream scheduling entity 108, to facilitate communication between devices in the wireless communication system 100. In another example, relay stations may be utilized to relay transmissions between scheduled entities 106 to facilitate communication between devices in the wireless communication system 100.

Wireless communication between the RAN 104 and a scheduled entity 106 (e.g., a UE) may be described as utilizing an air interface. Transmissions over the air interface from a scheduling entity 108 (e.g., a BS) to one or more scheduled entities 106 (e.g., one or more UEs) may be referred to as downlink (DL) transmissions. In accordance with certain aspects of the present disclosure, the term "downlink" may refer to a point-to-multipoint transmission originating at a scheduling entity 108. Another way to describe this scheme may be to use the term broadcast channel multiplexing. Transmissions from a scheduled entity 106 (e.g., a UE) to a scheduling entity 108 (e.g., a base station), on the other hand, may be referred to as uplink (UL) transmissions. In accordance with further aspects of the present disclosure, the term "uplink" may refer to a point-to-point transmission originating at a scheduled entity 106 (e.g., a UE). As illustrated in FIG. 1, a scheduling entity 108 may manage DL traffic 112 to one or more scheduled entities 106, and UL traffic 116 from one or more scheduled entities 106.

In some examples, access to the air interface may be scheduled. This can include scenarios where a scheduling entity 108 (e.g., a base station) allocates wireless resources for communication among some or all devices and equipment within its service area (e.g., a cell of the scheduling entity 108, such as a geographically-based cell). Within the present disclosure, the scheduling entity 108 may be responsible for scheduling, assigning, reconfiguring, and releasing resources for one or more scheduled entities 106. That is, for scheduled communication, scheduled entities 106 may utilize resources allocated by a scheduling entity 108. In an example, the scheduled entities 106 may include entities (e.g., UEs) scheduled for communication that are configured to utilize resources allocated by the scheduling entity 108.

It should be noted that BSs are not the only entities that may function as scheduling entities. That is, in some examples, a UE may function as a scheduling entity 108. A UE, as such, may be configured to schedule resources for one or more scheduled entities (e.g., one or more other UEs) in wireless communication system 100.

As illustrated in FIG. 1, a scheduling entity 108 may broadcast downlink (DL) traffic 112 to one or more scheduled entities 106. Broadly, the scheduling entity 108 is a node or device responsible for scheduling traffic in a wireless communication network, including the DL traffic 112 and, in some examples, uplink (UL) traffic 116 from one or more scheduled entities 106 to the scheduling entity 108. On the other hand, the scheduled entity 106 is a node or device that receives DL control information (DCI) 114, including but not limited to scheduling information (e.g., a grant), synchronization or timing information, or other control information from another entity in the wireless communication network (e.g., from a scheduling entity 108).

In general, scheduling entities 108 (e.g., base stations (BSs)) may include a backhaul interface for communication with a backhaul 120 of the wireless communication system 100. The backhaul 120 may provide a link between a scheduling entity 108 and a core network 102. Further, in some examples, a backhaul 120 may provide interconnection between multiple scheduling entities 108 (e.g., between a first BS and a second BS, etc.). Various types of interfaces for the backhaul 120 may be employed, such as a direct physical connection, a virtual network, or the like using any suitable transport network.

The core network 102 may be a part of the wireless communication system 100, and may be independent of the radio access technology (RAT) used in the RAN 104. In some examples, the core network 102 may be configured according to NR specifications (e.g., 5GC). In another example, the core network 102 may be configured according to a 4G evolved packet core (EPC), or any other suitable standard or configuration.

It should be noted that the techniques described herein may be used for various wireless networks and radio technologies. While some aspects of the present disclosure may be described using terminology commonly associated with 3G, 4G, and/or new radio (e.g., 5G NR) wireless technologies, aspects of the disclosed technology can be applied in other generation-based communication systems as would be understood by a person skilled in the art.

In general, any number of wireless networks may be deployed in a given geographic area. Each wireless network may support a particular RAT and may operate on one or more frequencies. Those skilled in the art may variously refer to a RAT as a radio technology, an air interface, etc. Those skilled in the art may further refer to a frequency as a carrier, a subcarrier, a frequency channel, a component carrier, a tone, a subband, etc. Each frequency may support a single RAT in a given geographic area in order to avoid interference between wireless networks of different RATs.

Figure 2:
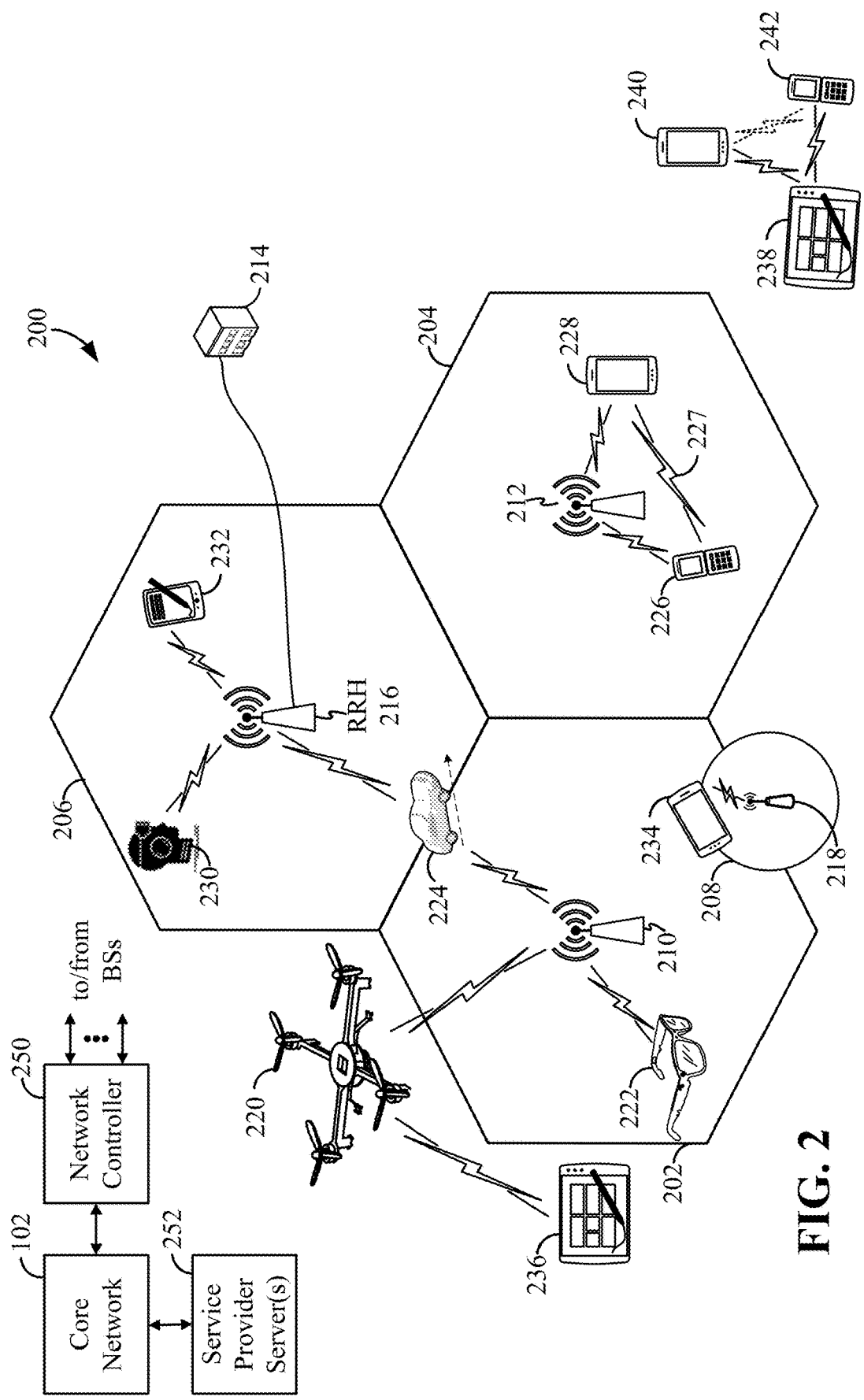
FIG. 2 is a conceptual illustration of an example of a radio access network (RAN) according to some embodiments.

FIG. 2 provides a schematic illustration of a RAN 200, by way of example and without limitation. In some examples, the RAN 200 may be the same as the RAN 104 described, for example, with reference to FIG. 1. For example, the RAN 200 may be an NR system (e.g., a 5G NR network). The RAN 200 may be in communication with a core network 102. The core network 102 may be in communication with one or more BSs 210, 212, 214, and/or 218 and/or UEs 222, 224, 226, 228, 230, 232, 234, 236, 238, 240, and/or 242 in the RAN 200 via one or more interfaces.

The geographic area covered by the RAN 200 may be divided into cellular regions (cells) that a user equipment (UE) can uniquely identify based on an identification broadcasted from an access point or scheduling entity 108 (e.g., a base station). FIG. 2 illustrates macro cells 202, 204, and 206, and a small cell 208, each of which may include one or more sectors (not shown). A sector is generally a sub-area of a cell. In some examples, a particular scheduling entity 108 may serve each sector included within a given cell. A radio link within a sector can be identified by a single logical identification belonging to that sector. In a cell that is divided into sectors, the multiple sectors within a cell can be formed by groups of antennas with each antenna responsible for communication with UEs in a portion of the cell.

FIG. 2 shows two base stations (BSs) 210 and 212 in cells 202 and 204; and shows a third base station 214 controlling a remote radio head (RRH) 216 in cell 206. That is, a base station can have an integrated antenna or can be connected to an antenna or RRH by feeder cables. In the illustrated example, the cells 202, 204, and 206 may be referred to as macro cells, as the BSs 210, 212, and 214 support cells having a large size. Further, a base station 218 is shown in the small cell 208 (e.g., a micro cell, pico cell, femto cell, home base station, home Node B, home eNode B, etc.) which may overlap with one or more macro cells. In this example, the cell 208 may be referred to as a small cell, as the base station 218 supports a cell having a relatively small size. Cell sizing can be done according to system design as well as component constraints.

The RAN 200 may include any number of wireless BSs and cells. Further, a RAN may include a relay node to extend the size or coverage area of a given cell. The BSs 210, 212, 214, 218 provide wireless access points to a core network 102 for any number of mobile apparatuses. In some examples, the BSs 210, 212, 214, and/or 218 may correspond to one or more of the scheduling entities 108 described, for example, with reference to FIG. 1.

FIG. 2 further includes a quadcopter or drone 220, which may be configured to function as a scheduling entity 108 (e.g., a BS). That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point (AP) to a core network 102 (e.g., a network controller 250) for the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described, for example, with reference to FIG. 1.

In some examples, a mobile network node (e.g., a quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer-to-peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), P2P, or vehicle-to-vehicle (V2V) network, and/or in a mesh network. In a mesh network, for example, UEs 240 and 242 may communicate directly with one another and/or may communicate with the scheduling entity 238. Thus, in a wireless communication system 100 with scheduled access to time-frequency resources and having a cellular configuration, a P2P configuration, or a mesh configuration, a scheduling entity and one or more scheduled entities may communicate utilizing the scheduled resources. As will be understood by a person of ordinary skill in the art, the scheduled entities 106 illustrated in FIG. 2 (e.g., UEs 240, 242, etc.) may include XR-enabled equipment. In an example, UE 240 may be an XR-enabling, as well as any of the other scheduled entities 106, for example, illustrated in FIG. 2. In any case, a scheduled entity 106 may be XR-enabling devices configured for carrying out one or more of the various techniques of this disclosure.

The air interface in the radio access network (RAN) 200 may utilize one or more multiplexing and multiple access algorithms to enable simultaneous communication of the various devices. For example, 5G NR specifications provide multiple access for UL transmissions from UEs 222 and 224 to a base station (BS) 210, and for multiplexing for DL transmissions from a BS 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to such schemes. For example, a UE may provide for UL multiple access utilizing time division multiple access (TDMA), time division synchronous code division multiple access (TD-SCDMA), code division multiple access (CDMA), frequency division multiple access (FDMA), sparse code multiple access (SCMA), resource spread multiple access (RSMA), or other suitable multiple access schemes. Further, a BS may multiplex DL transmissions to UEs utilizing time division multiplexing (TDM), code division multiplexing (CDM), frequency division multiplexing (FDM), OFDM, sparse code multiplexing (SCM), or other suitable multiplexing schemes.

In some examples, a network controller 250 may be in communication with a set of BSs 210, 212, 214, and/or 218 and provide coordination and control for these BSs 210 (e.g., via backhaul 120). In certain aspects, the network controller 250 may be in communication with a core network 102, such as a 5G Core Network (5GC), which may provide various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

As described with reference to FIG. 1, the core network 102 may interface with one or more extended reality (XR) service provider server(s) 252 (e.g., an application server) that operate to render and/or provide XR data for a user. The XR service provider server(s) 252 may be one or more servers of an external data network 110 (e.g., servers to support an XR service provider). The BSs and/or the UEs of RAN 200 may interface with the one or more XR service provider server(s) 252 to facilitate the communication of XR data to and/or from a given UE operating in the RAN 200.

In some examples, the scheduled entity 106 (e.g., a UE) may receive, from a scheduling entity 108 (e.g., a BS), a burst of DL packet transmissions (e.g., an XR video frame). Upon receiving a particular amount of information from the scheduling entity 108 in a burst of DL packet transmissions, the scheduled entity 106 may communicate with the scheduling entity 108 (e.g., via an air interface in the RAN 200) that the scheduled entity 106 intends on entering its low-power state. In a low-power state, the scheduled entity 106 seeks to conserve power resources before a next burst of DL packet transmissions. Otherwise, the scheduled entity 106 may unnecessarily waste power resources prematurely monitoring for a next burst of DL packet transmissions (e.g., before the scheduled entity 106 may have reasonably expected to receive that next burst from the scheduling entity 108).

In some examples, the scheduled entity 106 may provide the scheduling entity 108 with an option to permit the scheduled entity 106 to enter the low-power state (or alternatively to disallow the scheduled entity 106 from entering the low-power state). In such examples, the scheduled entity 106 may fortuitously delay entering the low-power state until a time that the scheduled entity 106 receives such permission from the scheduling entity 108 permitting the scheduled entity 106 to, upon receiving the permission grant from the scheduling entity 108, initiate the low-power state. In either case, when in the low-power state, the scheduling entity 108 may forgo transmitting additional packets to the scheduled entity 106 until such a time that the scheduled entity 106 and the scheduling entity 108 determine for exchanging the next burst of DL packet transmissions (e.g., an XR content burst).

Figure 3:
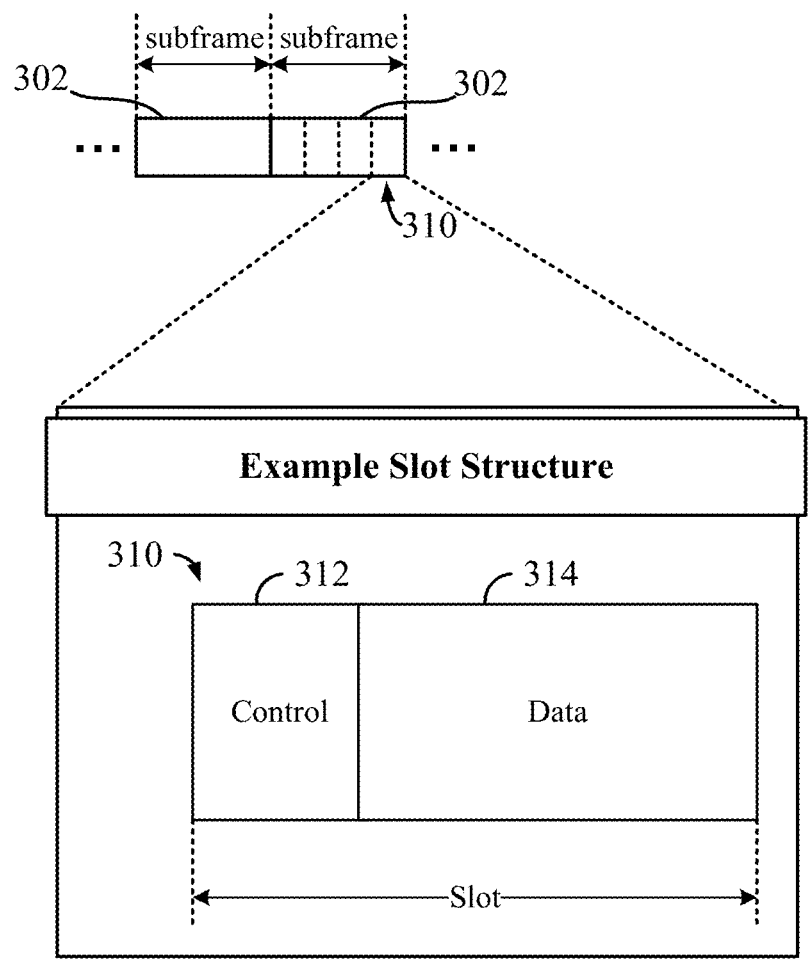
FIG. 3 is a schematic illustration of an example wireless carrier time-divided into subframes and slots according to some embodiments.

FIG. 3 is a schematic illustration of a portion of an example communication frame in a wireless communication network. Here, when making reference to a time-division of a wireless carrier, a communication frame may refer to a predetermined duration of time (e.g., 10 ms) for wireless transmissions. And further, each communication frame may consist of a set of communication subframes (e.g., 10 subframes of 1 ms each). In some examples, a given wireless carrier may include one set of communication frames in the uplink (UL), and another set of communication frames in the downlink (DL). As those skilled in the art will readily appreciate, the transmission structure for any particular application may vary from the example described here, depending on any number of factors.

Subframes may have a variety of features that may be configurable. In some examples, subframes may have a fixed duration or length or configurable duration or length. In some examples, a subframe can be 1 millisecond (ms). In some scenarios, each 1 ms subframe 302 may consist of one or multiple adjacent slots (e.g., a series of consecutive slots). In FIG. 3, one subframe 302 includes four slots 310, as an illustrative example. In some examples, a slot may be defined according to a specified number of orthogonal frequency division multiplexing (OFDM) symbols with a given cyclic prefix (CP) length. For example, a slot may include 7 or 14 OFDM symbols with a nominal CP. Additional examples may include mini-slots having a shorter duration (e.g., one or two OFDM symbols). A scheduling entity 108 may, in some cases, transmit these mini-slots occupying resources scheduled for ongoing slot transmissions for the same or for different scheduled entities 106.

Those of ordinary skill in the art should understand that the various aspects of the present disclosure may be applied to a discrete Fourier transform-spread-OFDM (DFT-s-OFDMA) waveform in substantially the same way as described herein. That is, while some examples of the present disclosure may focus on an OFDM link for clarity, the present disclosure is not so limited, and a person of ordinary skill in the art will understood that one or more of the various techniques of this disclosure may also be applied to DFT-s-OFDMA waveforms, or other waveforms, for example.

An expanded view of one of the slots 310 illustrates the slot 310 including a control region 312 and a data region 314. In general, the control region 312 may carry control channels (e.g., PDCCH), and the data region 314 may carry data channels (e.g., a physical downlink shared channel (PDSCH) and/or a physical uplink shared channel (PUSCH)). Some examples may additionally or alternatively include a UL control region (e.g., control region 312) for carrying a UL control channel (e.g., a physical uplink control channel (PUCCH)). Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not explicitly illustrated in FIG. 3, the resources within a slot 310 may be scheduled to carry one or more physical channels, including control channels, shared channels, data channels, etc. Other resources may also carry pilots or reference signals (RSs). These pilots or RSs may provide for a receiving device (e.g., a scheduled entity 106, etc.) to perform channel estimation of the corresponding channel, which, in some examples, may enable coherent demodulation/detection of the control and/or data channels, for example.

In a downlink (DL) transmission, the transmitting device (e.g., a scheduling entity 108) may allocate one or more resource elements (REs) (e.g., within a control region 312) of a given slot 310 to carry DL control information (DCI) 114 (e.g., via one or more DL control channels). In an example, DL control channels may include DCI 114 that generally carries information originating from certain layers, such as a physical broadcast channel (PBCH), a physical downlink control channel (PDCCH), etc., to one or more scheduled entities 106. The PDCCH may carry downlink control information (DCI) 114 for one or more UEs in a cell. This can include, but is not limited to, power control commands, scheduling information, a grant, and/or an assignment of REs for DL and/or UL transmissions.

Further, the scheduling entity 108 may allocate a portion of a slot's resources (e.g., one or more DL REs) to carry DL physical signals that generally do not carry information originating from certain layers (e.g., PBCH, PDCCH, etc.).

These DL physical signals may include a primary synchronization signal (PSS), a secondary synchronization signal (SSS), demodulation reference signals (DM-RSs), phase-tracking reference signals (PT-RSs), channel state information (CSI) reference signals (CSI-RSs), etc. In such examples, DL resources may be allocated to carry such DL physical signals.

A scheduling entity 108 may transmit the synchronization signals (e.g., a PSS and an SSS, collectively referred to as SSs), and in some examples, the PBCH, in an SS block that includes four consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. It should be noted that while the present disclosure, at times, may refer to one or more specific SS block configurations as illustrative examples, the present disclosure is not so limited, and a person of ordinary skill in the art will understand that other example configuration may also apply according to one or more of the various techniques disclosed herein. To illustrate, additional, or alternative, examples may utilize greater or fewer than two synchronization signals, may include one or more supplemental channels in addition to the PBCH, may omit a PBCH, and/or may utilize nonconsecutive symbols for an SS block, to name but a few examples.

In an uplink (UL) transmission, a scheduling entity 108 may allocate a portion of a slot's resources for a transmitting device (e.g., UE or a scheduled entity 106) to carry UL control information 118 (UCI). In an example, the transmitting device may utilize one or more REs to carry one or more UL control channels, such as a physical uplink control channel (PUCCH), a physical random access channel (PRACH), etc., to the scheduling entity 108. Such UL control channels may include UCI 118, for example. Further, UL REs may carry UL physical signals that generally do not carry information originating from higher layers, such as demodulation reference signals (DM-RSs), phase-tracking reference signals (PT-RSs), sounding reference signals (SRSs), etc. In some examples, the UCI 118 may include a scheduling request (SR) (e.g., a request for the scheduling entity 108 to schedule UL transmissions). In such examples, the scheduling entity 108 may, in response to receiving the SR transmitted on the control channel, transmit DCI 114 that may schedule resources for UL packet transmissions.

The UL control information (UCI) 118 may also include hybrid automatic repeat request (HARQ) feedback such as an acknowledgment (ACK) or negative acknowledgment (NACK), channel state information (CSI), or any other suitable UCI. HARQ is a technique well-known to those in the art, wherein a receiving device may check the integrity of packet transmissions at the receiving side for accuracy, e.g., utilizing any suitable integrity checking mechanism, such as a checksum or a cyclic redundancy check (CRC). If the receiving device (e.g., a scheduled entity 106) confirms the integrity of the DL transmission, the receiving device may transmit an ACK to the transmitting device (e.g., a scheduling entity 108). If the receiving device is unable to confirm the integrity of the DL transmission, the receiving device may transmit a NACK to the transmitting device. In response to a NACK, the transmitting device may send a HARQ retransmission, which may implement chase combining, incremental redundancy, etc.

In addition to control information, a scheduling entity 108 may allocate a portion of a slot's resources (e.g., within the data region 314) for user data or traffic data (e.g., extended reality (XR) data). One or more traffic channels may carry such traffic (e.g., XR traffic). In such examples, the one or more traffic channels may include, in various circumstances, a PDSCH transmission for DL communication (e.g., DL traffic 112), a PUSCH transmission for UL communication (e.g., UL traffic 116), etc.

For a scheduled entity 106 to gain initial access to a cell, the RAN may provide system information (SI) characterizing the cell. The RAN may provide this SI utilizing minimum system information (MSI), and other system information (OSI). The RAN may periodically broadcast the MSI over the cell to provide the most basic information a scheduled entity 106 requires for initial cell access, and for enabling a scheduled entity 106 to acquire any OSI that the RAN may broadcast periodically or send on-demand. In some examples, a network may provide MSI over two different DL channels. For example, the PBCH may carry a master information block (MIB), and the PDSCH may carry an SI block type 1 (SIB1). In some examples, SIB1 may define the scheduling of other SIBs (e.g., OSI) and may contain information allowing a scheduled entity 106 to gain initial access to a cell. Here, the MIB may provide a UE with parameters for monitoring a control resource set. The control resource set may thereby provide the UE with scheduling information corresponding to the PDSCH, e.g., a resource location of SIB1. Those skilled in the art variously refer to SIB1 as remaining minimum system information (RMSI).

In some examples, OSI may include any SI that is not broadcast in the MSI. In some examples, the PDSCH may carry a plurality of SIBs, not limited to SIB1. Here, the RAN may provide the OSI in these SIBs, e.g., SIB2 and above.

The channels or carriers described with reference to FIGS. 1 and 3 are not necessarily all the channels or carriers that may be utilized between a scheduling entity 108 and scheduled entities 106. Those of ordinary skill in the art will recognize that other channels or carriers may be utilized in addition to those illustrated, such as other traffic, control, and feedback channels.

In some examples, a physical (PHY) layer may generally multiplex and map physical channels (e.g., those physical channels described above) to transport channels for handling at a medium access control (MAC) layer entity. Transport channels carry blocks of information called transport blocks (TBs). The size of a transport block (TB), which may correspond to a number of bits of information, may be a controlled parameter, based on the modulation and coding scheme (MCS) and the number of RBs in, or the bandwidth of, a given transmission.

In some aspects, the present disclosure provides apparatus, methods, processing systems, and computer-readable media for a scheduled entity 106 to determine to enter a low-power state in-between bursts of XR content received from a scheduling entity 108 over an air interface for power savings. The present disclosure provides a multitude of examples and processes, for example, describing how a scheduled entity 106 may providing a low-power state indicator to the scheduling entity 108 communicating an intention to enter the low-power state for a particular amount of time until a next expected burst of XR content. Although described with reference to different figures, in some instances, a scheduled entity 106 may employ one or combinations of such processes to facilitate communication of an intent indication to enter the low-power state. Further aspects of the present disclosure provide apparatus, methods, processing systems, and computer-readable media for a scheduling entity 108 disallowing the scheduled entity 106 from entering the low-power state at that time, in some instances, despite the scheduled entity 106 informing the scheduling entity 108 of its calculated intentions to enter the low-power state for the time between XR content bursts.

Scheduling Entity

Figure 4:
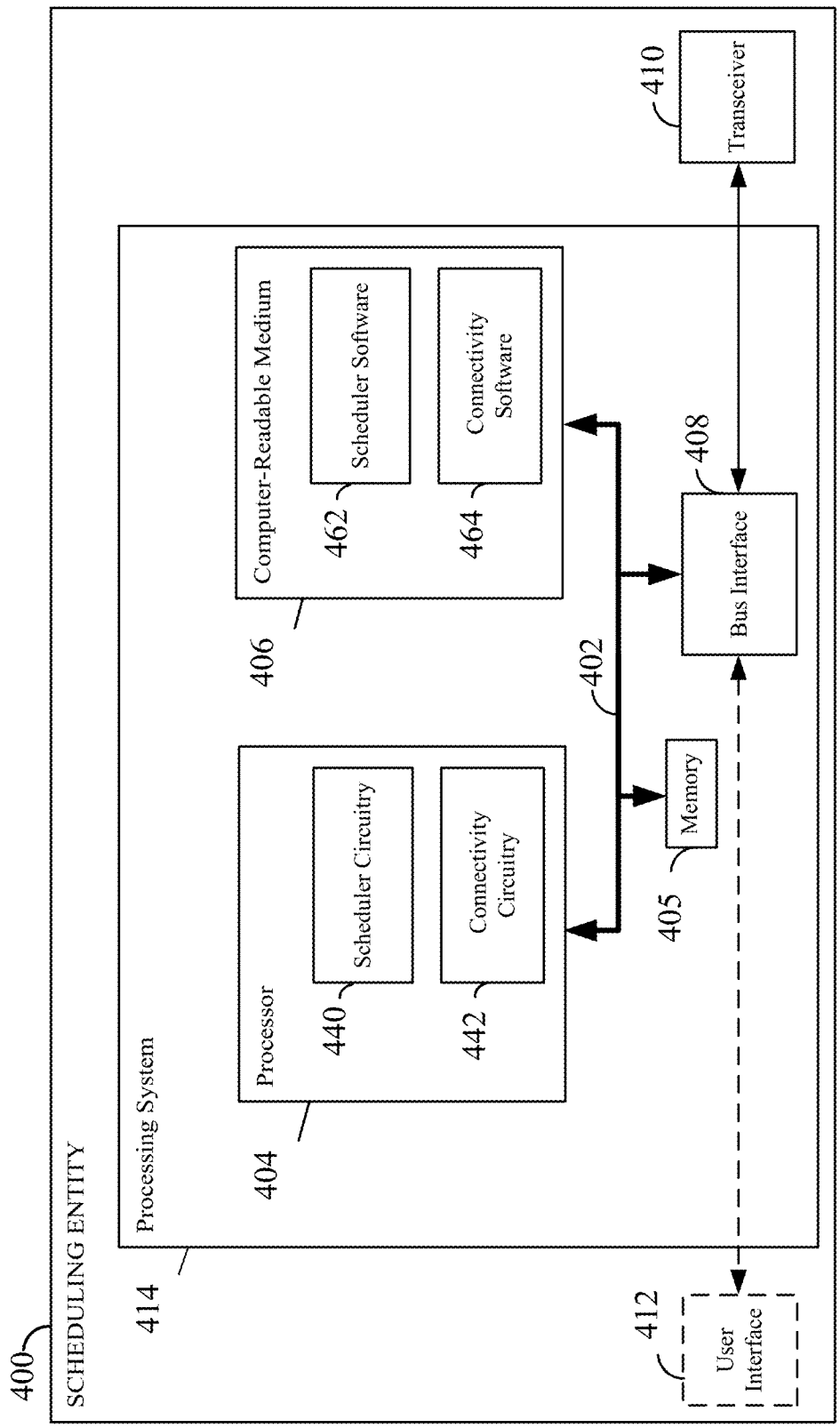
FIG. 4 is a block diagram conceptually illustrating an example of a hardware implementation for a scheduling entity according to some aspects of the disclosure.

FIG. 4 is a block diagram conceptually illustrating an example of a hardware implementation for a scheduling entity 400 employing a processing system 414. The scheduling entity 400 may represent an example of the scheduling entity 108 (e.g., a base station (BS), or a user equipment (UE) in some instances) as illustrated and described with reference to any one or more of FIGS. 1 and/or 2, for example.

The scheduling entity 400 includes a processing system 414 having one or more processors 404. Examples of processors 404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 400 may be configured to perform any one or more of the functions described herein. That is, the processor 404, as utilized in a scheduling entity 400, may be configured (e.g., in coordination with the memory 405 and the transceiver 410) to implement any one or more of the processes and procedures described herein and illustrated in FIGS. 6-15.

The processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a communication interface or means for communicating with various other apparatus over a transmission medium. Depending upon the nature of the apparatus, a user interface 412 (e.g., keypad, display, speaker, microphone, joystick) may also be provided. Of course, such a user interface 412 is optional, and some examples, such as a BS, may omit it.

In some aspects of the disclosure, the processor 404 may include scheduler circuitry 440 configured (e.g., in coordination with the memory 405 and the transceiver 410) for various functions, including, for example, allocating, scheduling, and/or granting resources for wireless communication within a corresponding service area (e.g., a corresponding cell). In an example, the scheduler circuitry 440 may be configured to process a low-power state notification received from a UE, the low-power state notification effectively notifying the scheduling entity 400 that the UE is entering a low-power state. Responsive to the low-power (LP) state notification, the scheduler circuitry 440 may be configured to then cause the scheduling entity 400 to discontinue transmitting downlink (DL) data (e.g., extended reality (XR) content) to the UE for a predetermined period of time, during which the UE is set to conserve power in its low-power state.

In another example, the scheduler circuitry 440 may be configured to process a low-power state request received from a UE. In such examples, the LP state request effectively requests that the scheduling entity 400 provide to the UE, in return, an LP state grant indicator permitting the UE to enter a low-power state for a predetermined period of time. The predetermined period of time, marking a particular instance of a UE in its low-power state, may be configured to end after the expiration of a frame generation periodicity (FGP) timer, a discontinuous reception (DRX) timer, or in some instances, may end when both timers have expired, depending on the particular implementation. In any case, the scheduler circuitry 440 may be configured to determine to provide the low-power state grant indicator to the UE in response to the UE's request, and as such, may cause the scheduling entity 400 to transmit the low-power state grant indicator to the UE (e.g., via its transceiver 410). Accordingly, the scheduler circuitry 440 may cause the scheduling entity 400 to discontinue transmitting DL data to the UE, at least for a period of time in which the scheduling entity 400 determines the UE may be remaining in its low-power state upon receiving and processing the low-power state grant indicator received from the scheduling entity 400. In some instances, the scheduler circuitry 440 may then cause the scheduling entity 400 to begin transmitting DL data to the UE in a next XR content burst upon expiration of one or more timers, and to comply with particular transmission delay parameters, in some examples, as well. The expiration of the one or more timers at the scheduling entity 400 may effectively correspond to the parameters of an FGP timer, and/or a DRX timer, configured for the UE to determine when to wake up from its low-power state.

The processor 404 may further include connectivity circuitry 442 configured (e.g., in coordination with the memory 405 and the transceiver 410) for various functions, including, for example, receiving packets corresponding to data frames, information frames, and/or video frames from an XR service provider (e.g., across a core network 102), and providing corresponding frame information to a UE over a wireless air interface.

The processor 404 is responsible for managing the bus 402 and general processing, including the execution of software stored on the computer-readable medium 406. The software, when executed by the processor 404, causes the processing system 414 to perform the various functions described herein for any particular apparatus. The processor 404 may also use the computer-readable medium 406 and the memory 405 for storing data that the processor 404 manipulates when executing software.

One or more processors 404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 406 may include scheduler software 462 configured for various functions, including, for example, allocating, scheduling, and/or granting resources for wireless communication within a corresponding cell. In some aspects, the computer-readable storage medium 406 may further include connectivity software 464 configured for various functions, including, for example, receiving packets corresponding to data frames, information frames, and/or video frames from an external data network 110 (e.g., an XR service provider), and providing corresponding frame information to a UE over a wireless air interface.

Scheduled Entity

Figure 5:
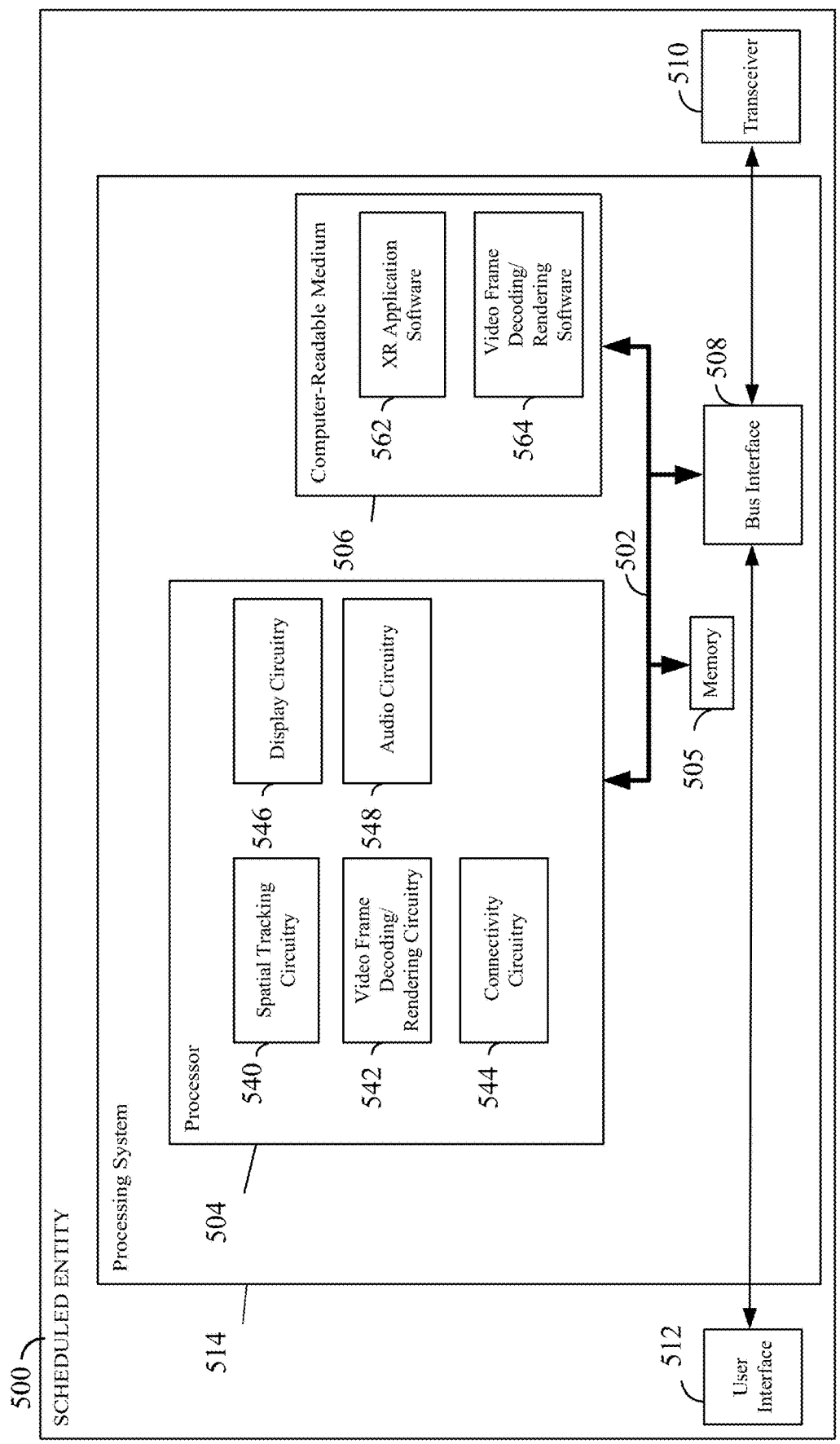
FIG. 5 is a block diagram conceptually illustrating an example of a hardware implementation for a wireless user equipment (UE) according to some embodiments.

FIG. 5 is a block diagram conceptually illustrating an example of a hardware implementation for an exemplary scheduled entity 500 employing a processing system 514. In accordance with various aspects of the disclosure, the processing system 514 may include an element, or any portion of an element, or any combination of elements having one or more processors 504. The scheduled entity 500 may represent an example of the scheduled entity 106 (e.g., an extended reality (XR)-enabling device or other user equipment (UE)) as described with reference to any one or more of FIGS. 1 and/or 2, for example.

The processing system 514 may be substantially the same as the processing system 414 illustrated in FIG. 4, including a bus interface 508, a bus 502, memory 505, a processor 504, and a computer-readable medium 506. Furthermore, the scheduled entity 500 may include a user interface 512 and a transceiver 510 substantially similar to those described with reference to FIG. 4. That is, the processor 504, as utilized in a scheduled entity 500, may be used to implement any one or more of the processes described below and illustrated in FIGS. 9, 10, 11, and/or 12.

In some aspects of the disclosure, the processor 504 may include spatial tracking circuitry 540 configured for various functions, including, for example, determining and communicating information relating to a pose of a user. For example, the spatial tracking circuitry 540 may include or be coupled to one or more sensors and/or cameras (e.g., included in or coupled to the user interface 512). In some aspects, the processor 504 may further include video frame decoding/rendering circuitry 542 configured for various functions, including, for example, reproducing XR video frames received via transceiver 510. In an example, the video frame decoding/rendering circuitry 542 may be configured for reassembling segmented packets, decoding encoded video frames (e.g., slices), rendering video frames of a video stream, and/or drawing or replaying a video frame on a display device or screen (e.g., included in or coupled to the user interface 512). In some examples, the video frame decoding/rendering circuitry 542 may be configured to implement one or more of the functions described below in relation to FIGS. 7, 8, 10 and/or 12 (e.g., block 1014 of FIG. 10 and/or block 1212 of FIG. 12 as examples).

In some aspects, the processor 504 may further include connectivity circuitry 544 configured for various functions, including, for example, communicating with an XR service provider via a wireless network, such as a radio access network (RAN) (e.g., RAN 104/200). For example, the connectivity circuitry 544 may be configured to implement one or more of the functions described below in relation to FIGS. 10 and/or 12, e.g., blocks 1008, 1012, 1018, 1020, 1206, 1210, 1216, 1218, and/or 1220. In an example, the connectivity circuitry 544 may be configured to cause the scheduled entity 500 to transmit a low-power (LP) state indicator (e.g., an LP state notification, an LP state request) to a scheduling entity (e.g., using transceiver 510). In another example, additionally or alternatively, the connectivity circuitry 544 may be configured to cause the scheduled entity 500 to transition from one power state (e.g., an initial power state) to another power state (e.g., a low-power state). In an example, the connectivity circuitry 544 may cause the scheduled entity 500 to de-power one or more power amplifiers of the transceiver 510. In an illustrative example, the connectivity circuitry 544 may cause the scheduled entity 500 to actuate one or more switches that control (e.g., meter) power flow to a set of one or more power amplifiers of the transceiver 510. In some aspects, the processor 504 may further include display circuitry 546 configured for various functions, including, for example, displaying video frames of a video stream (e.g., via user interface 512). In some aspects, the processor 504 may further include audio circuitry 546 configured for various functions, including, for example, playing audio corresponding to video frames of a video stream.

Figure 9:
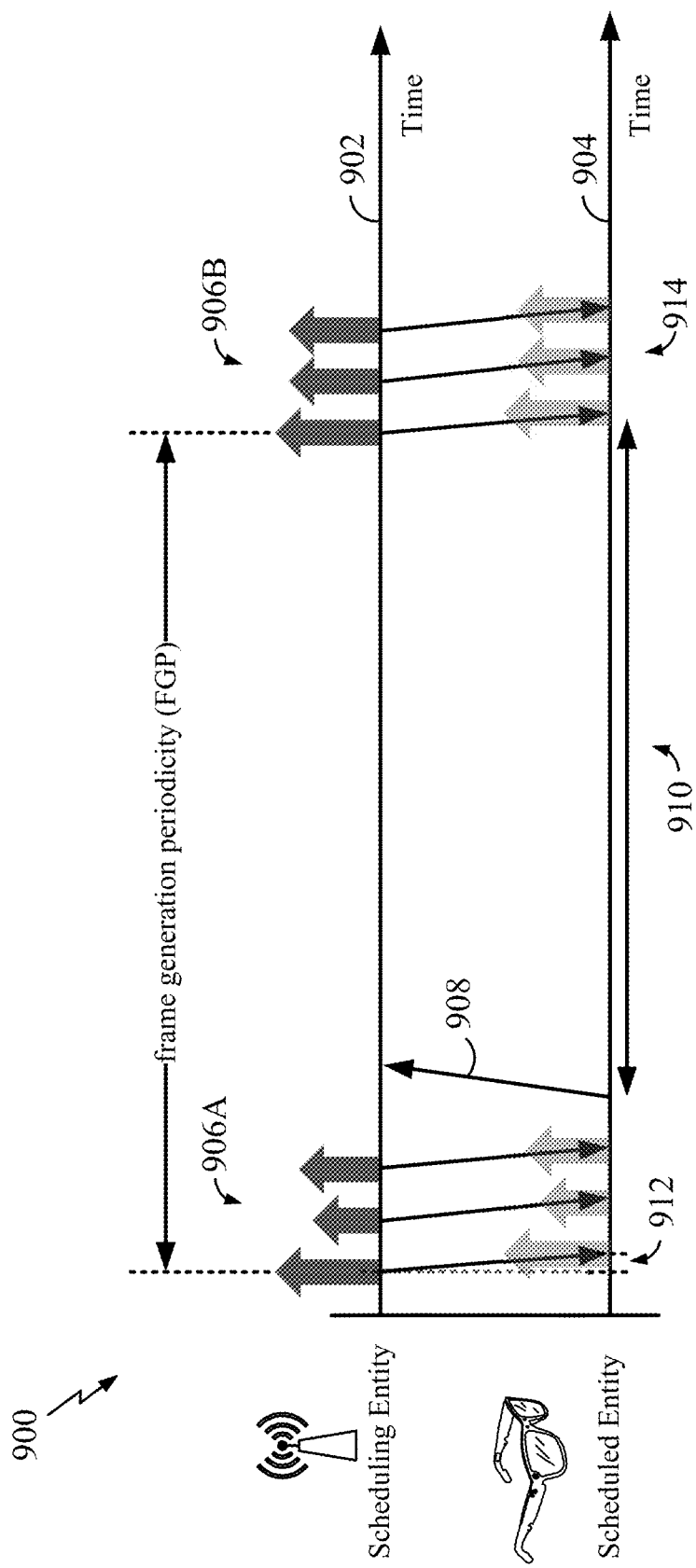
FIG. 9 is a timeline showing an example of a UE-based discontinuous control channel monitoring technique according to some embodiments.
Figure 10:
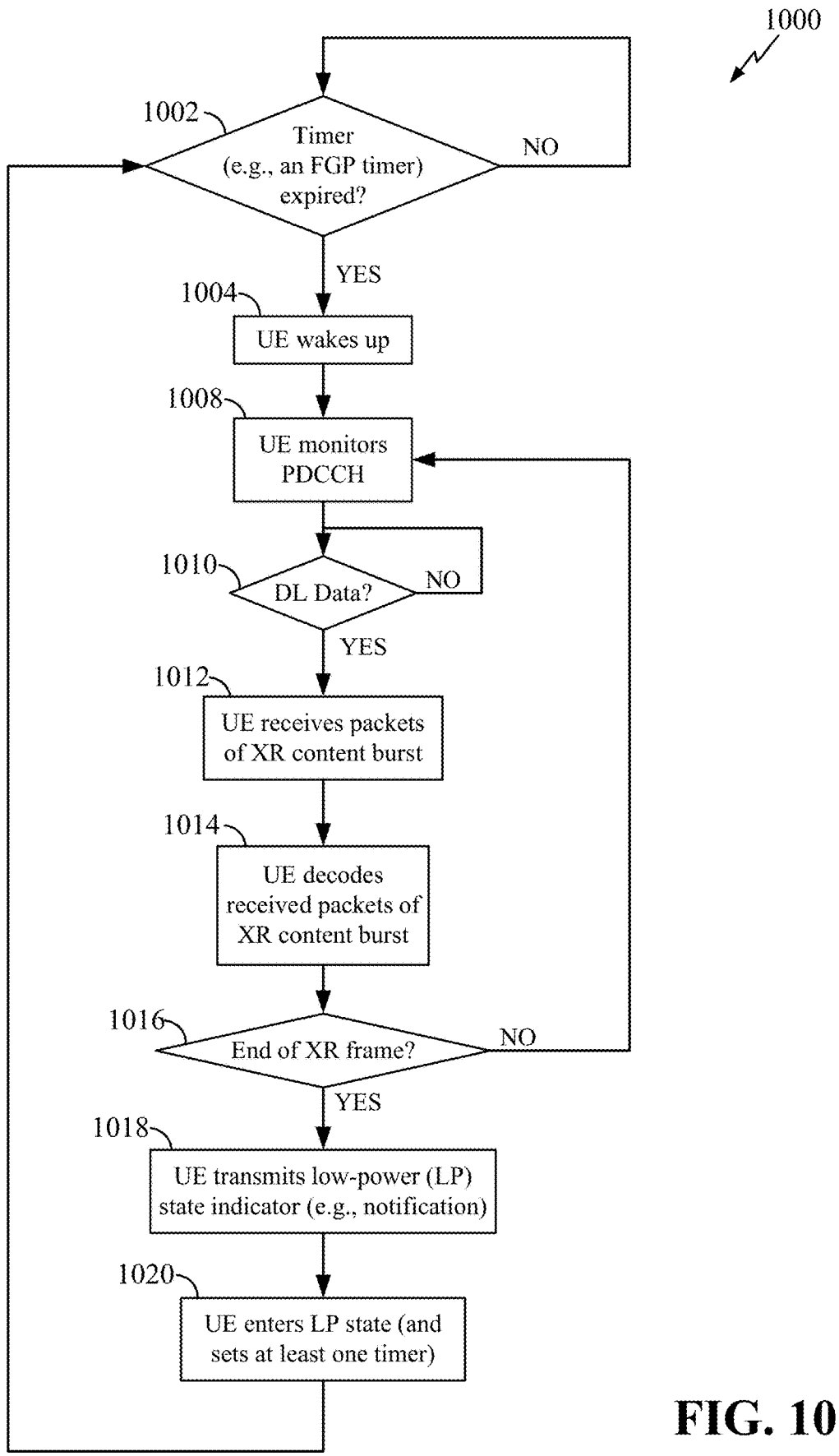
FIG. 10 is a flow chart illustrating an exemplary process for a UE-based discontinuous control channel monitoring technique according to some embodiments, as illustrated in FIG. 9.
Figure 11:
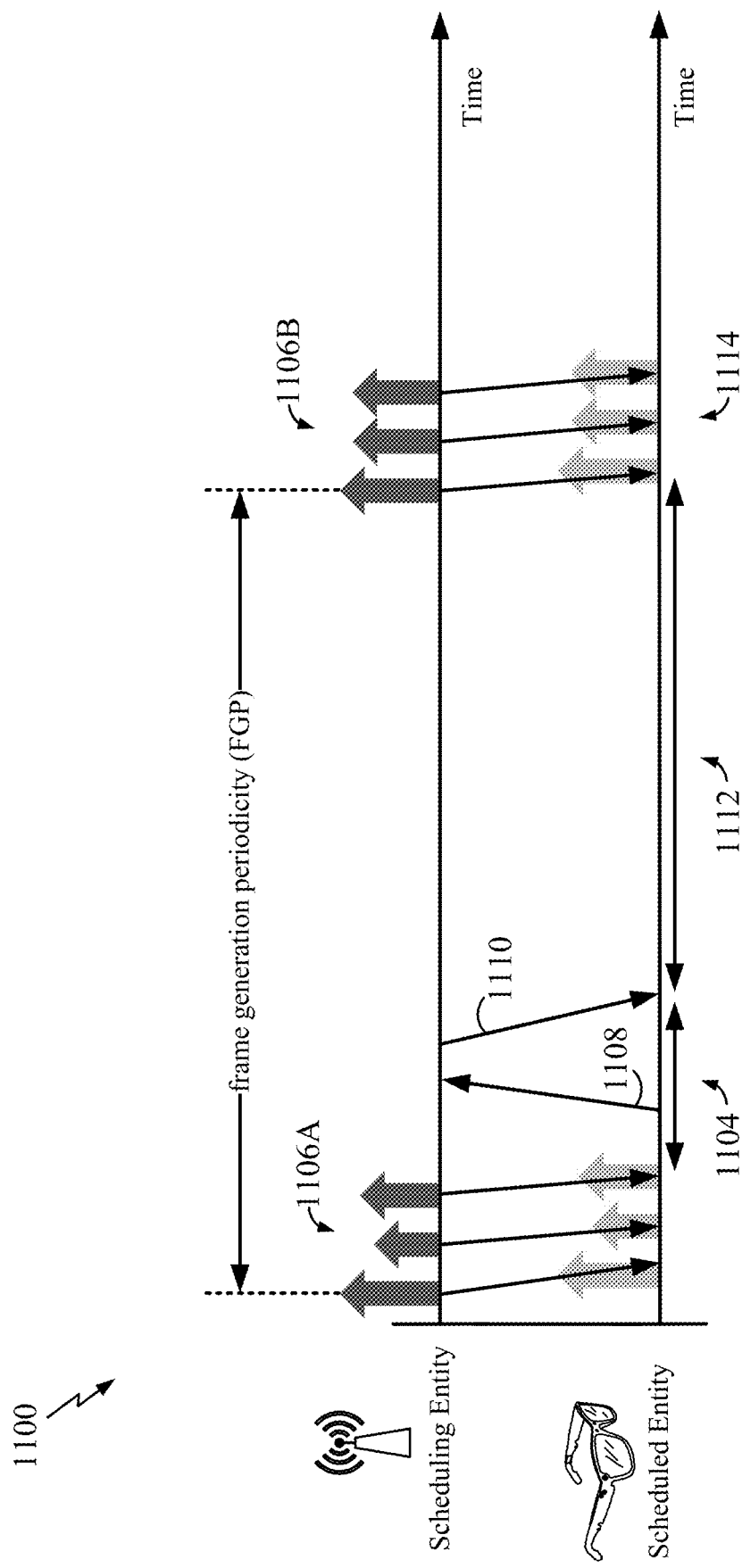
FIG. 11 is a timeline showing an example of a UE-based discontinuous control channel monitoring technique according to some further embodiments.

Of course, in the above examples, circuitry included in the processor 504 is merely provided as an example, and other means for carrying out the described functions may be included within various aspects of the present disclosure, including but not limited to the instructions stored in the computer-readable storage medium 506, or any other suitable apparatus or means described in any one of the FIGS. 1 and/or 2, and utilizing, the example processes and/or techniques described herein, for example, with reference to FIGS. 9, 10, 11, and/or 12.

In one or more examples, the computer-readable storage medium 506 may include XR application software 562 configured for various functions, including, for example, running an XR application. In some aspects, the computer-readable storage medium 506 may further include video frame decoding/rendering software 564 configured for various functions, including, for example, reproducing an XR video frame reassembling segmented packets, decoding encoded video frame slices, rendering video frames of a video stream, and/or drawing or replaying a video frame on a display device or screen (e.g., included in or coupled to the user interface 512).

The following description provides examples of a scheduled entity 106 monitoring for a physical downlink control channel (PDCCH) transmission from a scheduling entity 108 (e.g., a DL transmission of an XR content burst), reproducing video frames transmitted via such DL transmissions, determining when to discontinue monitoring for PDCCH to provide power savings, and determining when to resume monitoring for PDCCH (e.g., for subsequent XR content bursts). The following description, however, is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the present disclosure is intended to cover such an apparatus or method which is practiced using other structure, functionality, or structure and functionality in addition to, or other than, the various aspects of the disclosure set forth herein. It should be understood that any aspect of the disclosed technology may be embodied by one or more elements of a claim.

Examples of Traffic Flow in Extended Reality (XR) Communication Systems

In a wireless communication system serving extended reality (XR) traffic to one or more scheduled entities 106 (e.g., XR-enabling equipment), an external data network 110, such as an XR service provider, may receive information from a scheduled entity 106 (e.g., a user equipment (UE) of a particular user). The external data network 110 may utilize this user information in various ways. In an example, the external data network 110 may receive data packets from a UE, with such data packets effectively communicating certain information to the external data network 110 over the wireless air interface. In an illustrative example, a UE may transmit user information, such as the user's pose, sensor information, an image or video stream captured via a camera of the UE (assuming the UE has a camera), etc., to an XR service provider. In some examples, the XR service provider may receive such user information from one or more scheduled entities 106 over the wireless air interface. The external data network 110 may then utilize the data received from the one or more scheduled entities 106 while serving XR traffic to a scheduled entity 106 (e.g., an XR-enabling device of the particular user).

In some examples, the external data network 110 (e.g., an XR service provider) may use this user information to generate and render a video stream (e.g., a set of video frames). This can be done, for example, for transmissions back to the scheduled entity 106, such as to an XR-enabling device of the particular user. In an example, an XR service provider may generate a video stream and render video frames based on the user's pose information. In such examples, the user's current pose may be reflected in a set of video frames rendered at an external data network 110 (e.g., an XR service provider). The external data network 110 may then transmit (e.g., stream) the set of video frames to the scheduled entity 106 over the wireless air interface, for example, as an XR video stream.

To prevent the video stream the user sees from excessively lagging the user's pose or other sensor information, there is a low-latency specification for XR traffic. The total latency that a user may experience may be the time between the user device's generation of the pose information, and the user screen's presentation of a corresponding image received from an XR service provider. This total latency has many parts including processing time, air interface time, and network time, all having components in both directions between the UE and the XR service provider.

In the discussion that follows, particular attention is directed to a portion of this total latency corresponding to a downlink (DL) transmission of XR traffic over an air interface, e.g., from a scheduling entity 108 (e.g., a base station) to a UE. This portion of the total latency may be referred to as a DL delay.

In some examples, XR services may set a maximum acceptable DL delay (e.g., a DL delay specification). In an example, some XR services may establish a DL delay of 10 ms, although it would be understood by a person skilled in the art that other DL delay times may be established in various other examples. Compliance with a particular DL delay may be determined or controlled, for example, relative to when a scheduling entity 108 (e.g., base station) receives a data frame or information frame (e.g., a video frame) for transmission to a scheduled entity 106 (e.g., a UE) as compared to when the scheduling entity 108 completes a DL transmission of the video frame. Here, a data frame or information frame may include any suitable information, including but not limited to data (e.g., audio, video, or both audio and video) or control information. That is, a data frame or information frame may hold or carry information for video, online gaming (e.g., an online video game, gaming on a mobile device, etc.), XR frames (e.g., for augmented reality (AR), virtual reality (VR), mixed reality (MR), etc.), etc.

As discussed above, in some examples, an XR service provider may generate and render XR video frames. In some scenarios, XR frame generation and/or rendering may be based on, for example, pose information of a user operating a UE, such as an XR-enabling device. In such examples, the XR service provider may transfer the XR video frames to a scheduling entity 108 in a set of transmission bursts (e.g., transmitting a first XR video frame in a first XR content burst, transmitting a second XR video frame in a second XR content burst, etc.). As such, the scheduling entity 108 may receive, in a burst, a video frame (e.g., in the form of a plurality of packets) from an XR service provider.

When the scheduling entity 108 receives the video frame, the scheduling entity 108 may generally place the video frame in a queue (e.g., memory, a buffer, etc.) for transmission to a corresponding UE (e.g., an XR-enabling device of a user). The DL delay may end at the time when the scheduling entity 108 completes a transmission of a video frame to a UE. Here, in some examples, the scheduling entity 108 may discard data corresponding to a video frame in cases where the scheduling entity 108 has not yet transmitted the video frame within the DL delay specification.

In some examples, DL traffic for XR services may resemble the traffic of video streaming services. In an example, DL traffic for XR services for any given user may generally correspond to a sequence of XR video frames. In some examples, the frame rate may be 60 Hz, 120 Hz, or any suitable frame rate.

Rendering an XR video stream can be a power intensive process. As described above, an external data network 110 (e.g., an XR service provider) may render the XR video frames at the server side (e.g., using one or more server(s) 252 of the XR service provider) before sending them to a scheduling entity 108 (e.g., a base station (BS)) and/or to a scheduled entity 106 (e.g., a UE).

In another example, a scheduled entity 106 may use its own power, processing, and/or memory resources to render a set of XR video frames for an XR video stream. However, such video rendering activities can pose a significant drain on the battery life of such scheduled entities 106 and as such, may disrupt the quality of service provided to the user of an XR-enabling device. Thus, it may be advantageous for a separate entity to perform such video rendering activities (rather than a scheduled entity 106) to allow the scheduled entity 106 to conserve its resources for other processing activities.

Accordingly, providing for an external data network 110 (e.g., an XR service provider) to render the video frames before sending to the scheduled entity 106 may help extend battery life of the scheduled entity 106. In such instances, the scheduled entity 106 (e.g., an XR-enabling device) may receive the XR video frames in a set of downlink (DL) transmissions, where one or more service provider server(s) 252 may render and transmit the XR video frames to the scheduled entity 106 (e.g., over a core network 102).

As a scheduled entity 106 receives information sufficient to reproduce an XR video frame, the scheduled entity 106 may process the information to generate the video frame in an XR video stream. In some examples, the scheduled entity 106 may reproduce the XR video frames for the XR video stream at a speed corresponding to the frame rate of the XR video stream (e.g., 60 Hz, 120 Hz, etc.). In an example, the scheduled entity 106 may generate the XR video frames (e.g., draw the XR video frames, replay the video frames on a display, etc.) at a speed corresponding to the predetermined frame rate of the XR video stream.

In the present disclosure, a frame generation periodicity (FGP) refers to a period of time between a scheduling entity 108 beginning transmission of a video frame to a scheduled entity 106 (e.g., in one XR content burst), and the base station beginning transmission of a next sequential video frame to the scheduled entity 106 (e.g., in a subsequent XR content burst). In some examples, the FGP of DL traffic for XR service may correspond to the frame rate. In an illustrative and non-limiting example, the FGP may be 16.67 ms, which may correspond to a 60 Hz frame rate. In another illustrative and non-limiting example, the FGP may be 8.33 ms, which may correspond to a 120 Hz frame rate.

In a real-world implementation, the actual FGP may be less than perfectly precise and may exhibit some degree of variability or jitter. For example, at one or more server(s) 252, the time between generation of rendered video frames may vary to some degree. Further, there may be some variability in the delay (e.g., propagation delay) associated with transmission of video frames from the external data network 110 (e.g., the one or more server(s) 252 of an XR service provider), as the video frames propagate across a core network 102 before arriving at a given scheduling entity 108 (e.g., a base station). Accordingly, reference in this disclosure to a frame generation periodicity (FGP) may be approximate and it is to be understood that the actual periodicity may exhibit jitter, for example, and/or may take into account certain delays inherent in the transmission of such video frames through the core network 102.

Examples for Deconstructing and Transmitting XR Service Traffic

In some examples, an XR service may provide for high resolution images to enhance a user's experience. Accordingly, video frame sizes for XR service traffic may be relatively large. An external data network 110 (e.g., one or more server(s) 252 of an XR service provider) may divide a given video frame into multiple slices (e.g., files), and separately encode those slices for transmission across the core network 102 to a scheduled entity 106. In some examples, those encoded slice sizes (e.g., encoded file sizes) may exceed a maximum supported packet size for transmission from an external data network 110 (e.g., an XR service provider) through a core network 102 to a scheduling entity 108 (e.g., a base station (BS)). Accordingly, one or more server(s) 252 of the external data network 110 (e.g., one or more XR service provider server(s)) may segment an encoded slice (e.g., a file) into two or more packets (e.g., internet protocol (IP) packets). The external data network 110 may then route these packets through the core network 102 to one or more scheduling entities 108.

Accordingly, a scheduling entity 108 may receive, from the external data network 110, those two or more packets for DL transmission. There, the scheduling entity 108 may segment one or more of those packets into smaller packets called transport blocks (TBs). In an illustrative example, a scheduling entity 108 may receive, from an XR service provider, multiple packets (e.g., IP packets) representing an encoded slice of an XR video frame. The base station may then segment one of the received packets into a first plurality of TBs, a second received packet into a second plurality of TBs, and so on.

In such examples, a scheduler of the base station (e.g., scheduler circuitry 440) may schedule those TBs for DL transmission over the air interface utilizing its available physical resources (e.g., at a physical layer of the scheduling entity 108). In such examples, the base station's scheduler may segment one or more of these TBs for wireless DL transmission, and as such, may divide its resources for wireless DL transmission in the time dimension into sub-frames, slots, etc. While the discussion that follows may, for ease of description, refer to such time divisions on a wireless carrier for wireless DL transmission as slots, the techniques of this disclosure are not so limited. A person of ordinary skill in the art will understand such time divisions to variously refer to subframes, as well as to slots, mini-slots, or any other suitable time-based segmentation of a TB for DL transmission over a wireless carrier.

In some examples, a scheduling entity 108 (e.g., a base station (BS)) may be serving many scheduled entities 106 (e.g., multiple extended reality (XR)-enabling devices, etc.), with different priorities, latency specifications, etc. Accordingly, the scheduler circuitry 440 of a scheduling entity 108 may not necessarily allocate all transport blocks (TBs) destined to a given scheduled entity 106 in a contiguous block or downlink (DL) transmission. Rather, the scheduler circuitry 440 may cause a scheduling entity 108 to intersperse an XR-enabling device's a DL transmission destined for a first scheduled entity 106 (e.g., an XR-enabling device) with other DL transmissions destined for other scheduled entities 106. That is, a scheduling entity 108 may transmit a single video frame of XR service traffic in an XR burst, including multiple segments or DL transmissions (referred to herein in certain examples as an XR content burst). These segments may or may not be contiguous to one another. In some examples, one or more slots (e.g., one or more mini-slots) may separate different segments of an XR content burst corresponding to an XR video frame to then, for example, form a separation (e.g., one or more time gaps) between various DL transmissions of the particular XR content burst. In any case, the number of segments (e.g., DL transmissions) in a given XR content burst, and the separation (in slots) between respective segments may vary according to a scheduling policy of the scheduling entity 108, the number of scheduled entities 106 in the corresponding service area (e.g., a corresponding cell), or other factors, as some examples.

Figure 6:
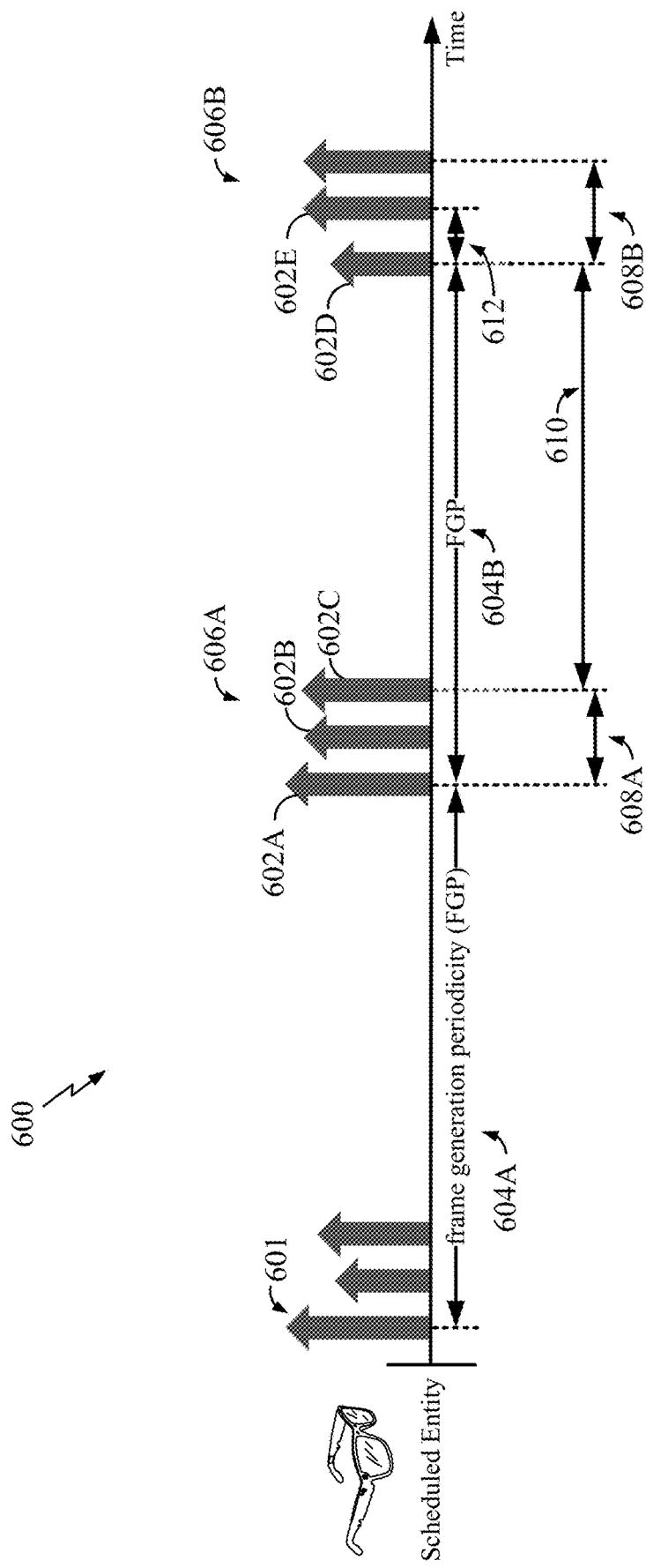
FIG. 6 is a timeline showing an example of the bursty nature of downlink (DL) traffic in extended reality (XR) services.

FIG. 6 is a timeline 600 illustrating an example of the pseudo-periodic, bursty nature of downlink (DL) traffic for extended reality (XR) services. As described above, a burst of DL traffic (e.g., an XR content burst 606A, etc.) may correspond to at least one full XR video frame of XR service traffic. In an example, an XR content burst 606A may convey a first XR video frame, while a second XR content burst 606B may convey a second XR video frame, and so forth.

In some examples, an XR content burst may coincide with a frame interval that begins according to a frame generation periodicity (FGP). In some examples, a scheduled entity 106 may determine the FGP information to time the receiving of a particular set of XR content bursts. In another example, a scheduled entity 106 may receive the FGP information from the RAN 104 (e.g., from a scheduling entity 108), or may determine the FGP information dynamically based on the nature of the DL traffic for the XR services.

In a non-limiting example, the scheduled entity 106 may calculate the FGP upon determining a frame rate of a corresponding XR video stream received from the scheduling entity 108. In another example, additionally or alternatively, the scheduled entity 106 may calculate the FGP based on information represented with each XR content burst (e.g., the number of XR video frames within each burst, amount of total information, classes/types of information, quality of service (QoS) information, etc.). Numerous other factors may be used in other calculation scenarios.

In some examples, a scheduled entity 106 may then expect to receive a first DL transmission of an XR content burst (e.g., DL transmission 602A, DL transmission 602D, etc.). Expectations may be timing based. For example, in some scenarios, timing can be at a time that coincides with a frame interval that begins according to the predetermined FGP. In an example, an XR content burst may coincide with the expiration of an FGP timer and/or another timer (e.g., a discontinuous reception (DRX) timer). In an illustrative example, a first XR content burst 606A may coincide with a frame interval that begins according to a first FGP 604A, a second XR content burst 606B coincide with another frame interval that begins according to a second FGP 604B, and so forth. In some examples, the first FGP 604A and the second FGP 604B may effectively correspond to the frame rate of the XR video stream. In an illustrative and non-limiting example, the first FGP 604A and the second FGP 604B may correspond to FGPs of approximately 16.67 ms, such as where the video stream has a 60 Hz frame rate.

In some instances, the FGP between content bursts may differ from an FGP that starts and ends according to a frame rate of an XR video stream. In an example, a scheduling entity 108 may transmit multiple XR video frames with a given XR content burst. In such instances, a plurality of packets of an XR content burst may represent multiple video frames, where the scheduled entity 106 may then determine when the scheduled entity 106 has received sufficient information (e.g., via the packets) to complete one or more XR video frames of the XR content burst. Of course, an XR content burst 606A may, instead, represent a single XR video frame, where the scheduled entity 106 may utilize the XR content burst of slice arrivals (e.g., a set of file arrivals) to reproduce the single XR video frame. In an example, the scheduled entity 106 may receive a plurality of packets in an XR content burst, where the plurality of packets represent a set of encoded slices. The scheduled entity 106 may decode the set of encoded slices to produce a set of decoded slices, and assemble the set of decoded slices to generate the XR video frame.

In FIG. 6, each upward-pointing arrow generally represents a downlink (DL) transmission. In an example, a DL transmission 601 received from a scheduling entity 108 may include a subset of transport blocks (TBs) (e.g., a subset of packets) representing at least a portion of a full XR video frame. That is, a DL transmission 601 may generally represent an encoded slice of an XR video frame. In such examples, a DL transmission 601 may include a contiguous set of TBs of XR service traffic (e.g., as a subset of packets). In an illustrative and non-limiting example, an XR content burst 606A may include a first encoded slice in a first DL transmission 602A, a second encoded slice in a second DL transmission 602B, and a third encoded slice in a third DL transmission 602C to then generate a full XR video frame.

In some examples, an XR content burst 606A conveys a full XR video frame as a plurality of packets, transmitted over time in individual DL transmissions of the XR content burst 606A. That is, the subsets of packets included with the DL transmissions of a given XR content burst (e.g., the encoded slices) may together effectively provide a plurality of packets that the scheduled entity 106 may then utilize to generate an XR video frame. In an illustrative example, an XR content burst 606A may include multiple separate subsets of TBs provided in a set of DL transmissions over time. In such examples, a full set of TBs that includes the multiple separate subsets of TBs may effectively represent the full XR video frame.

In some examples, one or more time gaps (e.g., one or more slots) may separate the multiple separate sets of TBs from one another in time. In an example, an XR content burst 606B may include a first DL transmission 602D and a second DL transmission 602E. In such examples, a scheduled entity 106 may receive the DL transmissions with some separation in time from one another (e.g., a time gap 612). In some examples, the time gap 612 may span a duration of one mini-slot, one slot, multiple slots, or more, depending on the particular DL transmissions. In this way, a scheduled entity 106 may receive a first subset of packets (e.g., a first subset of TBs in a DL transmission 602D) and a second subset of packets (e.g., a second subset of TBs in another DL transmission 602E) with a time gap 612 separating the DL transmissions.

In an illustrative and non-limiting example, a first XR content burst 606A may include a time gap of one slot between DL transmissions 602A and 602B, whereas a second XR content burst 606B may include a time gap 612 of multiple slots between DL transmissions 602D and 602E. The time gaps between DL transmissions may differ in duration for any number of different reasons. In an example, a scheduling entity 108 may intersperse the DL transmissions when transmitting an XR content burst 606A for a particular XR-enabling device with other wireless transmissions on a wireless carrier or multiplex transmissions that form such time gaps between a retrieval of DL data in such transmissions. It should be noted that while DL transmissions within XR content bursts are, in some instances, described as including a time gap between DL transmissions, the techniques of this disclosure are not so limited, and a person of ordinary skill in the art will understand that such time gaps may not be present between various DL transmissions in particular instances.

In some examples, an XR content burst may include an unpredictable number of time gaps between DL transmissions (e.g., a first time gap between a DL transmission 602A and an adjacent DL transmission 602B, a second time gap between the adjacent DL transmission 602B and another adjacent DL transmission 602C, etc.). In an example, an XR content burst 606A may include time gaps between different segments or packets of the XR content burst. In addition, the length of time for a given time gap may be of an unpredictable duration. In such instances, the time gap(s) between DL transmissions may cause the burst transmission to spread in time by a variable amount. In this way, an XR content burst may have a variable amount of time spreading. In an example, an XR content burst 606A may be of a first duration 608A, and an XR content burst 606B may be of a second duration 608B, where the first duration 608A and the second duration 608B may, in some instances, differ from one another, depending on the particulars of each XR content burst and their various DL transmissions.

Depending on the frame generation periodicity (FGP) (e.g., FGP 604B) and the amount of time spreading for a burst's transmission (e.g., the first duration 608A), there may be a relatively substantial period of time 610 after a scheduled entity 106 completes receiving a particular XR content burst 606A before the scheduled entity 106 begins to receive a next XR content burst 606B. In an illustrative and non-limiting example, a scheduled entity 106 may receive a first XR content burst 606A, the XR content burst including a first DL transmission 602A, a second DL transmission 602B, a third DL transmission 602C, etc. In such examples, the scheduled entity 106 may take a particular amount of time (e.g., the first duration 608A) to complete the receiving of the XR content burst 606A.

Upon receiving and/or processing the last DL transmission 602C, the scheduled entity 106 may determine that the scheduled entity 106 has information (e.g., in its memory) sufficient to generate the full XR video frame of XR content burst 606A using at least the first DL transmission 602A, the second DL transmission 602B, and/or the third DL transmission 602C. In such instances, the scheduled entity 106 may also determine that the scheduled entity 106 may now expect a relatively long period of time 610 before the scheduled entity 106 is likely to receive another XR content burst 606B. That is, the period of time 610 between XR content bursts may be substantially long relative to the amount of time (e.g., the first duration 608A) the scheduled entity 106 spends consuming a particular amount of power in an 'ON' state to receive a given XR content burst 606A.

According to one or more of the various techniques disclosed herein, a scheduled entity 106 may exploit the period of time 610 between XR content bursts for power savings. In an example, scheduled entity 106 may take advantage of the period of time 610 between a first XR content burst 606A and a second XR content burst 606B for power savings. In such examples, the scheduled entity 106 may enter into a low-power state (e.g., a sleep state) during that time to effectively exploit this period of time 610 between XR content bursts for power savings. Accordingly, the scheduled entity 106 may do so to reduce power consumption that may otherwise have been consumed, and oftentimes wasted, during that period of time 610. This is because the scheduled entity 106 may ultimately be prematurely monitoring for DL data ahead of a next XR content burst. In other words, the scheduled entity 106 may consume a relatively high amount of power receiving a given XR content burst 606A compared to the amount of power the scheduled entity 106 may then conserve in a low-power state during the period of time 610. In such instances, the scheduled entity 106 may lay dormant in the low-power state until the time comes when the scheduled entity 106 may expect a first DL transmission 602D to start the next XR content burst 606B.

In such examples, the scheduled entity 106 may utilize certain information (e.g., frame rate information, delay information, timer parameters, etc.) to support a determination that the scheduled entity 106 may not reasonably expect DL transmissions of XR service traffic ahead of a next XR content burst, scheduled to occur at a later, predetermined time. In some examples, however, the scheduled entity 106 may take into account whether the scheduling entity 108 has effectively indicated otherwise. In an example, the scheduling entity 108 may effectively indicate that the scheduled entity 106 may actually expect some DL transmissions during that time between XR content bursts. In some examples, a scheduling entity 108 may determine not to grant a request from the scheduled entity 106 to enter the low-power state, for example, as discussed further below, to effectively and implicitly signal to the scheduled entity 106 to continue monitoring for DL transmissions in a normal power state.

Upon receiving a set of XR content bursts, each including a plurality of packets, and generating a corresponding set of video frames from the XR content bursts, a scheduled entity 106 (e.g., a UE) may utilize the set of XR video frames in any number of different ways. In some examples, the scheduled entity 106 may perform video coding on the set of XR video frames to transmit an encoded XR video stream to another device (e.g., another scheduled entity 106), store the XR video stream in memory (e.g., memory 505), display the XR video stream on a display of the scheduled entity 106, and so forth.

While this disclosure may, at times, describe an extended reality (XR) content burst as spanning multiple downlink (DL) transmissions, the techniques of this disclosure are not so limited. A person of ordinary skill in the art will understand that, in some instances, a single DL transmission may include information sufficient to reproduce an XR video frame, or at least a relevant portion of the XR video frame for purposes of a particular XR application.

Examples of Discontinuous Reception (DRX) Features

A variety of existing wireless communication systems provide for a feature variously referred to in the art as Discontinuous Reception (DRX). With DRX, a scheduled entity 106 (e.g., a user equipment (UE)) may reduce its battery consumption by entering a low-power state (e.g., a sleep mode) when not receiving downlink (DL) traffic. The scheduled entity 106 may wake up from the low-power state after a period of time to determine whether any new DL traffic is coming from the network (e.g., from one or more scheduling entities 108). In instances where the scheduled entity 106 determines there is no new DL traffic, the scheduled entity 106 may effectively return to (e.g., continue in) the low-power state. On the other hand, when the scheduled entity 106 determines there is new DL traffic (e.g., new data), the scheduled entity 106 may remain awake to then receive (e.g., decode) the DL traffic.

In some examples, a network (e.g., a radio access network (RAN) 104) configures a scheduled entity 106 for discontinuous reception (DRX) by providing the scheduled entity 106 with a set of parameters that define a DRX feature. These parameters may include, in some examples, a DRX inactivity timer, a DRX cycle parameter, and so forth.

In an example, a DRX inactivity timer may generally specify how long a scheduled entity 106 should remain in an 'ON' state after no longer receiving DL transmissions. In another example, the DRX cycle parameter may generally define the periodicity of the DRX 'ON'-'SLEEP' cycle.

However, such a DRX feature by itself may be unsuitable for extended reality (XR)-enabling equipment. It may be advantageous for an XR-enabling device to, thus, exploit the time between XR content bursts (e.g., bursts of DL transmissions) for power savings (PS), in accordance with one or more of the various techniques of this disclosure.

In some examples, the variable nature of the length of time of each XR content burst (e.g., the first duration 608A of the first XR content burst 606A, the second duration 608B of the second XR content burst 606B, etc.) may prevent a scheduled entity 106 that is using DRX alone from entering a sleep mode for most or all of the available time between XR content bursts. In an example, existing specifications have a limited set of values that can be used for a DRX cycle time. These available values, however, do not correspond generally to frame generation periodicities (FGPs) used for communicating XR traffic from a scheduling entity 108 to a scheduled entity 106. In an illustrative example, an FGP may generally correspond to a frame rate of, e.g., 60 Hz, 120 Hz, etc., depending on the frame rate for the particular video stream.

In another example, a scheduled entity 106 may encounter difficulties when attempting to determine a suitable value for the DRX inactivity timer. In an illustrative example, if the DRX inactivity timer were set to too long a value, then the scheduled entity 106 may not enter a sleep state before the next XR content burst begins. And if the inactivity timer were set to too short a value, then the scheduled entity 106 may enter a sleep state too early, causing one or more delayed packets in a video frame's burst to be further delayed until the next DRX wake time. By this time, the packet may fail to meet the DL delay time specified for the XR video stream if transmitted, causing a loss of the XR video frame.

Examples of Physical Downlink Control Channel (PDCCH) Skipping Techniques

According to an aspect of the present disclosure, a scheduled entity 106 (e.g., a user equipment (UE)) and a scheduling entity 108 (e.g., a base station (BS)) may employ a dynamic, explicit signaling-based approach to coordinate entry of the scheduled entity 106 into a low-power state (e.g., a sleep state) between bursts of extended reality (XR) content. In an example, a scheduled entity 106 may utilize this approach to transition from its wake state (e.g., a first powered state) to its low-power state, alone or in conjunction with the scheduling entity 108. In addition, a scheduled entity 106 may implement this approach, either in combination with or in lieu of implementing discontinuous reception (DRX) features. In an example, the scheduled entity 106 may enter the low-power state after receiving, from a scheduling entity 108, a plurality of packets in a set of downlink (DL) transmissions. There, the plurality of packets may represent a full XR video frame. In another example, the scheduled entity 106 may enter the low-power state after the scheduled entity 106 determines it has received enough of the XR video frame to confirm that the plurality of packets represents information sufficient for the scheduled entity 106 to decode and generate the full XR video frame using the plurality of packets.

In such examples, a scheduled entity 106 (e.g., an XR-enabling device) and scheduling entity 108 (e.g., a base station (BS)) may employ one or more skipping techniques (e.g., one or more discontinuous PDCCH monitoring (DPM) techniques) for power savings as described herein. In another example, a scheduled entity 106 and scheduling entity 108 may employ one or more of the various skipping (or DPM) example techniques of the disclosure in combination with one or more discontinuous reception (DRX) features.

In some examples, various approaches to DPM may be controlled by a base station (BS). In an example, a BS may provide a control signal (e.g., a DCI, a medium access control (MAC) control element (MAC-CE), etc.) or other suitable dynamic signaling to instruct a scheduled entity 106 to enter a low-power state (e.g., a sleep state). The BS may provide the control signal once it has completed transmission of all packets corresponding to an XR video frame. This base station (BS)-based approach, however, may be difficult to achieve or may have certain drawbacks in various examples. To illustrate, a BS may lack a mechanism to determine whether the BS has transmitted all XR content packets of an XR video frame to a particular scheduled entity 106 (e.g., so the scheduled entity 106 may generate the full XR frame from the plurality of XR content packets).

In an illustrative example, one or more server(s) 252 of an external data network 110 (e.g., one or more XR service provider server(s)) may employ certain video processing to slice a video frame (e.g., an XR video frame) into multiple slices (e.g., files), the slices then being separately encoded to produce a set of encoded slices. Similarly, the external data network 110 may segment each encoded slice (e.g., an encoded file) into a plurality of packets (e.g., internet protocol (IP) packets). The external data network 110 may then transmit the plurality of packets across a core network (e.g., core network 102) to one or more scheduling entities 108, such as to one or more base stations (BSs). The one or more base stations (BSs) may then transmit the plurality of packets to a scheduled entity 106 in a set of DL transmissions.

A base station (BS), however, may lack a mechanism, in some instances, to reassemble the plurality of packets (e.g., IP packets) into their respective slices, decode those slices, and reproduce video frames from those slices. In such instances, a BS may regard the packets it receives (and that are destined for a scheduled entity 106) in the same way as any other packets from any number of scheduled entities 106. That is, the BS may regard packets it receives without having access to, or an understanding of, the higher-layer content of those packets (e.g., the assembled XR video frame). In such instances, the BS may be indifferent when processing the actual XR content of the packets and providing those packets to a scheduled entity 106 in the set of DL transmissions. Accordingly, the BS may forgo any attempt, or may otherwise fail, to determine whether it has transmitted a full set of packets, or at least a threshold number of the full set of packets, for a given XR video frame in a given burst of XR content.

Examples of User Equipment (UE)-based Physical Downlink Control Channel (PDCCH) Skipping According to an aspect of the present disclosure, a user equipment (UE) (e.g., an extended reality (XR)-enabling device) may be more suitable than a base station (BS) for determining boundaries of XR content bursts (e.g., XR service traffic bursts). In an example, a scheduled entity 106, such as a UE, may be more suitable than a scheduling entity, such as a BS, for determining an end of an XR video frame transmission to determine the completion of a particular XR content burst. As such, a scheduled entity 106 may effectively implement an explicit signaling-based approach for power savings (PS). In such instances, the scheduled entity 106 may control at least the initiation of one or more of the various discontinuous physical downlink control channel (PDCCH) monitoring (DPM) schemes (e.g., PDCCH skipping) described herein. In this way, the scheduled entity 106 may implement a UE-based DPM scheme, such as a UE-initiated or UE-assisted approach in various examples.

In an illustrative example, a scheduled entity 106 may reassemble and decode a set of packets (e.g., a plurality of data packets) of a given XR content burst to generate a full video frame (e.g., an XR video frame). In such instances, the scheduled entity 106 may generate the video frame for drawing and/or displaying the video frame. In an example, the scheduled entity 106 may generate the video frame to then display the video frame on a display screen of the scheduled entity 106 (e.g., via user interface 512 and in coordination with at least the display circuitry 546 of scheduled entity 500).

In some examples, the scheduled entity 106 may receive the plurality of packets in a given XR content burst, the XR content burst including a set of one or more downlink (DL) transmissions separated in time from another set of DL transmissions according to a frame generation periodicity (FGP) timer. In such examples, a DL transmission may indicate a subset of packets relative to a full set of packets, the full set of packets representing an XR video frame of a given XR content burst. As such, the subset of packets may represent at least a portion of an XR video frame to utilize with additional subsets of packets to generate the full XR video frame.

In such examples, a scheduling entity 108 may transmit a given XR content burst after some amount of time has passed following a preceding XR content burst, and with some amount of time passing before a subsequent XR content burst, where the amount of time passed between XR content bursts may be the same or different, in various examples. In this way, the scheduled entity 106 may receive a first set of packets representing a first XR video frame transmitted in a first XR content burst. There, the scheduled entity 106 may derive the first set of packets from a first set of DL transmissions of the first XR content burst. After a predetermined amount of time has passed (e.g., relative to the first XR content burst), the scheduled entity 106 may receive a second set of packets representing a subsequent XR video frame transmitted in a second XR content burst. There, the scheduled entity 106 may derive the second set of packets from a second set of DL transmissions of the second XR content burst.

According to an aspect of the present disclosure, the scheduled entity 106 may access the upper layer information in the set of packets. Accordingly, the scheduled entity 106 may determine when the scheduled entity 106 has obtained sufficient information (e.g., a predetermined number of packets) from the radio access network (RAN) 104 based on the upper layer information. In such instances, the scheduled entity 106 may then generate the XR video frame for an XR video stream based on the set of packets. In some examples, the scheduled entity 106 may generate the video frame for subsequent display, post-processing (e.g., employing elements of XR processing, such as to include graphical overlays with the XR video frame), and/or storage (e.g., as encoded video). In any event, the scheduled entity 106 may determine from the upper layer information whether the scheduled entity 106 received all packets, or at least a threshold number of packets, corresponding to a given XR content burst. That is, the scheduled entity 106 may determine whether the scheduled entity 106 has received sufficient packets and/or information to complete the generation of a particular XR video frame (e.g., in a set of multiple XR video frames transmitted over time in a set of XR content bursts). In such examples, the scheduled entity 106 may enter a low-power (LP) state until a time corresponding to when the scheduled entity 106 may expect to receive additional packets in a subsequent XR content burst.

When entering the low-power (LP) state, the scheduled entity 106 may notify the scheduling entity 108 that it is entering the low-power state or that it at least intends on entering its LP state (e.g., with one or more permissions granted from the scheduling entity 108 to do so). In some examples, the scheduled entity 106 may transmit an LP state indicator to the scheduling entity 108 upon recognizing that the scheduling entity 108 has completed its transmittal of a plurality of downlink (DL) packets for a particular XR video frame. In such instances, the scheduled entity 106 may determine that the plurality of DL packets satisfy a frame reproduction threshold for reproducing a corresponding XR video frame from the plurality of DL packets. In some examples, the scheduled entity 106 may transmit the LP state indicator to the scheduling entity 108 via uplink control information (UCI). In such instances, the UCI may communicate the LP state indicator to the scheduling entity 108 as a notification (e.g., a first indicator type notifying the scheduling entity 108 that the scheduled entity 106 is entering its LP state), or as a request (e.g., a second indicator type requesting permission to enter the LP state).

While this disclosure refers to LP state indicators as being an LP state notification or an LP state request in certain examples, the techniques of this disclosure are not so limited. That is, a person of ordinary skill in the art should understand, for example, that in some instances, the scheduled entity 106 may transmit an LP state indicator as another indicator type (e.g., one that includes a request and a notification, etc.). In an illustrative and non-limiting example, the scheduled entity 106 may request, via a particular LP state indicator, permission to enter its LP state. In addition, the scheduled entity 106 may notify the scheduling entity 108, via that LP state indicator, that the scheduled entity 106 intends to enter the LP state with a predetermined time delay built-in. In an example, the scheduled entity 106 may indicate that it intends to enter its LP state in instances where the scheduled entity 106 does not receive any response from the scheduling entity 108, for example, within a predetermined amount of time (in milliseconds or microseconds) after transmitting the LP state indicator to the scheduling entity 108.

In some examples, the scheduled entity 106 may enter its LP state upon transmitting an LP state indicator to the scheduling entity 108, or after a relatively short time duration has lapsed to allow the scheduling entity 108 to indicate whether the scheduled entity 106 may proceed with entering its LP state as the scheduled entity 106 intended. The scheduled entity 106 may then remain in a LP state for a particular amount of time prior to receiving a next set of DL transmissions (e.g., a next XR content burst). In another example, the scheduled entity 106 may request, from the scheduling entity 108, one or more permissions to enter the low-power state. In turn, the scheduled entity 106 may enter the low-power state upon receiving a low-power state grant indicator from the scheduling entity 108, the grant indicator effectively granting the scheduled entity 106 various permissions to enter the low-power state (e.g., multi-carrier permissions).

Pursuant to the low-power state, the scheduled entity 106 may skip or discontinue its monitoring for data during the period between XR content bursts. In an example, the scheduled entity 106 may de-power its transceiver 510 for power savings. In some examples, to achieve such power savings, the scheduled entity 106 may calculate that a next DL transmission (e.g., DL transmission 602D) may not occur until a particular period of time 610 has passed following a last DL transmission 602C of a prior XR content burst (e.g., XR content burst 606A). The scheduled entity 106 may perform such calculations based on any one or more of the frame rate information, DL transmission rates, propagation delays, etc. In some examples, the scheduled entity 106 may determine that a next XR content burst may not occur until the start of a next frame interval. In an illustrative and non-limiting example, the scheduled entity 106 may be receiving video data pursuant to a 60 Hz frame rate, decoding the video data (e.g., using a video decoder processor operating at an application layer of the scheduled entity 106), streaming the video to a user (e.g., for a virtual reality experience on an extended reality (XR) headset), and receiving, after 16.67 ms (for this 60 Hz example), a next video frame (e.g., for the ongoing virtual reality experience). In such examples, the scheduled entity 106 may determine when a scheduling entity 108 may initiate a next XR content burst (e.g., XR content burst 606B) and/or when the scheduled entity 106 may expect to receive an initial DL transmission 602D for a next XR content burst.

Examples for Video Decoding Processes

In some examples, a scheduled entity (e.g., the scheduled entity 106 of FIG. 1) may utilize an upper layer (e.g., an application layer) of the scheduled entity to decode slices XR video frames. In an example, the scheduled entity 500 of FIG. 5 may execute an upper layer process that involves deploying video frame decoding/rendering circuitry 542 to determine the boundaries of a given XR content burst. In an example, the video frame decoding/rendering circuitry 542 may pass a plurality of downlink (DL) packets from a lower layer of the scheduled entity 500, such as from a medium access control (MAC) layer entity of the scheduled entity 500, to an upper layer of the scheduled entity 500. There, the video frame decoding/rendering circuitry 542 may decode the plurality of DL packets to reproduce a corresponding XR video frame. In such instances, the scheduled entity 500 may identify the end of a particular XR content burst upon determining that the plurality of DL packets satisfy a frame reproduction threshold.

In an example, the video frame decoding/rendering circuitry 542 may determine that the scheduled entity 500 has stored a particular set of DL packets (e.g., in a buffer or other memory) that satisfies the frame reproduction threshold. In some examples, the frame reproduction threshold may be satisfied when the video frame decoding/rendering circuitry 542 determines that performing a decoding process on the set of DL packets will result in the output of a corresponding XR video frame of an XR video stream. In such example, the video frame decoding/rendering circuitry 542 may proceed to reproduce the XR video frame from the set of DL packets for the given XR content burst, and provide the reproduced XR video frame, such as to a display of the device or other suitable display device connected thereto. As described below, the video frame decoding/rendering circuitry 542 may utilize various video decoding processes (e.g., inter-prediction, intra-prediction, etc.) to reproduce video frames from an encoded video bitstream, for example, received via the connectivity circuitry 544 and transceiver 510 of scheduled entity 500 while operating in a first power state. In some examples, the video frame decoding/rendering circuitry 542 may decode an encoded video bitstream (e.g., a plurality of DL packets) to yield an XR video frame having a particular pixel resolution for playback then in an XR video stream.

Figure 7:
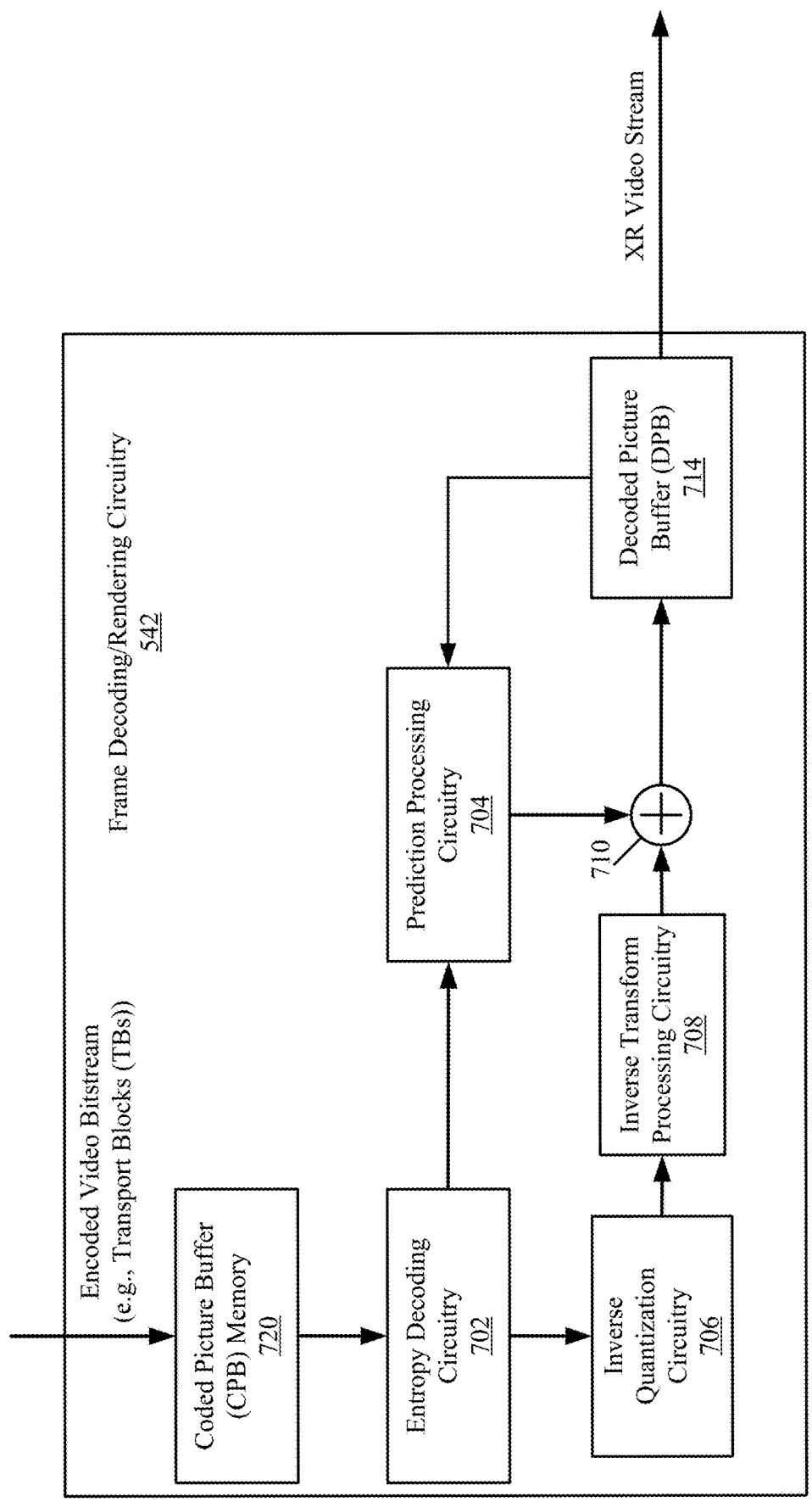
FIG. 7 is a block diagram illustrating example circuits of an example video frame decoding circuitry according to some embodiments, as illustrated in FIG. 5.

FIG. 7 is a block diagram illustrating example circuits of the video frame decoding/rendering circuitry 542 (of FIG. 5) according to some embodiments. As described, the video frame decoding/rendering circuitry 542 may perform one or more of the various techniques of this disclosure. FIG. 7 is provided for purposes of explanation and is not limiting on the techniques as broadly exemplified and described in this disclosure. While this disclosure may at times describe certain video coding activities pursuant to certain video coding standards, the techniques of this disclosure are not so limited. A person of ordinary skill in the art would understand that video coding devices may be configured to other video coding standards to perform one or more of the various techniques of this disclosure. To determine the boundaries between various bursts of XR content, the video frame decoding/rendering circuitry 542 may employ a number of video decoding techniques to identify when a set of downlink (DL) packets of an incoming encoded video bitstream includes information sufficient to reproduce an XR video frame of an XR video stream.

In some examples, the video frame decoding/rendering circuitry 542 of FIG. 5 may include coded picture buffer (CPB) memory 720, entropy decoding circuitry 702, prediction processing circuitry 704, inverse quantization circuitry 706, inverse transform processing circuitry 708, a frame reproduction circuit 710, and a decoded picture buffer (DPB) 714, as illustrated in FIG. 7. Any or all of the CPB memory 720, the entropy decoding circuitry 702, the prediction processing circuitry 704, the inverse quantization circuitry 706, the inverse transform processing circuitry 708, the frame reproduction circuit 710, and the DPB 714 may be implemented in one or more processors or in processing circuitry. Moreover, the video frame decoding/rendering circuitry 542 may include additional or alternative processors or processing circuitry to perform these and other functions.

The coded picture buffer (CPB) memory 720 may store video data, such as an encoded video bitstream represented by a plurality of downlink (DL) packets (e.g., a plurality of transport blocks (TBs) or slices corresponding to a full XR video frame), to be decoded by the components of the video frame decoding/rendering circuitry 542. The video data stored in the CPB memory 720 may be obtained, for example, from computer-readable medium 506 (FIG. 5). In some examples, the CPB memory 720 may include a CPB that stores encoded video data (e.g., syntax elements) from an encoded video bitstream. Also, the CPB memory 720 may store video data other than syntax elements of a coded picture, such as temporary data representing outputs from various circuitry elements of the video frame decoding/rendering circuitry 542. In addition, the DPB 714 generally stores decoded pictures, which the video frame decoding/rendering circuitry 542 may output and/or use as reference video data when decoding subsequent data or pictures of the encoded video bitstream in a next XR content burst. The CPB memory 720 and the DPB 714 may be formed by any of a variety of memory devices, such as dynamic random access memory (DRAM), including synchronous DRAM (SDRAM), magnetoresistive RAM (MRAM), resistive RAM (RRAM), or other types of memory devices. The CPB memory 720 and DPB 714 may be provided by the same memory device or separate memory devices. In various examples, CPB memory 720 may be on-chip with other components of the video frame decoding/rendering circuitry 542, or off-chip relative to those components.

Additionally or alternatively, in some examples, the video frame decoding/rendering circuitry 542 may retrieve coded video data from memory (e.g., from memory 505 of FIG. 5). That is, memory 505 may store data as discussed above with CPB memory 720. Likewise, as discussed with reference to FIG. 5, a computer-readable medium 506 may store instructions (e.g., video frame decoding/rendering software 564) to be executed by the video frame decoding/rendering circuitry 542 of scheduled entity 500. In such instances, some or all of the functionality of the video frame decoding/rendering circuitry 542 may be implemented in software to be executed by processing system 504 (e.g., the video frame decoding/rendering circuitry 542) of the scheduled entity 500.

The various circuitry elements shown in FIG. 7 are illustrated to assist with understanding the operations performed by the video frame decoding/rendering circuitry 542. The circuitry elements may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware (e.g., video frame decoding/rendering software 564 of FIG. 5). Fixed-function circuits may execute software instructions (e.g., to receive parameters or output parameters), but the types of operations that the fixed-function circuits perform are generally immutable. In some examples, one or more of the circuitry elements may be distinct circuit blocks (fixed-function or programmable), and in some examples, the one or more circuitry elements may be integrated circuits.

In some examples, the video frame decoding/rendering circuitry 542 may include arithmetic logic units (ALUs), elementary function units (EFUs), digital circuits, analog circuits, and/or programmable cores formed from programmable circuits. In examples where the operations of the video frame decoding/rendering circuitry 542 are performed by software executing on the programmable circuits, on-chip or off-chip memory may store instructions (e.g., object code) of the software that the video frame decoding/rendering circuitry 542 receives and executes. In another example, a separate memory device within the video frame decoding/rendering circuitry 542 (not shown) may store such instructions.

In some examples, the entropy decoding circuitry 702 may receive encoded video data (e.g., from the CPB 720). The entropy decoding circuitry 702 may entropy decode the video data to extract syntax elements. In such examples, the video frame decoding/rendering circuitry 542 of FIG. 5 may utilize the syntax elements the entropy decoding circuitry 702 extracts from the plurality of packets to decode at least one corresponding XR video frame. In some examples, the prediction processing circuitry 704 may include motion compensation circuitry, intra-block copy circuitry, intra-prediction circuitry, linear model (LM) circuitry, or other such circuitry elements.

In some examples, the entropy decoding circuitry 702 may entropy decode syntax elements defining quantized transform coefficients of a quantized transform coefficient block, as well as transform information, such as a quantization parameter (QP) and/or transform mode indication(s). In some examples, the inverse quantization circuitry 706 of the scheduled entity 500 may use the QP associated with the quantized transform coefficient block to determine a degree of quantization and, likewise, a degree of inverse quantization for the inverse quantization circuitry 706 to apply. The inverse quantization circuitry 706 may, for example, perform a bitwise left-shift operation to inverse quantize the quantized transform coefficients. The inverse quantization circuitry 706 may thereby form a transform coefficient block including transform coefficients. After the inverse quantization circuitry 706 forms the transform coefficient block, the inverse transform processing circuitry 708 may apply one or more inverse transforms to the transform coefficient block to generate a set of residual blocks.

In some examples, the prediction processing circuitry 704 may generate a prediction block according to a set of prediction information syntax elements that were entropy decoded by the entropy decoding circuitry 702. In an example, the prediction information syntax elements may indicate whether the prediction processing circuitry 704 is to utilize inter-prediction processing or intra-prediction processing when decoding the slices of the XR video frame. When inter-predicted, the prediction information syntax elements may indicate a reference picture in DPB 714 from which to retrieve a reference block. Accordingly, the prediction processing circuitry 704 may generally perform the inter-prediction process based at least in part on the reference picture in DPB 714 to decode the XR video frame, or certain portions of the XR video frame (e.g., slices, transport blocks (TBs)). When the prediction information syntax elements indicate the XR video frame, or certain portions of the XR video frame (e.g., slices, transport blocks (TBs)), are intra-predicted, the prediction processing circuitry 704 may generate a prediction block according to an intra-prediction mode indicated by the prediction information syntax elements. In some examples, the prediction processing circuitry 704 may perform the intra-prediction process by retrieving data of various neighboring samples from DPB 714 to utilize in reproducing the XR video frame of a given XR content burst.

In some examples, the video frame decoding/rendering circuitry 542 may reproduce an XR video frame on a block-by-block basis (e.g., based on each transport block (TB) of a plurality of transport blocks (TBs) transmitted during a given XR content burst). In this way, the video frame decoding/rendering circuitry 542 may generate an XR video frame from a plurality of TBs, with a last subset of TBs decoded after at least a first subset of TBs of the plurality of TBs. In another example, the video frame decoding/rendering circuitry 542 may reproduce an XR video frame on a slice-by-slice basis.

In some examples, the video frame decoding/rendering circuitry 542 may determine, via the application layer of the scheduled entity 500, whether a frame reproduction threshold condition is satisfied. In an example, the video frame decoding/rendering circuitry 542 may determine the frame reproduction threshold is satisfied when a particular subset of encoded TBs (e.g., a final, or last remaining subset of TBs) of a set of TBs for an XR video frame has passed into the CPB memory 720 for decoding. In such examples, the video frame decoding/rendering circuitry 542 may be configured to effectively decode the XR video frame from the set of TBs. As such, the video frame decoding/rendering circuitry 542 may signal to a lower layer of the scheduled entity 500 (e.g., a medium access control (MAC) layer entity and/or a physical (PHY) layer of the scheduled entity 500) that the frame reproduction threshold is satisfied for the XR video frame. In an illustrative example, the video frame decoding/rendering circuitry 542 may determine the frame reproduction threshold is satisfied upon receiving the last subset of encoded TBs in the set of TBs such that the video frame decoding/rendering circuitry 542 may decode the encoded set of TBs to reproduce and output the XR video frame.

In some examples, the frame reproduction circuit 710 may reproduce all, or at least a portion of, an XR video frame (e.g., using a prediction block and a set of residual blocks to reconstruct the XR video frame). In an illustrative and non-limiting example, the frame reproduction circuit 710 may add samples of the residual block(s) to corresponding samples of the prediction block to reproduce all, or at least a portion, of the XR video frame.

In some examples, the video frame decoding/rendering circuitry 542 may store the reproduced blocks in DPB 714. In addition, DPB 714 may provide reference information (e.g., information for motion compensation, etc.) to the prediction processing circuitry 704. Moreover, the video frame decoding/rendering circuitry 542 may output decoded XR video frames from DPB 714. In an example, the video frame decoding/rendering circuitry 542 may provide video frames for subsequent presentation of the XR video frames on a display device in an XR video stream. In some examples, the display circuitry 546 of the scheduled entity 500 may cause the reproduced XR video frames to be displayed on a display (e.g., of the user interface 512 of FIG. 5). In such instances, the video frame decoding/rendering circuitry 542 may decode an encoded video bitstream to reproduce and output a set of decoded XR video frames in an XR video stream. In some examples, the video frame decoding/rendering circuitry 542 may cause the connectivity circuitry 544 to transmit a low-power state indicator (e.g., via a physical uplink control channel (PUCCH)). In an example, the video frame decoding/rendering circuitry 542 may cause the connectivity circuitry 544 to transmit a low-power state indicator upon outputting the XR video frame from DPB 714. In another example, the video frame decoding/rendering circuitry 542 may cause the connectivity circuitry 544 to transmit a low-power state indicator upon determining a frame reproduction threshold is satisfied when the scheduled entity 500 has received a particular number of encoded slices, such as when the plurality of encoded packets are arriving into the CPB memory 720. In another example, the video frame decoding/rendering circuitry 542 may cause the connectivity circuitry 544 to transmit a low-power state indicator upon determining a frame reproduction threshold is satisfied when the DPB 714 outputs the reproduced XR video frame (e.g., as part of an XR video stream).

In some examples, the video frame decoding/rendering circuitry 542 may be configured to perform any of the XR video frame reproduction (e.g., replaying, generating, etc.) techniques described in this disclosure. For instance, the video frame decoding/rendering circuitry 542 may decode and/or assemble a plurality of packets in an XR content burst to reproduce an XR video frame. In this way, the video frame decoding/rendering circuitry 542 may be considered to include one or more processors implemented in circuitry and configured to reproduce an XR video frame from a plurality of encoded downlink (DL) packets. In another example, the video frame decoding/rendering circuitry 542 may be considered to include one or more processors implemented in circuitry and configured to determine and signal the end of an XR video frame to cause the scheduled entity 500 to transmit a low-power state indicator to a scheduling entity 108.

Figure 8:
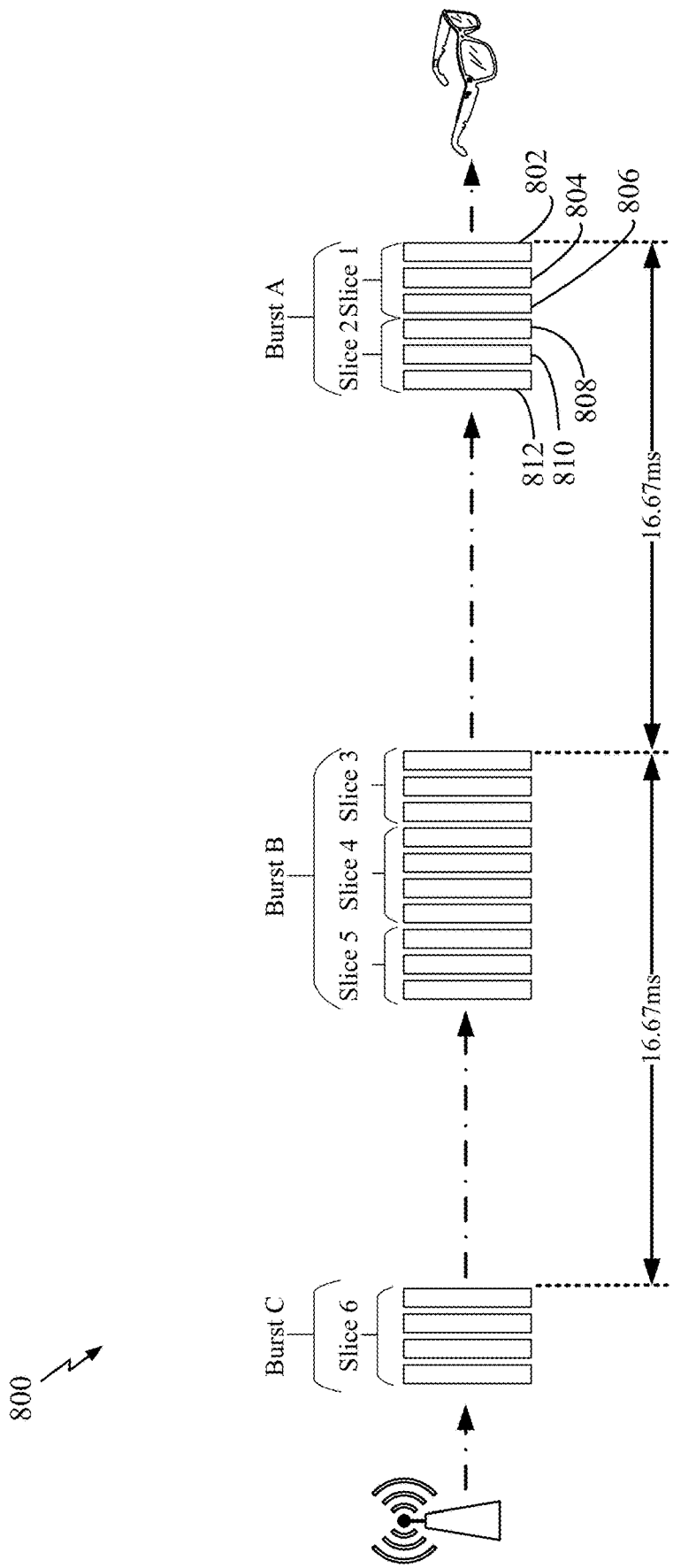
FIG. 8 is a conceptual illustration of an example flow of DL XR traffic according to some embodiments, as illustrated in FIG. 7.

FIG. 8 is a conceptual illustration of an example traffic flow 800 for communication of packets according to some embodiments. The communication of the packets (e.g., transport blocks (TBs)) may correspond to various slices (e.g., files) for reproducing an extended reality (XR) video frame, as described, for example, with reference to FIG. 7. In an example, an XR content burst may communicate an XR video frame to a scheduled entity 106 via a plurality of packets (e.g., a full set of packets or TBs). The example traffic flow 800 may correspond to an XR video stream generated at a scheduling entity 108 (e.g., the scheduling entity 400 of FIG. 4) and scheduled (e.g., via scheduler circuitry 440) for transmitting to a user equipment (UE) 106 (e.g., XR-enabling equipment). In an illustrative and non-limiting example, the XR video stream may correspond to a frame rate of 60 Hz (60 frames/second). As such, the scheduling entity 108 may transmit the XR video stream at that frame rate with approximately 16.67 milliseconds (ms) between a first DL transmission of the first subset of packets of a first XR content burst, and transmission of a first subset of packets of a next XR content burst. While shown as having 16.67 ms between bursts, which may correspond to a 60 Hz frame rate, the techniques of this disclosure are not so limited, and it will be understood that different frame rates, in various different instances, may yield different amounts of time between bursts. That is, the rate at which the XR video frames are generated and/or transmitted may correspond to a predetermined frame rate (in Hz).

In an illustrative example and non-limiting example, a first subset of packets 802, 804, 806 of the first plurality of packets may correspond to a first slice (e.g., slice 1), and a second subset of packets 808, 810, and 812 of the first plurality of packets may correspond to a second slice (e.g., slice 2). In such examples, slices 1 and 2 represented by the first plurality of packets may correspond to a single XR video frame. As such, a scheduled entity 106 may utilize video frame decoding/rendering circuitry 542 to decode the first subset of packets 802, 804, 806 and the second subset of packets 808, 810, and 812, as discussed, for example, with reference to FIG. 7, and reproduce the XR video frame in an XR video stream. In an example, the scheduled entity 106 may decode the first plurality of packets (e.g., a set of TBs) to reproduce an XR video frame that was then represented by the first subset of packets 802, 804, 806 and the second subset of packets 808, 810, and 812.

In some examples, a scheduling entity 108 may transmit the slices (e.g., files) to a scheduled entity 106 in multiple bursts. In an illustrative and non-limiting example, a scheduling entity 108 may transmit slice 1 and slice 2 in a first burst of XR content (e.g., burst A); slice 3, slice 4, and slice 5 in a second burst of XR content (e.g., burst B); and slice 6 in a third burst of XR content (e.g., burst C).

In some examples, the traffic flow 800 may correspond to a guaranteed bit rate (GBR), which may be preconfigured by a radio access network (RAN) (e.g., RAN 104 and/or RAN 200). In addition, the packets of the traffic flow 800 may correspond to a packet delay budget (PDB) and/or packet error rate (PER).

As described herein, certain 5G wireless communication systems (e.g., wireless communication system 100), including scheduling entities 108, may only be aware of packet-level metrics when providing downlink (DL) transmissions including packets of XR video data. That is, a scheduling entity 108 may track XR traffic flow on a per packet basis, such as by transmitting data pursuant to a packet error rate (PER) metric and/or a packet delay budget (PDB) metric. In some examples, a scheduling entity 108 may apply such metrics to determine whether to retransmit one or more packets during a given XR content burst (e.g., XR content burst 606A). In an example, a scheduling entity 108 may retransmit one or more packets upon determining that the packet error rate (PER) exceeds a PER retransmission threshold.

In some examples, the scheduling entity 108 may also delay a scheduled entity 106 from furthering its intentions of entering a low-power state at the end of a particular XR content burst for a definite or indefinite period of time. In an illustrative example, the scheduled entity 106 may determine to transmit a low-power state indicator (e.g., a low-power state request, etc.) to a scheduling entity 108. The scheduled entity 106 may do so upon decoding a plurality of downlink (DL) packets (e.g., the first subset of packets 802, 804, and 806; and the second subset of packets 808, 810, and 812) to reproduce an XR video frame of an XR content burst (e.g., burst A of FIG. 8). The scheduling entity 108 may, in turn, receive the low-power state indicator (e.g., the request). In some examples, the scheduling entity 108 may delay, or forgo entirely, a granting of the request for a scheduled entity 106 to enter its low-power state. In an example, the scheduling entity 108 may delay transmitting a grant indicator until the scheduling entity 108 is able to retransmit (e.g., via scheduler circuitry 440) any DL packets of the given XR content burst (e.g., a particular subset of packets) to then satisfy a PER threshold, for example.

In addition or alternatively, an external data network 110 (e.g., an XR service provider via service provider server(s) 252) may, in some instances, specify a set of XR frame reproduction threshold parameters. Instead of being on the basis of packets, however, the frame reproduction threshold parameters may, in some instances be on the basis of slices (e.g., files) reproduced from a plurality of encoded downlink (DL) packets (e.g., packets 802, 804, 806, 808, 810, and 812 for burst A in FIG. 8).

In an illustrative example, the external data network 110 may specify a slice error rate (rather than packet error rate) as providing the frame reproduction threshold that the scheduled entity 106 may utilize to determine whether a given set of packets (e.g., the first subset of packets for slice 1 and the second set of packets for slice 2) include information sufficient to reproduce a particular XR video frame. In instances where a slice error rate threshold parameter is not satisfied, the scheduled entity 500 may assume additional encoded downlink (DL) packets are expected to arrive before the scheduled entity 106 may reproduce the corresponding XR video frame for a particular XR content burst (e.g., burst B, burst C, etc.). Moreover, reliability requirements of slices (e.g., files) may vary and may factor into the frame reproduction threshold, in various instances. In an example, the reliability requirements for a frame reproduction threshold may differ for intra-coded frames (I-frames) versus predicted frames (P-frames), as one example.

In some examples, the external data network 110 may specify a policy with regards to the handling of slices. For instance, the external data network 110 (e.g., executing an XR application) may specify that a scheduled entity 500 may use a particular slice (e.g., a file) to decode an XR video frame only if the scheduled entity 500 receives all packets (e.g., all TBs) of the slice. In another example, the XR application may specify that the scheduled entity 500 may utilize a contiguous stream of packets (e.g., the encoded video bitstream in FIG. 7) to decode all, or parts of, an XR video frame up to a first packet-in-error occurrence.

In such examples, a scheduled entity 500 may reproduce a set of XR video frames in an XR video stream pursuant to slice-level metrics (e.g., burst parameters corresponding to XR content bursts) and/or packet-level metrics (e.g., PER). Such metrics may, in various instances, form the basis for a frame reproduction threshold. The scheduled entity 500 may use the frame reproduction threshold to determine the boundaries of any given XR content burst, such that the scheduled entity 500 may exploit time between bursts for power savings. In an example, the radio access network (RAN) may receive or determine one or more burst parameters associated with XR content bursts of slice transmissions (e.g., downlink XR content bursts, uplink XR content bursts, etc.). The radio access network (RAN) may set the frame reproduction threshold for the scheduled entity 500 based on the one or more burst parameters. The frame reproduction threshold may enable the scheduled entity 500 to reduce its power consumption between XR content bursts upon transmitting a low-power state indicator to a scheduling entity 108.

In some examples, a set of low-power state parameters may indicate a low-power state duration (e.g., when the scheduled entity 500 is not monitoring its receiver for signals) corresponding to monitoring and/or skipping its monitoring for downlink (DL) control signaling (e.g., PDCCH), and/or corresponding to various discontinuous reception (DRX) cycles. In such examples, and as a result of the low-power state indicator being transmitted by a scheduled entity 500 (e.g., a UE) to a scheduling entity 108 (e.g., a base station (BS)), the scheduled entity 500 may then be capable, for example, of supporting XR traffic communications for longer periods of time due to the improved power savings over time.

It should be noted that while the present disclosure may at times discuss a given XR content burst generally as communicating an XR video frame, the techniques of this disclosure are not so limited. A person of ordinary skill in the art will understand that an XR content burst, in accordance with one or more of the various techniques of this disclosure, may similarly communicate a plurality of XR video frames. In such examples, a scheduling entity 108 may transmit the XR content bursts with some predetermined amount of time between the XR content bursts. In any case, the scheduling entity 108 may still transmit the various DL transmissions of a given XR content burst with gaps (e.g., one or more slots) between some or all of the DL transmissions in a particular burst of XR content.

In addition, while the description that follows refers to FIGS. 9-15, which generally illustrate processes that take place at a scheduled entity 106 (e.g., an XR-enabling device, etc.), it is to be understood that this disclosure is not limited to operations or processes at a scheduled entity 106. That is, the description that follows also describes processes and operations that take place at a scheduling entity 108 (e.g., a base station (BS), another user equipment (UE), etc.). In any case, the present disclosure is written to fully disclose operations at both endpoints of a signaling exchange between a scheduled entity 106 and a scheduling entity 108.

Examples of a User Equipment (UE) Transmitting a Notification for Physical Downlink Control Channel (PDCCH) Skipping FIG. 9 is a timeline 900 illustrating an example of a user equipment (UE)-based approach for discontinuous physical downlink control channel (PDCCH) monitoring (DPM), for power saving in an extended reality (XR)-enabled communication system in accordance with some embodiments. FIG. 10 is a flow chart illustrating a corresponding exemplary process 1000 for a UE-based approach for DPM, for power saving in an XR-enabled communication system in accordance with some embodiments. As described herein, a particular implementation may omit some or all illustrated features, and may not require some illustrated features to implement all embodiments. In some examples, the process 1000 may be carried out by a scheduled entity 106/500 (e.g., a UE), as illustrated, for example, in one or more of FIGS. 1, 2, and/or 5 (e.g., an XR-enabling device) and/or by a scheduling entity 108/400 (e.g., a base station (BS), a second UE, etc.), described, for example, with reference to FIGS. 1, 2, and/or 4. In some examples, any suitable apparatus or means for carrying out the functions or algorithm described herein may carry out the process 1000.

Referring to FIG. 9, the top line 902 illustrates timing of a set of downlink (DL) transmissions from the point of view of a scheduling entity 108 (e.g., a BS). As described above, such DL transmissions may exhibit bursty traffic characteristics, such as when the DL transmissions correspond to XR content. The bottom line 904 illustrates timing of the same set of DL transmissions from the point of view of a scheduled entity 106 (e.g., an XR-enabling device) as the scheduled entity 106 receives the set of DL transmissions from the scheduling entity 108. In some examples, the vertical axis may represent a relative size of the DL transmission (e.g., a number of transport blocks (TBs)). In some examples, the vertical axis may represent a relative amount of power consumption corresponding to the transmitting and receiving of a given DL transmission.

As illustrated, the scheduled entity 106 may receive a first set of DL transmissions from the scheduling entity 108 in a first XR content burst 906A. The scheduled entity 106 may receive a given DL transmission including a subset of packets after a short time for a propagation delay 912. In such examples, a DL transmission may include a subset of packets representing at least a portion of an XR video frame. In some examples, the first set of DL transmissions of the first XR content burst 906A may include a plurality of packets including at least the subset of packets.

As the scheduled entity 106 is receiving the plurality of XR content packets, the scheduled entity 106 may send the received information (e.g., the received XR content packets) to an upper layer of the scheduled entity 106 (e.g., its application layer). The upper layer of the scheduled entity 106 may then reassemble and decode the content of the XR video frame (e.g., the plurality of XR content packets) to reproduce (e.g., generate) the XR video frame. By virtue of this activity, as described above, the scheduled entity 106 may determine when it has received packets corresponding to the entire XR video frame. In an example, the scheduled entity 106 may receive a plurality of packets over time in an XR content burst. The plurality of packets may together represent information sufficient to reproduce the XR video frame. The scheduled entity 106 may determine when it has received all video slices for reproducing the full XR video frame by decoding the slices using any suitable video decoding means. In an example, the scheduled entity 106 may decode the slices using intra-prediction or inter-prediction coding. When the scheduled entity 106 has received the last of the plurality of packets of an XR content burst 906A, the scheduled entity 106 may determine that it has received the full XR video frame.

Accordingly, an upper layer (e.g., an application layer) of the scheduled entity 106 may notify one or more lower layer(s) of the scheduled entity 106 (e.g., its medium access control (MAC) entity layer and/or its physical (PHY) layer) that video frame decoding is complete. In another example, the upper layer may notify the one or more lower layer(s) of the scheduled entity 106 that the scheduled entity 106 has information sufficient to reproduce (e.g., display) the XR video frame. Thus, the lower layer(s) of the scheduled entity 106 may determine that the scheduling entity 108 has completed its transmission of all XR content packets for a given XR content burst (e.g., XR content burst 906A). In addition, the lower layer(s) of the scheduled entity 106 may conclude that the scheduled entity 106 may not expect to receive any further XR content packets for that XR video stream for a predetermined amount of time 910. That is, the scheduled entity 106 may not expect to receive any further XR content packets for that XR video stream until a subsequent frame interval coinciding with the beginning of a next frame generation periodicity (FGP). In such examples, the subsequent frame interval may coincide with the start of a next XR content burst 906B. Prior to the subsequent frame interval, the scheduled entity 106 may not expect to receive any XR content packets.

Upon determining the scheduled entity 106 has received information sufficient to reproduce the video frame, the scheduled entity 106 may transmit a low-power (LP) state indicator (e.g., a low-power state notification) to the scheduling entity 108 indicating an intention of the scheduled entity 106, where the scheduled entity 106 intends to enter a low-power state. In an illustrative example, the scheduled entity 106 may transmit an LP state notification 908 to the scheduling entity 108 indicating that the scheduled entity 106 is entering into a low-power state (e.g., a sleep state, an inactive state, an unreachable state, etc.). The scheduling entity 108 may receive the LP state notification from the scheduled entity 106, in some instances, after a corresponding propagation delay.

The scheduled entity 106 may then discontinue monitoring for PDCCH transmissions until such a time as the scheduled entity 106 expects a next video frame to be transmitted by, and/or received from, a scheduling entity 108. The scheduled entity 106, in some instances, may account for the propagation delay from the scheduling entity 108 to the scheduled entity 106 when determining when to resume its monitoring 914 for PDCCH. In any case, the scheduled entity 106 may perform discontinuous PDCCH monitoring (DPM) or PDCCH skipping for a predetermined amount of time 910, for example, until the start of a next XR content burst 906B.

Referring now to FIG. 10, it may be assumed that a scheduled entity 106 may begin process 1000 in a low-power state (e.g., a sleep state, de-powered state, etc.). In the present disclosure, the low-power state that a scheduled entity 106 may employ generally refers to any suitable power saving (PS) mode that reduces power consumption at the scheduled entity 106, for example, relative to its wake-up state (e.g., its 'ON' or 'awake' state). In an example, a scheduled entity 106 may be operating in a low-power state (e.g., with a suitable reduction in power consumption) when the scheduled entity 106 is skipping (e.g., discontinuing) its monitoring for certain downlink (DL) transmissions, such as for physical DL control channel (PDCCH) transmissions.

This skipping may include the scheduled entity 106 de-powering one or more its components, such as its transceiver 510, for example. In an illustrative and non-limiting example, the scheduled entity 106 may de-power one or more power amplifiers of a receiver, such as its transceiver 510. While this disclosure at times discusses entry into a low-power state as involving a de-powering of one or more components of the scheduled entity 106 (e.g., of the scheduled entity 500 described with reference to FIG. 5), the techniques of this disclosure are not so limited. A person of ordinary skill in the art will understand that a scheduled entity 106 may enter into a low-power state using a variety of different techniques. In an example, a scheduled entity 106 may implement temporary sleep modes that, in such examples, mimic discontinuous reception (DRX) sleep techniques. In any case, a low-power state for a scheduled entity 106 may generally correspond to the scheduled entity 106 performing any suitable power reduction measures, at least including discontinuing monitoring for PDCCH transmissions on a given carrier or, in some instances, on a subset of component carriers in a set of carriers. In some examples, this may be done based on a multi-cell DPM technique where DPM is performed relative to a particular group of serving cells of the of the scheduled entity 106 (e.g., in a multi-cell implementation).

In some examples, the scheduled entity 106 may continue to perform certain operations while operating in its low-power state. In some examples, the scheduled entity 106 may perform, while in a low-power state, operations including monitoring for a channel state information reference signal (CSI-RS), transmitting a sounding reference signal (SRS), etc. In some instances, in its low-power state and while continuing to monitor for PDCCH transmissions on one or more cells (e.g., component carriers) in a set of cells, the scheduled entity 106 may skip monitoring for PDCCH on one or more other cells in the set of cells. In another example, the scheduled entity 106, in its low-power state may perform activities related to gaining, or regaining, initial access to a cell.

At block 1002, a scheduled entity 106 may determine whether a frame generation periodicity (FGP) timer has expired. In an example, a scheduled entity 106 may initialize such a timer to zero, or any other suitable value; and the timer may count down to zero or count to another predetermined value. As such, the scheduled entity 106 may determine whether the timer is still running or otherwise, has expired. In some instances, a plurality of timers may be running for different serving cells of the scheduled entity 106.

If the timer has not yet expired (NO at block 1002), the scheduled entity 106 may remain in its low-power state until the timer expires. The scheduled entity 106 may set the FGP timer to expire at frame interval to start an expected XR content burst (e.g., the beginning of an FGP). In an example, the scheduled entity 106 may determine a rate at which the scheduling entity 108 is transmitting XR content bursts, such as based on a frame rate of a corresponding XR video stream. The scheduled entity 106 may determine and set an expiration parameter for the FGP timer based on when a previous XR content burst began and the rate at which the scheduling entity 108 is transmitting such XR content bursts. In some examples, the scheduled entity 106 may receive a timer parameter from the network. In an example, a radio resource control (RRC) may configure At block 1004, the scheduled entity 106 may wake up from a low-power state (e.g., its sleep state) to then, for example, enter its wake-up state. That is, the scheduled entity 106 may wake up from its low-power state once the FGP timer expires (YES at block 1002). In an example, the scheduled entity 106 may power one or more of its components, such as one or more power amplifier(s) of its transceiver 510, to begin monitoring for a first DL transmission.

At block 1008, the scheduled entity 106 may monitor for DL transmissions (e.g., PDCCH transmissions) of control information (e.g., downlink control information (DCI) 114) indicating DL data for the scheduled entity 106 (e.g., in a data region 314). That is, in its wake-up state, the scheduled entity 106 may begin monitoring for PDCCH transmissions from a scheduling entity 108. In some examples, a scheduled entity 106 and scheduling entity 108 may utilize any one or more of the discontinuous PDCCH monitoring (DPM) techniques of this disclosure in combination with a discontinuous reception (DRX) feature. In such examples, the scheduled entity 106 may omit a frame generation periodicity (FGP) timer, replace use of the FGP timer with a DRX timer, or otherwise deprioritize use of an FGP timer when performing a particular DPM technique. In an example, a scheduled entity 106 configured for DRX may wake up at a time when a DRX timer expires. Here, the wake-up time for the scheduled entity 106 is coordinated with the scheduling entity 108, such that the scheduling entity 108 is informed of the time when the scheduled entity 106 will be waking up. Once the scheduled entity 106 wakes, the scheduled entity 106 may then begin a DRX 'on-duration' timer and a DRX cycle timer. At this point, the scheduled entity 106 may monitor for PDCCH transmissions as described with reference to block 1008.

At block 1010, the scheduled entity 106 may detect downlink (DL) control information (DCI) in a PDCCH transmission. In such instances, the DCI may indicate DL data is scheduled for the scheduled entity 106. The DL data may represent one or more XR content packets (e.g., one or more transport blocks (TBs)) corresponding to an XR video frame.

At block 1012, the scheduled entity 106 may receive, from the scheduling entity 108, one or more packets (e.g., transport blocks (TBs)). These packets may include XR content, and may be at least a portion of an XR content burst (e.g., XR content burst 906A). As the scheduled entity 106 receives the XR content packets (e.g., using one or more lower layer(s) of the scheduled entity 106), the scheduled entity 106 sends the received packets to an upper layer (e.g., an application layer) of the scheduled entity 106. In an example, the scheduled entity 106 may pass the received XR content packets from a first layer (e.g., a lower layer) of the scheduled entity 106 to a second layer (e.g., an application layer) of the scheduled entity 106. In such examples, the first layer of the scheduled entity 106 is separate and distinct from the second layer of the scheduled entity 106.

At block 1014, the upper layer of the scheduled entity 106 reassembles and decodes the XR content packets and attempts to form a complete XR video frame. In some instances, the complete XR video frame may include audio data, as well. In another example, the complete XR video frame may include video data, where an audio file may be integrated with the XR video frame later.

At block 1016, the scheduled entity 106 may determine whether the scheduled entity 106 has received a complete XR video frame. The scheduled entity 106 may utilize any suitable means to determine when the scheduled entity 106 has a plurality of packets representing information sufficient to reproduce an XR video frame. In an example, the scheduled entity 106 may determine that the scheduled entity 106 has received information sufficient to decode and/or display the XR video frame in an XR video stream.

In instances where the scheduled entity 106 has not yet received the complete XR video frame (NO at block 1016), the process may return to block 1008. In such instances, the scheduled entity 106 may continue monitoring the physical downlink (DL) control channel (PDCCH) for further scheduling of packets corresponding to the XR video frame of the XR content burst 906A. While monitoring for PDCCH, the scheduled entity 106 may remain in the wake-up state (e.g., the 'ON' or 'awake' state, in contrast to the low-power state described above) until the scheduled entity 106 determines that it may enter the low-power state.

In some examples, an upper layer of the scheduled entity 106 (e.g., the application layer of the scheduled entity 106) may process the plurality of packets to determine when the scheduled entity 106 has obtained information, with the plurality of packets, sufficient to reproduce (e.g., replay, generate, display, store, encode, etc.) an XR video frame. Accordingly, the upper layer of the scheduled entity 106 may determine when the scheduled entity 106 has obtained the complete XR video frame.

In some examples, the scheduled entity 106 may determine the scheduled entity 106 has information sufficient to reproduce the full XR video frame (YES at block 1016). In an example, the upper layer of the scheduled entity 106 (e.g., its application layer) may notify one or more lower layer(s) of the scheduled entity 106 (e.g., its medium access control (MAC) layer entity and/or its physical (PHY) layer) that the scheduled entity 106 has information sufficient to generate the XR video frame. In an illustrative example, the upper layer of the scheduled entity 106 may notify the MAC layer entity of the scheduled entity 106 that the scheduled entity 106 has received the complete XR video frame from the scheduling entity 108. In another example, the upper layer of the scheduled entity 106 may notify the MAC layer entity of the scheduled entity 106 that a plurality of XR content packets received at the scheduled entity 106 represent information sufficient to reproduce the XR video frame. In any case, the scheduled entity 106 may determine whether it has received, from a scheduling entity 108, a complete XR video frame representing the completion of a given XR content burst (e.g., XR content burst 906A).

At block 1018, the scheduled entity 106 may transmit a low-power (LP) state indicator (e.g., an LP state notification) to the scheduling entity 108 to notify the scheduling entity 108 that the scheduled entity 106 intends on entering its low-power state for a predetermined amount of time. While operating in the LP state, the scheduled entity 106 may discontinue monitoring for PDCCH transmissions until a time corresponding to when the scheduled entity 106 may expect a next XR video frame transmission and/or the arrival of the next XR video frame. The low-power (LP) state indicator (e.g., a LP state notification) may be any suitable information element in an uplink (UL) transmission, including but not limited to UL control information (UCI) carried on the physical UL control channel (PUCCH). In an example, the LP state indicator may include a multi-cell indication notifying the scheduling entity 108 that the scheduled entity 106 intends on entering the low-power state for a subset of cells in a set of cells, such as an otherwise active group of service cells.

In such examples, a scheduling entity 108 (e.g., a base station (BS)) may receive the LP state indicator (e.g., an LP state notification 908) from the scheduled entity 106. The scheduling entity 108 may utilize the LP state indicator (e.g., the notification) received from the scheduled entity 106 as effectively an instruction for the scheduling entity 108 to not schedule data transmissions for that scheduled entity 106 at least until the time of the next expected video frame transmission. In such examples, the scheduling entity 108 may determine not to schedule a next XR content burst for the scheduled entity 106 until the scheduling entity 108 expects the scheduled entity 106 may be actively monitoring for PDCCH again. In this way, the scheduled entity 106 and the scheduling entity 108 may have coordinate when to resume DL transmissions of a next video frame, and likewise, when to resume monitoring for the DL transmissions of the next XR video frame, such that the scheduled entity 106 may remain in a low-power state in the interim for power savings (PS).

At block 1020 (which, as above, may correspond to an example where a scheduled entity 106 is not concurrently configured for discontinuous reception (DRX)), the scheduled entity 106 may set a frame generation periodicity (FGP) timer to a value corresponding to the next expected XR video frame transmission, and the process may return to block 1002. In this way, the scheduled entity 106 may skip (e.g., discontinue) monitoring for physical downlink (DL) control channel (PDCCH) transmissions until expiration of the FGP timer.

The value utilized for the FGP timer may be, but need not necessarily be, set to a time corresponding to the precise expected XR video frame transmission based on the frame rate of the XR content stream (e.g., 60 Hz, 120 Hz, etc.). In some instances, there may be some degree of jitter in the timing between the DL transmission of one or more XR video frames. Accordingly, in some examples, the scheduled entity 106 may set the FGP timer such that the scheduled entity 106 wakes up from its low-power (LP) state at a suitable time before the scheduled entity 106 expects a next XR video frame transmission will begin (e.g., with a next XR content burst 906B).

In such examples, however, if the scheduled entity 106 were to wake too early, the scheduled entity 106 may then be monitoring one or more physical downlink (DL) control channels (PDCCHs) that lack DL control information (DCI) scheduling XR content packets for the scheduled entity 106. Such early monitoring may cause a potentially avoidable increase in power consumption at the scheduled entity 106. Accordingly, in some examples, the scheduled entity 106 may set a timer for the scheduled entity 106 (e.g., the FGP timer, a DRX timer, etc.) such that the scheduled entity 106 is set to wake up from its low-power state at a suitable time that coincides with when, or in some examples, later than the next expected XR video frame transmission is expected to begin. In a non-limiting example, the scheduled entity 106 may wake up from its low-power state with a difference of approximately one slot before or after the scheduled entity 106 begins receiving the next XR content burst. In another example, the scheduled entity 106 may wake up from its low-power state after the start of a next XR content burst with a difference of two or more slots.

In some examples, it may be possible that the scheduled entity 106 misses one or more PDCCH transmissions. In an example, a scheduling entity 108 may have transmitted a PDCCH transmission to indicate to the scheduled entity 106 that the scheduling entity 108 had scheduled downlink (DL) data for the scheduled entity 106. The DL data may include a set of XR content packets corresponding to at least a portion of a XR video frame. In such instances, without such XR content packets corresponding to the XR video frame, a scheduled entity 106 may lack information sufficient to generate the XR video frame, and thus, may be unable to reproduce the XR video frame due to the missing DL data.

The scheduled entity 106 and the scheduling entity 108 may address missing such downlink (DL) transmissions in various ways. In an example, the scheduled entity 106 may set a wake timer (e.g., a frame generation periodicity (FGP) timer and/or a discontinuous reception (DRX) timer) to trigger the scheduled entity 106 to enter its wake-up state at a time later than a next expected XR content burst. In such instances, the scheduled entity 106 may set the FGP timer to expire within a retransmission window. In this way, the scheduled entity 106 may wake from its low-power state at a time later than an expected next XR content burst without necessarily compromising the XR experience. In an example, the XR experience may be compromised when the scheduled entity 106 completely misses DL data for generating one or more XR video frames in a video stream in such a way that the scheduled entity 106 may not recover the missing DL data.

In an illustrative example, the scheduling entity 108 may keep these packets in its queue for transmission to the scheduled entity 106, until the scheduling entity 108 receives an acknowledgment (e.g., a hybrid automatic repeat request (HARQ) acknowledgment (HARQ-ACK), etc.) from the scheduled entity 106 indicating that the scheduled entity 106 correctly received and/or correctly decoded the DL packets. The scheduled entity 106 may do this before passing the XR content packets from a lower layer of the scheduled entity 106 (e.g., its medium access control (MAC) layer entity) to an upper layer of the scheduled entity 106 (e.g., its application layer) for subsequent processing.

In some examples, a scheduled entity 106 may miss a particular physical downlink (DL) control channel (PDCCH) transmission from a scheduling entity 108. In an example, the scheduled entity 106 may miss the PDCCH transmission in instances where the scheduled entity 106 is operating in a low-power state and/or is still transitioning from its low-power state to its awake power state. In such a low-power state, a scheduled entity 106 may discontinue its monitoring for PDCCH transmissions for a particular amount of time before the scheduled entity 106 initiates its first power state (e.g., its awake or 'ON' power state). In another example, a scheduled entity 106 may miss the PDCCH in instances where the scheduled entity 106 is unable to successfully process the contents of the particular PDCCH transmission (e.g., the set of XR content packets of the DL transmission). In another example, the scheduled entity 106 may be unable to decode information of the PDCCH sufficient for reproducing an XR video frame corresponding to the XR content burst), the scheduling entity 108 may retry its transmission of the corresponding packet or packets a certain number of times.

In some examples, the scheduling entity 108 may keep the XR content packets queued for the scheduled entity 106 until a maximum DL delay (corresponding to the DL delay timer, described above) has expired. In such examples, the scheduling entity 108 may discontinue retransmission attempts of a given set of XR content packets after a certain amount of time has transpired. that, if retransmitted at that particular point in time, would then meet or exceed a threshold DL delay time (e.g., a maximum DL delay time predetermined for the XR video stream). In an illustrative example, a scheduled entity 106 may wake from its low-power state at a time later than when a next XR video frame transmission (e.g., a next XR content burst 906B) is expected to begin. However, as long as the scheduled entity 106 wakes before the scheduling entity 108 discontinues its retransmission attempts of the corresponding XR content packets, the scheduled entity 106 may be enabled to still achieve, even with a late wake time, further reduction in power consumption without resulting in a violation of the DL delay time specified for the XR video stream.

In some examples, a scheduled entity 106 and a scheduling entity 108 may utilize one or more of the various discontinuous PDCCH monitoring (DPM) techniques of this disclosure in combination with a discontinuous reception (DRX) feature. In such examples, the scheduled entity 106 may omit such an FGP timer described above, for example, in connection with blocks 1002 and 1020. Rather, the scheduled entity 106 may transmit the low-power (LP) state notification 908 to the scheduling entity 108 and enter a low-power state (e.g., a sleep state) without starting an FGP timer. Instead, the scheduled entity 106 may utilize one or more DRX timer(s) (e.g., one or more ongoing DRX timer(s)) to determine a suitable wake-up time to then begin monitoring for DL transmissions, such as for PDCCH transmissions, in a next XR content burst 906B.

Users of XR-enabling devices expect longevity in their devices. Such XR-enabling devices may perform power intensive operations to receive XR service traffic (e.g., XR data packets), decode XR video frames (e.g., to generate XR video frames in an XR video stream), and display XR video frames in an XR application. In accordance with one or more of the various techniques of the disclosure, an XR-enabling device may implement certain processes to extend the longevity of the battery of the XR-enabling device and present XR video frames to a user at an appropriate speed (e.g., the frame rate) so as not to cause the user to become disoriented when XR video frames are not displayed properly to a user of the XR-enabling device.

Figure 12:
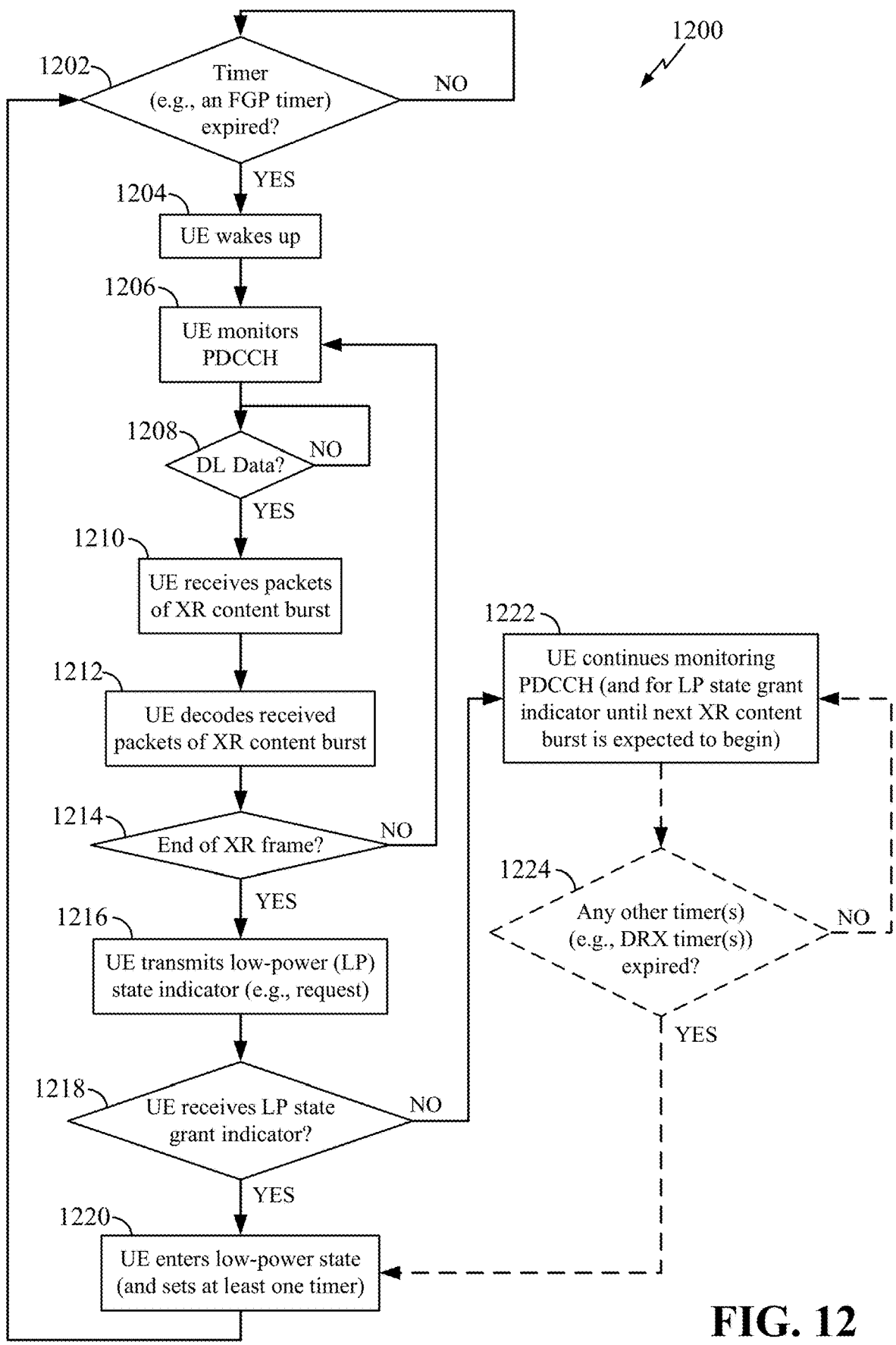
FIG. 12 is a flow chart illustrating an exemplary process for a UE-based discontinuous control channel monitoring technique according to some further embodiments, as illustrated in FIG. 11.

Examples of a User Equipment (UE) Transmitting a Request to Perform Physical Downlink Control Channel (PDCCH) Skipping FIG. 11 is a timeline 1100 illustrating another example of a user equipment (UE)-based approach for power saving in an extended reality (XR)-enabled communication system in accordance with some embodiments. FIG. 12 is a flow chart illustrating a corresponding exemplary process 1200 for a UE-based approach for power saving in an XR-enabled communication system in accordance with some embodiments. As described herein, a particular implementation may omit some or all illustrated features, and may not require some illustrated features to implement all embodiments. In some examples, the process 1200 may be carried out by a scheduled entity 106/500 (e.g., a UE), as illustrated, for example, in one or more of FIGS. 1, 2, and/or 5 (e.g., an XR-enabling device), in coordination with a scheduling entity 108/400 (e.g., a base station (BS), a second UE, etc.), described, for example, with reference to FIGS. 1, 2, and/or 4. In some examples, any suitable apparatus or means for carrying out the functions or algorithm described herein may carry out the process 1200.

The process shown and described with reference to FIGS. 11 and 12 is essentially the same as the one shown and described with reference to FIGS. 9 and 10. The process of FIGS. 9 and 10, however, included the scheduled entity 106 transmitting a first type of low-power (LP) state indicator (e.g., the LP state notification 908) to the scheduling entity 108. There, the first type of LP state indicator was to indicate that the scheduled entity 106 had the corresponding intention to discontinue monitoring for physical downlink control channel (PDCCH) transmissions until a next XR content burst 906B. That is, the scheduled entity 106 would, at that time, discontinue PDCCH monitoring for a particular amount of time 910 for power savings.

Here, the process described with reference to FIGS. 11 and 12 includes the scheduled entity 106 transmitting a low-power (LP) state indicator of another type (e.g., a low-power state request) to a scheduling entity 108 requesting permission to discontinue monitoring for PDCCH transmissions until a next XR content burst 1106B.

In an example, the scheduled entity 106 may transmit a low-power (LP) state request 1108 to a scheduling entity 108 requesting that the scheduling entity 108 grant the scheduled entity 106 permission to skip (e.g., discontinue) its monitoring for PDCCH transmissions for a predetermined amount of time 1112 (e.g., until a next XR content burst 1106B is expected to start). In an example, the scheduled entity 106 may provide its request 1108 on discontinuous PDCCH monitoring (DPM) to the scheduling entity 108 at a time following an XR content burst 1106A. In some examples, the scheduled entity 106 may include its low-power state request 1108 with uplink (UL) control information (UCI) provided in a UL transmission to the scheduling entity 108. In some instances, the scheduled entity 106 may include a multi-cell DPM indication with the low-power state request 1108.

In some examples, the scheduled entity 106 may remain in its 'awake' state (e.g., its 'ON' or 'wake-up' state) until the scheduled entity 106 receives a low-power (LP) state grant indicator (e.g., a set of LP instructions) from the scheduling entity 108. While waiting to receive the LP state grant indicator, the scheduled entity 106 may continue monitoring for DL transmissions while operating in its first power state (e.g., its 'awake' state, etc.) for a period of time 1104. In an example, the scheduled entity 106 may continue monitoring for DL transmissions, even though the scheduled entity 106 may have already determined the scheduled entity 106 has received, in the XR content burst 1106A, a predetermined amount of DL data sufficient to generate an XR video frame. In such examples, the scheduled entity 106 may continue monitoring for DL transmissions until the scheduled entity 106 receives the LP state grant indicator 1110 from the scheduling entity 108. In such examples, the LP state grant indicator 1110 may grant the scheduled entity 106 with one or more permissions to enter its low-power state, for example, in accordance with how the scheduled entity 106 intended, or in some cases, with some modifications to what the scheduled entity 106 intended to achieve with the low-power state.

In some examples, the scheduled entity 106 may indicate a group of serving cells in its request on DPM. In another example, the scheduling entity 108 may indicate a group of serving cells in its low-power state grant indicator 1110 that may or may not correspond to any groups of serving cells indicated in the LP state request 1108. In any case, the LP state grant indicator and/or the LP state request 1108 may include a multi-cell DPM indication. The multi-cell DPM indication may include a bitmap that indicates which cells in a set of cells (e.g., component carriers) are set for the low-power state and which cells in the set of cells are not to be used for the low-power state in one or more FGPs.

When the scheduled entity 106 receives a low-power (LP) state grant indicator 1110 from the scheduling entity 108, the scheduled entity 106 may enter its LP state in accordance with the low-power (LP) state grant indicator 1110. In such examples, the scheduled entity 106 may perform DPM for a predetermined amount of time 1112 until a next XR content burst 1106B is expected to start. In an example, the scheduled entity 106 may set one or more timers (e.g., FGP timers, DRX timers, etc.) that correspond to when the next XR content burst 1106B is expected to start. In an illustrative example, for a 60 Hz frame rate, the scheduled entity 106 would expect the next XR content burst 1106B would be expected to start approximately 16.67 ms following the start of a previous XR content burst 1106A. In some instances, certain propagation delays, processing times, and/or jitter may cause the next XR content burst 1106B to not arrive at an exact time as predicted. In such instances, the scheduled entity 106 may calculate and account for such differences when determining an expiration time value for the one or more timers. Once the corresponding timer expires, the scheduled entity 106 may resume its monitoring 1114 for PDCCH corresponding to the next XR content burst 1106B.

Referring now to FIG. 12, the process 1200 is similar to the process described above in relation to FIG. 10, up to and including block 1214. For example, it may be assumed that a scheduled entity 106 begins process 1200 in a low-power state (e.g., its sleep state). That is, for illustration purposes, the disclosure discusses exemplary process 1200 from the perspective that the scheduled entity 106 is in a low-power state already, waiting for a time to wake from its low-power state to monitor next burst of XR content.

At block 1202, a scheduled entity 106 may determine whether an FGP timer has expired. In an example, a scheduled entity 106 may initialize such a timer to zero, or any other suitable value; and the timer may count down to zero.

Once the FGP timer expires (YES at block 1202), then at block 1204, the scheduled entity 106 may wake up from a low-power state (e.g., its sleep state) to, for example, enter its wake-up state. In its wake-up state, the scheduled entity 106 may monitor for PDCCH transmissions of control information indicating DL data scheduled for the scheduled entity 106. Otherwise, the scheduled entity 106 may continue in the low-power state until the scheduled entity 106 determines that the appropriate timer has expired (NO at block 1202).

The timer may include an FGP timer, a DRX timer, or a combination of an FGP timer and a DRX timer. As described, a scheduled entity 106 may be configured to set an FGP timer to have generally a longer duration than a DRX timer. In some examples, the scheduled entity 106 may effectively combine the timers into one timer such that the scheduled entity 106 utilizes one low-power state timer to effectively determine when to wake up and discontinue (e.g., terminate) the low-power state. In an example, the scheduled entity 106 may wake up from its low-power state to then monitor for PDCCH transmissions of control information indicating DL data for the scheduled entity 106.

As described above with reference to FIG. 10, for example, a scheduled entity 106 and scheduling entity 108 may utilize one or more of the discontinuous PDCCH monitoring (DPM) techniques of this disclosure in combination with a discontinuous reception (DRX) feature. In such examples, the scheduled entity 106 may omit or replace use of an FGP timer. In an example, a scheduled entity 106 configured for DRX may wake up at a time when a DRX timer expires. Here, the scheduled entity 106 wake-up time is coordinated with the scheduling entity 108, such that the scheduled entity 106 effectively informs the scheduling entity 108 of the time when the scheduled entity 106 intends on waking up from its low-power state. Once the scheduled entity 106 wakes up from its low-power state, the scheduled entity 106 may then begin a DRX 'on-duration' timer and a DRX cycle timer. At this point, the scheduled entity 106 may monitor for PDCCH transmissions as described in block 1206.

At block 1206, the scheduled entity 106 may monitor for PDCCH transmissions of control information indicating DL data for the scheduled entity 106. In such instances, the scheduled entity 106 may provide power to one or more power amplifiers to power its transceiver 510. In an example, the scheduled entity 106 may utilize the connectivity circuitry 544 to receive via a receiver (e.g., transceiver 510) a PDCCH transmission from a scheduling entity 108.

At block 1208, when the scheduled entity 106 detects downlink (DL) control information (DCI) in a physical DL control channel (PDCCH) transmission indicating DL data is scheduled for the scheduled entity 106 (YES at block 1208), the scheduled entity 106 may then, at block 1210, receive one or more packets (e.g., transport blocks (TBs)). The one or more packets may include XR content (e.g., XR content packets representative of encoded slices of an XR video frame), and may be at least a portion of an XR content burst (e.g., XR content burst 1106A). If the scheduled entity 106 does not detect DCI, the scheduled entity 106 may continue monitoring for PDCCH transmissions (NO at block 1208).

At block 1212, as the scheduled entity 106 receives the XR content packets, the scheduled entity 106 may pass (e.g., send) the received packets to an upper layer of the scheduled entity 106, such as an application layer of the scheduled entity 106. In such examples, the upper layer may perform a video decoding process using the XR content packets to then generate the XR video frame. The upper layer of the scheduled entity 106 may reassemble and decode the XR content packets and attempt to generate a complete XR video frame. In an example, an upper layer of the scheduled entity 106 may decode a set of XR content packets received over time to determine when the scheduled entity 106 has, or is expected to have received a full XR video frame from the scheduling entity 108. The upper layer may utilize various forms of video coding to decode the transport blocks (TBs) to generate an XR video frame. In an example, the upper layer may utilize an intra-prediction coding technique and/or an inter-prediction coding technique to generate the XR video frame. In such examples, the upper layer may notify the lower layer(s) of the scheduled entity 106 when the upper layer is complete with the decoding process for decoding the XR video frame.

At block 1214, the scheduled entity 106 may determine whether the scheduled entity 106 has received the complete XR video frame. The scheduled entity 106 may use any suitable means to determine when the scheduled entity 106 has received a complete XR video frame or alternatively has received an incomplete an XR video frame. In an example, the scheduled entity 106 may determine that the scheduled entity 106 has received a set of packets representing information sufficient for the scheduled entity 106 to reproduce (e.g., display, replay, etc.) the XR video frame (YES at block 1214). In an illustrative example, the scheduled entity 106 may pass the XR content packets (e.g., the transport blocks) to its upper layer (e.g., its application layer). There, the upper layer of the scheduled entity 106 may determine whether the scheduled entity 106 has received the complete XR video frame. If so, the scheduled entity 106 may conclude that the corresponding XR content burst is complete and that transmission, to the scheduled entity 106, of the plurality of packets corresponding to the XR video frame has ended. In such examples, the last DL transmission in an XR content burst may include a subset of packets of a full set of XR content packets (e.g., at least a portion of an XR video frame). When the scheduled entity 106 decodes and reassembles the subset of packets, along with other XR content packets received in the XR content burst, the scheduled entity 106 may generate a full XR video frame.

In instances where the scheduled entity 106 has not yet received the complete XR video frame (NO at block 1214), then the process may return to block 1206. In some examples, the scheduled entity 106 may continue monitoring the physical downlink (DL) control channel (PDCCH) for further scheduling of packets corresponding to the XR video frame. In such examples, the scheduled entity 106 may remain in the 'ON' or 'awake' state, in contrast to the low-power (LP) state described herein.

In some examples, a first layer (e.g., an upper layer) of the scheduled entity 106, such as its application layer, may determine when the scheduled entity 106 has received the complete XR video frame. When the scheduled entity 106 has received the complete XR video frame (YES at block 1214), the first layer may notify a second layer (e.g., a lower layer) of the scheduled entity 106, such as its medium access control (MAC) entity layer, and/or its physical (PHY) layer) that the scheduled entity 106 has received the complete XR video frame.

At block 1216, the scheduled entity 106 transmits a request (e.g., a low-power (LP) state request) to the scheduling entity 108 to request to enter a low-power state, where the scheduled entity 106 will discontinue monitoring for PDCCH transmissions until the next expected video frame transmission. The low-power (LP) state request may be any suitable information element (IE) in an uplink (UL) transmission, including but not limited to UL control information (UCI) carried on the physical UL control channel (PUCCH) (e.g., within a control region 312 of a given slot). In some examples, the scheduled entity 106 may include a bitmap with the request indicating a multi-cell suggestion or intention of the scheduled entity 106 to implement a multi-cell low-power state according to the bitmap.

At block 1218, the scheduled entity 106 may monitor for a DL transmission of a LP state grant indicator (e.g., expected to come from a scheduling entity 108) granting the scheduled entity 106 with one or more permissions to enter the requested low-power state. In some examples, the scheduled entity 106 may expect the LP state grant indicator to come from a scheduling entity 108 during a particular time window prior to a next XR content burst 1106B.

In some instances, the scheduled entity 106 may not immediately receive or may not receive at all, a low-power (LP) state grant indicator from the scheduling entity 108 (NO at block 1218). In some instances, the scheduling entity 108 may transmit a response that does not grant the request of the scheduled entity 106. In another example, the scheduling entity 108 may transmit a response that does not grant the full request of the scheduled entity 106, but instead, grants the scheduled entity 106 with only certain permissions to enter the low-power state, such as only for a particular group of serving cells in a set of serving cells. In some examples, the scheduling entity 108 may determine to not respond to the LP state request at all during that FGP cycle or to not respond until a later point in time during that FGP cycle so as to control when and/or whether the scheduled entity 106 is permitted to enter its LP state during that FGP cycle. The scheduling entity 108 may deny/ignore the DPM/skipping request for any number of different reasons. Until such time that the scheduled entity 106 receives (e.g., detects) the low-power (LP) state grant indicator, the scheduled entity 106 may utilize its transceiver 510 to continue monitoring for DL transmissions (e.g., PDCCH transmissions).

At block 1222, the scheduled entity 106 may remain operating in a first power state (e.g., its 'awake' state, 'ON' state, etc.) while monitoring for DL transmissions (e.g., for PDCCH). The scheduled entity 106 may wait before entering its low-power state until the scheduled entity 106 receives the LP state grant indicator from the scheduling entity 108. In instances where the scheduled entity 106 ultimately receives the LP state grant indicator, the scheduled entity 106 may proceed from block 1222 to block 1220 (not explicitly shown). Otherwise, the scheduled entity 106 may continue monitoring for PDCCH. The scheduled entity 106 may discontinue monitoring for the LP state grant indicator once the end of the FGP period is reached (e.g., until a next XR content burst is expected to begin).

At block 1224 (optional), the scheduled entity 106 may, in some instances, determine whether any other applicable timer(s) (e.g., one or more discontinuous reception (DRX) timer(s), etc.) have expired. As described herein, however, a scheduled entity 106 may not be utilizing such timers in some instances. As such, the process, at the appropriate time, may proceed to block 1206 (e.g., at the beginning of a next XR content burst). When such others timers are utilized, then the scheduled entity 106 may determine to proceed to block 1220 when certain timers of this type (e.g., DRX timer(s)) have expired (YES at block 1224), or may otherwise, determine to continue monitoring PDCCH when no applicable timer is present or has yet expired (NO at block 1224), as further described below.

In some instances, the scheduled entity 106, in addition, or as an alternative to monitoring for physical downlink (DL) control channel (PDCCH) transmissions, may transmit a second LP state request to the scheduling entity 108 (e.g., as a retransmission). This may be done in instances where time permits, such as where sufficient time is expected between the arrival of various bursts of XR content. The time between XR content bursts, however, may not be long enough to transmit another LP state notification before the start of the next expected XR content burst.

In some instances, the scheduled entity 106 may transmit a low-power (LP) state notification indicating the scheduled entity 106 is no longer going to wait to receive the LP state grant indicator before entering the low-power state prior to the next XR content burst 1106B. This may be done where the scheduled entity 106 determines no DL transmissions are incoming and/or that the scheduled entity 106 is running low on power resources. That is, in some examples, the scheduled entity 106 may transmit a combination of LP state notifications and LP state requests in an attempt to maximize power savings by providing the BS with some information and/or control over the scheduled entity 106 executing on its intentions to enter its low-power state at any given time.

In instances when the scheduled entity 106 receives, from the scheduling entity 108, the low-power (LP) state grant indicator (YES at block 1218), the process may proceed to block 1220. The scheduling entity 108 may transmit the LP state grant indicator via downlink (DL) control information (DCI) carried on the DL transmission (e.g., on a PDCCH).

At block 1220, the scheduled entity 106 may enter a low-power state in accordance with the LP state grant indicator. In such examples, the scheduled entity 106 may set (e.g., reset) at least one timer (e.g., a frame generation periodicity (FGP) timer, a discontinuous reception (DRX) cycle timer, etc.) to a value corresponding to an expected arrival of a next XR video frame in a subsequent XR content burst. In an example, the scheduled entity 106 may determine a rate at which the XR content bursts are set to occur in accordance with the scheduled transmissions for a particular XR video stream. The XR video stream may correspond to a particular frame rate, for example. After setting the at least one timer, the process may return to block 1202.

In some examples, such as in a multi-cell scenario, the scheduled entity 106 may enter a low-power state for a subset of cells in a group of cells prior to the beginning of a next XR content burst. In an example, a scheduling entity 108 may indicate a bitmap for some cells becoming inactive and some staying active. A scheduling entity 108 might do so regardless of whether the scheduled entity 106 indicated a similar multi-cell bitmap in its request. That is, a scheduling entity 108 may indicate such a bitmap on its own volition or may refer to a bitmap of a scheduled entity 106 in its LP state request. Either way, the scheduling entity 108 may override the bitmap suggestion of a scheduled entity 106 or multi-cell option with its own bitmap to include in a grant. In another example, a scheduling entity 108 may modify the bitmap of a scheduled entity 106 (when one is suggested or transmitted) to produce and transmit a modified bitmap with the grant indicator 1110.

In such examples, the scheduled entity 106 may discontinue monitoring for physical downlink (DL) control channel (PDCCH) transmissions until expiration of the at least one timer (e.g., a frame generation periodicity (FGP) timer, etc.). In some examples, such as in a multi-cell indicator scenario, the scheduled entity 106 may continue monitoring for PDCCH transmissions on a set of active cells (e.g., active carriers) while discontinuing monitoring for PDCCH transmissions on inactive cells (e.g., inactive carriers) in accordance with the low-power (LP) state grant indicator.

When the scheduling entity 108 grants the scheduled entity 106 with the one or more permissions to enter its low-power state (e.g., via the low-power (LP) state grant indicator), the scheduling entity 108 may, in turn, discontinue scheduling physical downlink (DL) control channel (PDCCH) transmissions for that scheduled entity 106. The scheduling entity 108 may do so at least until the time corresponding to the next expected video frame transmission (e.g., a subsequent XR content burst 1106B). In some examples, however, the scheduling entity 108 may continue scheduling PDCCH transmissions to the scheduled entity 106 on a set of active cells while discontinuing PDCCH transmissions on inactive cells. In such instances, the scheduling entity 108 may utilize the LP state grant indicator to identify the set of active cells and the set of inactive cells. In this way, the scheduling entity 108 may grant the scheduled entity 106 a set of permissions to enter the low-power state identifying the set of inactive cells, and may effectively prohibit (e.g., disallow) the scheduled entity 106 from entering the low-power state for the set of active cells (at least for a time between XR content bursts). In such examples, the scheduling entity 108 may grant the scheduled entity 106 with one or more permissions to enter a low-power state, for example, using a low-power state for a subset of component carriers in a set of carriers.

In another example, where a scheduled entity 106 and scheduling entity 108 utilize the disclosed DPM technique(s) in combination with a discontinuous reception (DRX) feature, the scheduled entity 106 may omit such a frame generation periodicity (FGP) timer described above, for example, in connection with blocks 1202 and 1220. Rather, in this example, the scheduled entity 106 may transmit the low-power state request to the scheduling entity 108 as in block 1216, to request to enter a low-power state. Here, the scheduled entity 106 may monitor for a response including an LP state grant indicator from the scheduling entity 108.

When a response is received granting the scheduled entity 106 with the one or more permissions to enter a low-power state (YES at block 1218), the scheduled entity 106 may enter a low-power state (e.g., a sleep state) without starting an FGP timer. Instead, the scheduled entity 106 may utilize one or more ongoing DRX timer(s) to indicate a suitable wake-up time for the scheduled entity 106 to begin monitoring for PDCCH transmissions.

If, however, the scheduled entity 106 does not receive the low-power (LP) state grant indicator (NO at block 1218), the scheduled entity 106 may still enter a low-power state (e.g., a sleep state) as scheduled according to its ongoing DRX timer(s). In such instances, the scheduled entity 106 may wake up from its low-power state according to one or more ongoing DRX timer(s).

Examples of Layers in an Example Protocol Stack

Figure 13:
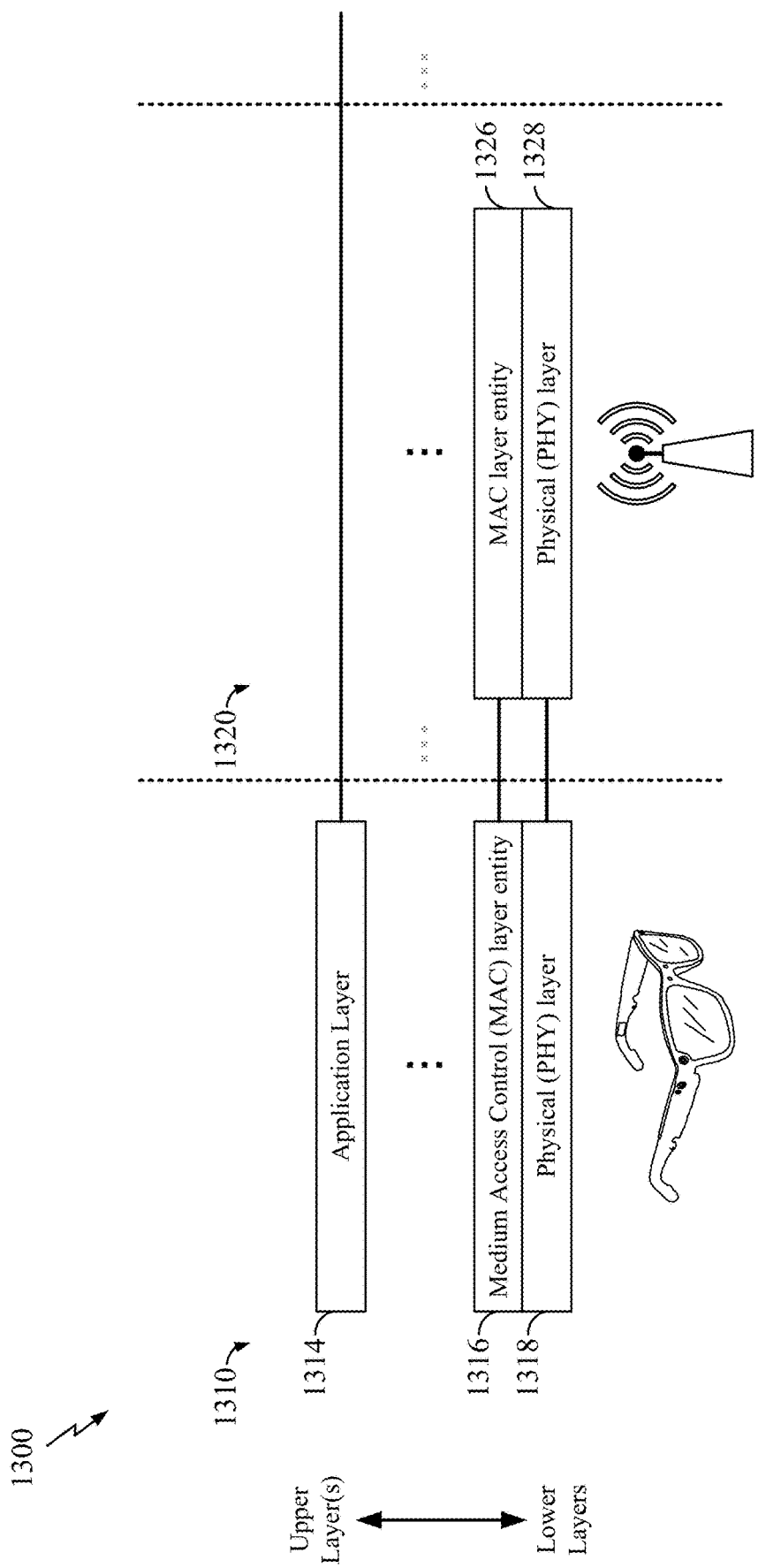
FIG. 13 is a block diagram conceptually illustrating an example protocol stack for an example scheduled entity and an example scheduling entity according to some embodiments.

FIG. 13 is a block diagram conceptually illustrating example user plane protocol stacks 1300 for an example scheduled entity 106 and an example scheduling entity 108 according to some embodiments. The protocol stacks 1300 may include a first protocol stack 1310 for a scheduled entity 106 (e.g., an extended reality (XR)-enabling device) and a second protocol stack 1320 for a scheduling entity 108 (e.g., an extended reality (XR)-enabling device). In various examples, the first protocol stack 1310 and the second protocol stack 1320 may be stacked in terms of layers, such that the protocol stacks as "lower" layers and "upper" layers as shown where the upper layers are shown as being stacked above the lower layers, for example.

In addition, the first protocol stack 1310 may have a medium access control (MAC) layer entity 1316, a physical (PHY) layer 1318, etc. as part of the lower layers of the first protocol stack 1310 for the user plane. On the scheduling entity 108 side, the second protocol stack 1320 may have a medium access control (MAC) layer entity 1326, a physical (PHY) layer 1328, etc. as part of those lower layers in a similar manner.

In some examples, each layer may perform its own dedicated function (e.g., two different decoding functions). In an example, the application layer 1314 (e.g., the upper layer as shown) of a scheduled entity 106 may perform various video coding techniques, for example, to decode encoded slices of an XR video frame (e.g., using video coding syntax elements, inter-prediction, intra-prediction, etc.). In some examples, the application layer 1314 may perform functions corresponding to those described with reference to video frame decoding/rendering circuitry 542 and/or video frame decoding/rendering software 564, etc. (described with reference to FIGS. 5 and 7). As described herein, the scheduling entity 108 utilizing the second protocol stack 1320 may, in some instances, not utilize an application layer that is able to decode video. In any case, the lower layer may also perform a form of reassembly and/or decoding of data packets (e.g., MAC layer packets) at that particular layer, for example, prior to passing along data to a next layer of the scheduled entity 106. In addition, the application layer 1314, upon receiving packets passed from a lower layer (e.g., the MAC layer entity 1316), may perform additional reassembly and decoding of those received packets to generate the XR video frame. In such instances, the decoding of packets at the different layers may produce and/or provide different outputs for a next layer to be able to utilize in dedicated ways.

A person of ordinary skill in the art will understand that the first protocol stack 1310 and second protocol stack 1320 of FIG. 13 may be utilized to execute any one or more of the various techniques of the disclosure, in addition to other techniques that effectively facilitate communication between a scheduled entity 106 (e.g., implementing the first protocol stack 1310) and a scheduling entity 108 (e.g., implementing the second protocol stack 1320).

Examples of User Equipment (UE) for Extended Reality (XR) Services

Figure 14:
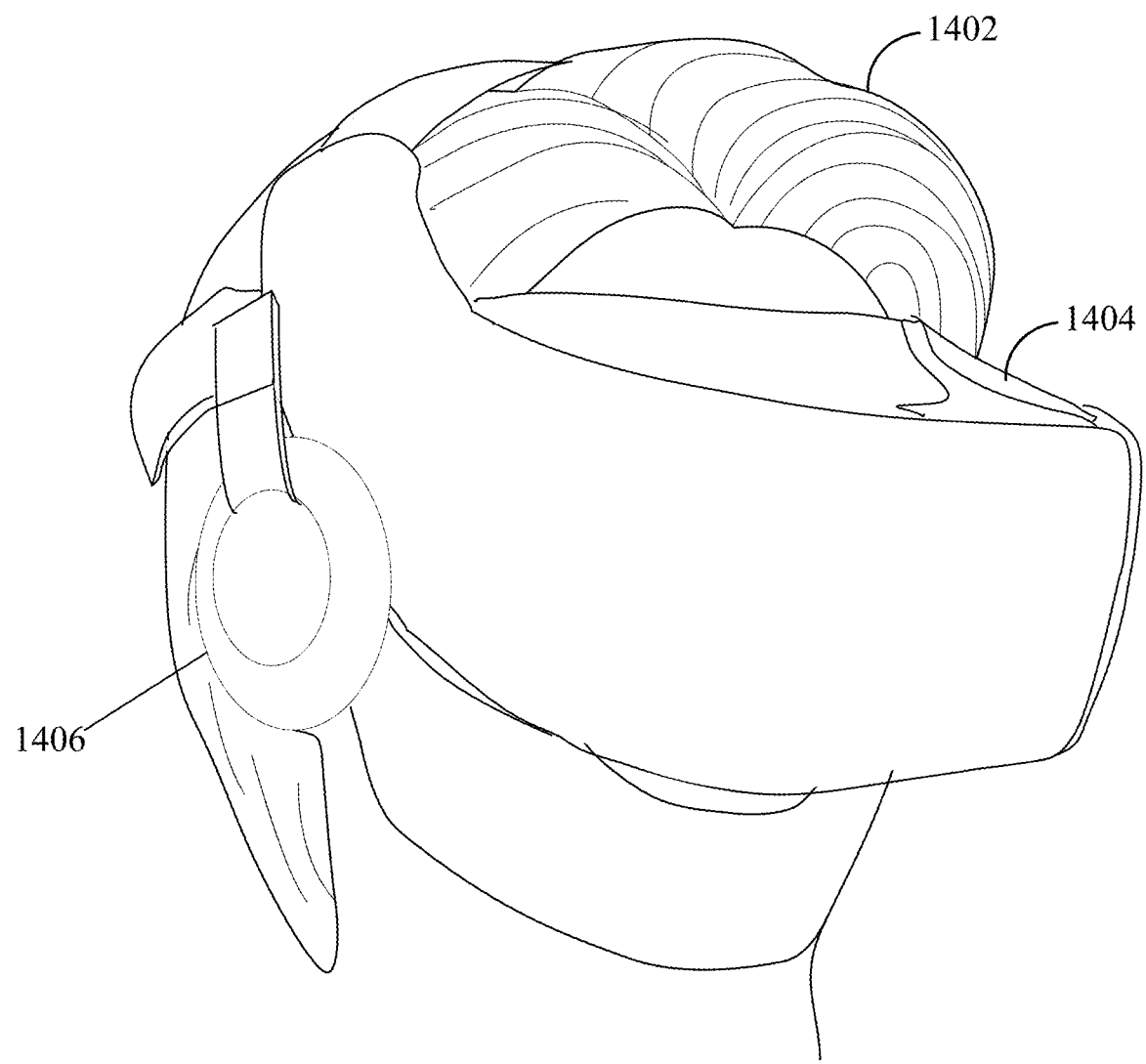
FIG. 14 is a diagram illustrating an example of a VR device worn by a user in accordance with various aspects of the techniques described in this disclosure.

As described above, the scheduled entity 106 (referred to herein as user equipment (UE) in various instances) may represent an extended reality (XR)-enabling device in which a human wearable display (which may also be referred to a "head mounted display") is mounted in front of the eyes of the user operating the XR-enabling device. FIG. 14 is a diagram illustrating an example of an XR-enabling device 1404. In the illustrative example, the XR-enabling device 1404 is depicted as a headset worn by a user 1402. While depicted as such, the techniques of this disclosure are not so limited, and a person skilled in the art will understand that XR-enabling equipment may come in different forms. In an example, the XR-enabling device 1404 may include one or more speakers (e.g., headphones worn by the user 1402, an external speaker set, one or more mountable speakers, etc.). In an example, an XR-enabling device 1404 may be coupled to, or otherwise include, a set of headphones 1406. In some examples, the XR-enabling device 1404 may utilize speaker feeds to drive the headphones 1406.

Video, audio, and other sensory data may play important roles in the XR experience. To participate in an XR experience, for example, the user 1402 may wear the XR-enabling device 1404 or other electronic device. The XR-enabling device 1404 may include tracking circuitry (e.g., the spatial tracking circuitry 540) that is configured to track head movement of the user 1402, and adapt the video stream shown via the XR-enabling device 1404 to account for the head movements, providing an immersive experience in which the user 1402 may experience an acoustical space, a displayed world, or both an acoustical space and a displayed world.

In accordance with one or more of the various techniques of the disclosure, the XR-enabling device 1404 may receive and process XR video frames to reproduce the XR video frames in a video stream. In such examples, the XR-enabling device 1404 may provide such immersive experiences for the user 1402 without disorienting the user 1402 when, for example, the user 1402 is moving their head while operating the XR-enabling device 1404 to navigate the immersive experience. In addition, the XR-enabling device 1404 may have limited memory and/or power resources, such that the XR-enabling device 1404 utilizes another device to provide the XR video frames on demand, such as in bursts of XR content transmitted to the XR-enabling device 1404. Utilizing a low-power state between XR content bursts, the XR-enabling device 1404 may effectively conserve such resources, and not only preserve, but effectively extend, the immersive experience for the user 1402. In this way, the user 1402 may utilize the XR-enabling device 1404 for longer stretches of time before the XR-enabling device 1404 may run low on memory and/or power resources.

While described in this disclosure with respect to an XR-enabling device, such as a wearable device, various aspects of the techniques may be performed in the context of other XR-enabling devices, such as a mobile or handheld device. In an example, a mobile device, or at least portions thereof, may be mounted to the head of the user 1402 or viewed as would be done when normally using the mobile device.

Figure 15:
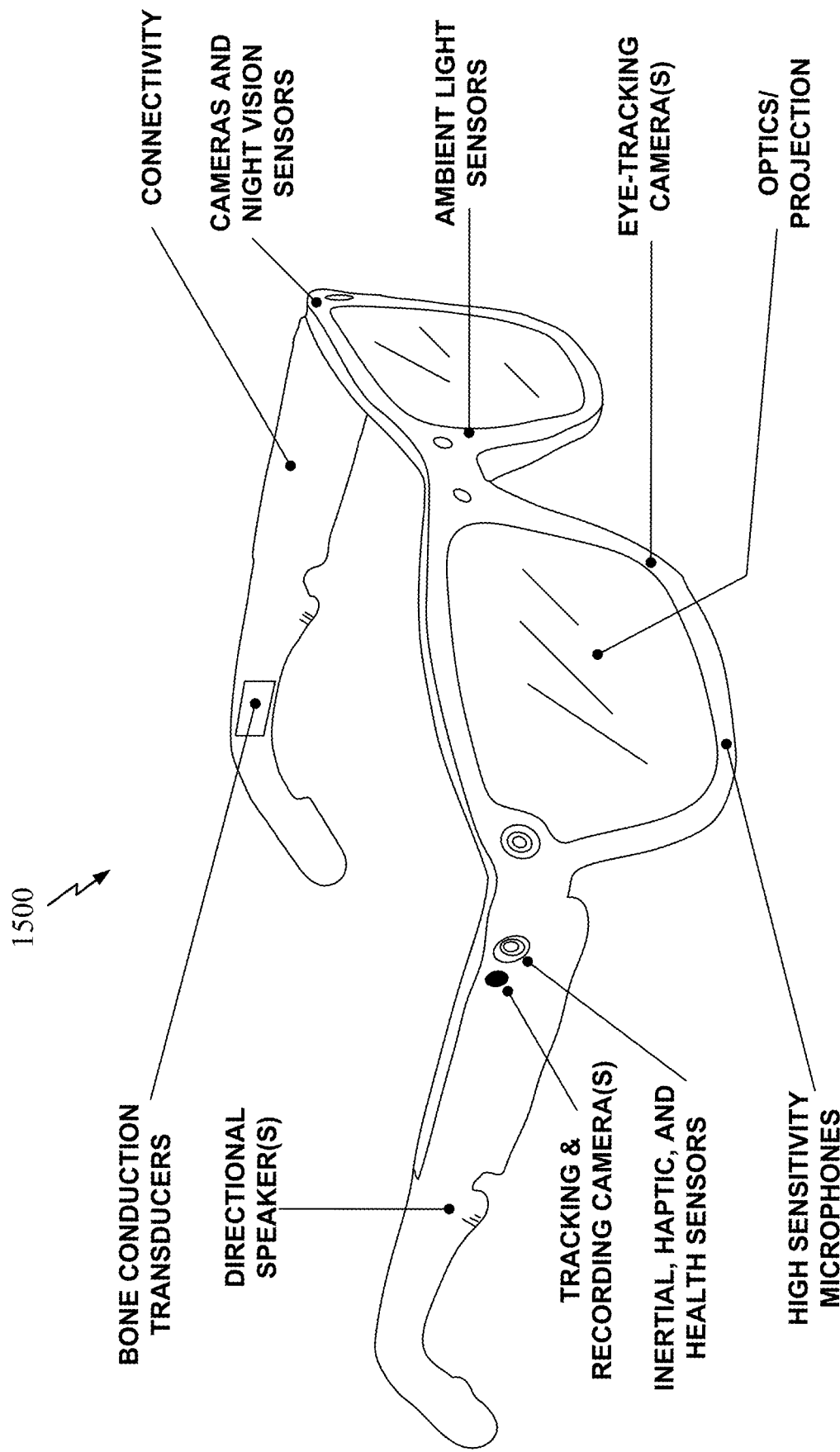
FIG. 15 is a diagram illustrating an example of an XR-enabling device that may operate in accordance with various aspect of the techniques described in this disclosure.

FIG. 15 is a diagram illustrating another example of an extended reality (XR)-enabling device 1500 that may operate in accordance with various aspect of the techniques described in this disclosure. In various examples, the XR-enabling device 1500 may represent a scheduled entity 106/500, such as the XR-enabling device 1404 described herein. That is, the XR-enabling device 1500 may represent an augmented reality (AR) headset, a mixed reality (MR) device, or any other type of XR-enabling equipment as a person of ordinary skill in the art would readily appreciate.

As shown, the XR-enabling device 1500 includes one or more directional speakers, and one or more tracking and/or recording cameras. In addition, the XR-enabling device 1500 includes one or more inertial, haptic, and/or health sensors, one or more eye-tracking cameras, one or more high sensitivity audio elements (e.g., one or more microphones), and optics/projection hardware. The optics/projection hardware of the XR-enabling device 1500 may include durable semi-transparent display technology and hardware.

The XR-enabling device 1500 also includes connectivity hardware, which may represent one or more network interfaces that support multimode connectivity, such as 4G communications, 5G communications, Bluetooth®, Wi-Fi™, etc. The XR-enabling device 1500 also includes one or more ambient light sensors, one or more cameras and night vision sensors, and one or more bone conduction transducers. In some instances, the XR-enabling device 1500 may also include one or more passive and/or active cameras with fisheye lenses and/or telephoto lenses. The XR-enabling device 1500 also may include one or more rear cameras in some implementations. It will be appreciated that the XR-enabling device 1500 may exhibit a variety of different form factors.

Furthermore, the tracking and recording cameras and other sensors may facilitate the determination of translational distance. Although not shown in the example of FIG. 15, XR-enabling device 1500 may include other types of sensors for detecting translational distance.

In some instances, a computing device (e.g., processing system 504) supporting the XR-enabling device 1500 may be integrated within the XR-enabling device 1500 and as such, the XR-enabling device 1500 may be considered as the same device as the computing device supporting the XR-enabling device 1500. In other instances, the XR-enabling device 1500 may communicate with a separate computing device that may support the XR-enabling device 1500. In this respect, the term "supporting" should not be understood to require a separate dedicated device but that one or more processors 504 configured to perform various aspects of the techniques described in this disclosure may be integrated within the XR-enabling device 1500 or integrated within a computing device separate from the XR-enabling device 1500.

In an illustrative example, when the XR-enabling device 1500 represents a VR device, a separate dedicated computing device (such as a personal computer including at least a portion of the processing system 504) may render the audio and/or visual content (e.g., video frames), while the XR-enabling device 1500 may determine the translational head movement. In such examples, the computing device may serve as a data network (e.g., an XR service provider) external to the XR-enabling device 1500 that transmits bursts of XR content to the XR-enabling device 1500. In such instances, the computing device may transmit XR video frames to the XR-enabling device 1500 with or without the assistance of a core network (CN) or access network (AN). According to one or more of the various techniques of the disclosure, the XR-enabling device 1500 may transmit a low-power state indicator to the computing device in between such bursts of XR content. The low-power state indicator may indicate to the computing device that the XR-enabling device 1500 will enter, or at least intends on entering, a low-power state until the next XR video frame. The XR-enabling device 1500 may expect the computing device to transmit the next XR video frame pursuant to a transmission schedule utilized between such devices. That transmission schedule may be set pursuant to a predetermined frame rate of the XR video stream to effectively pace the downlink (DL) transmission of the XR video frames from the computing device to the XR-enabling device 1500 so that XR-enabling device 1500 may provide the user (e.g., user 1402) with an immersive XR experience.

Although described with respect to particular examples of wearable devices, such as the XR-enabling device 1404 discussed with reference to FIG. 14, the XR-enabling device 1500 discussed with reference to FIG. 15, and other devices set forth in the examples of FIGS. 1-5, a person of ordinary skill in the art would appreciate that descriptions related to FIGS. 6-13 may apply to other examples of XR-enabling devices, as well. In an example, other wearable devices, such as a smart watch, may include sensors by which to obtain translational movements that, for example, affect the rendering of a particular portion of a video stream. As such, the techniques described in this disclosure should not be limited to a particular type of XR-enabling device. Any XR-enabling equipment (e.g., one or more XR-enabling device(s)) may be configured to perform the techniques described in this disclosure.

Further Examples Having a Variety of Features

Example 1: A method (e.g., operable at a user equipment (UE)), apparatus (e.g., a UE), system, and non-transitory computer-readable medium for receiving, while operating in a first power state, a plurality of packets corresponding to a video frame; when the plurality of packets includes information sufficient to reproduce the video frame, transmitting a low-power state indicator, the low-power state indicator indicating an intention of the UE to enter a second power state (e.g., a low-power state); and entering, in accordance with the low-power state indicator, the low-power state until a time corresponding to an expected next video frame (e.g., an expected beginning of transmission of a next video frame, an expected beginning of arrival of a next video frame, etc.).

Example 2: A method, apparatus, system, and non-transitory computer-readable medium of Example 1, wherein the low-power state indicator includes a low-power state notification, and wherein transmitting the low-power state indicator includes: transmitting the low-power state notification to notify a base station that the UE is entering the low-power state; and upon transmitting the low-power state notification, transitioning from the first power state to the low-power state for a predetermined amount of time until the time corresponding to the expected beginning of transmission of the next video frame.

Example 3: A method, apparatus, system, and non-transitory computer-readable medium of any of Examples 1 to 2, wherein the low-power state indicator includes a low-power state request, and wherein transmitting the low-power state indicator includes: transmitting the low-power state request to a base station to request permission to enter the low-power state, further including: receiving a low-power state grant indicating one or more permissions for the UE to enter the low-power state; and transitioning from the first power state to the low-power state according to the one or more permissions of the low-power state grant.

Example 4: A method, apparatus, system, and non-transitory computer-readable medium of any of Examples 1 to 3, wherein determining the plurality of packets includes the information sufficient to reproduce the video frame includes: utilizing a first layer of the UE to determine that at least a subset of the plurality of packets includes a threshold level of information sufficient to generate the video frame; passing, from the first layer of the UE to a second layer of the UE, a message from the first layer of the UE to a second layer of the UE indicating that at least the subset of packets includes the threshold level of information sufficient to generate the video frame; and determining, at the second layer of the UE, that the plurality of packets includes the information sufficient to reproduce the video frame.

Example 5: A method, apparatus, system, and non-transitory computer-readable medium of any of Examples 1 to 5, further including: transitioning from the first power state to the low-power state; identifying the time corresponding to the expected beginning of transmission of the next video frame; and setting at least one timer for a predetermined amount of time corresponding to the expected beginning of transmission of the next video frame.

Example 6: A method, apparatus, system, and non-transitory computer-readable medium of any of Examples 1 to 5, wherein receiving the plurality of packets corresponding to the video frame includes: receiving an extended reality (XR) content burst including the plurality of packets, wherein a time gap separates at least two packets of the plurality of packets in the XR content burst.

Example 7: A method, apparatus, system, and non-transitory computer-readable medium of any of Examples 1 to 6, wherein receiving the plurality of packets includes: receiving a first portion of packets of the plurality of packets corresponding to at least a first portion of the video frame; determining the first portion of packets includes less than a threshold level of information sufficient to reproduce the video frame; continuing to monitor for an indication of transmission of a second portion of packets of the plurality of packets; and receiving the second portion of packets of the plurality of packets corresponding to at least a second portion of the video frame, wherein the plurality of packets corresponding to the video frame includes the first portion of packets and the second portion of packets.

Example 8: A method, apparatus, system, and non-transitory computer-readable medium of any of Examples 1 to 6, wherein operating in the low-power state includes: discontinuing monitoring a downlink (DL) control channel for a predetermined amount of time until the time corresponding to the expected beginning of transmission of the next video frame.

Example 9: A method, apparatus, system, and non-transitory computer-readable medium for receiving, at a UE/scheduled entity, a plurality of packets corresponding to a video frame, reassembling and decoding the received packets to generate the video frame. Further, in response to determining, at an upper layer of the UE (e.g., an application layer), that the received packets comprises information sufficient to reproduce (e.g., replay) the video frame, entering a low-power state until a time corresponding to an expected beginning of transmission of a next video frame.

Example 10: A method, apparatus, system, and non-transitory computer-readable medium of Example 9, further including transmitting a low-power state notification to notify a scheduling entity (e.g., a base station) that the UE is entering the low-power state.

Example 11: A method, apparatus, system, and non-transitory computer-readable medium of any of Examples 9 to 10, further including transmitting a low-power state request to a scheduling entity (e.g., a base station) to request permission to enter the low-power state, and receiving a low-power state grant for permission to enter the low-power state.

Example 12: A method, apparatus, system, and non-transitory computer-readable medium of any of Examples 9 to 11, further including passing a message from the upper layer (e.g., the application layer) to a lower layer of the UE indicating that the received packets comprises information sufficient to reproduce (e.g., replay) the video frame.

Example 13: A method, apparatus, system, and non-transitory computer-readable medium of any of Examples 9 to 12, wherein the time corresponding to the expected beginning of transmission of a next video frame is a time later than an actual beginning of transmission of the next video frame.

Example 14: A method, apparatus, system, and non-transitory computer-readable medium of any of Examples 9 to 13, wherein at least two packets of the plurality of packets corresponding to the video frame are separated from one another by a gap of one or more slots.

Example 15: A method, apparatus, system, and non-transitory computer-readable medium of any of Examples 9 to 14, further including: in response to determining, at the upper layer (e.g., the application layer), that the received packets comprises information that is insufficient to replay the video frame, continuing to monitor a downlink control channel (e.g., a physical downlink control channel (PDCCH)) for an indication of transmission of one or more further packets corresponding to the video frame.

Example 16: A method, apparatus, system, and non-transitory computer-readable medium of any of Examples 9 to 15, wherein the low-power state includes at least discontinuing monitoring a downlink control channel (e.g., a physical downlink control channel (PDCCH)).

Example 17: A method of wireless communication operable at a user equipment (UE), the method including: receiving, while operating in a first power state, a plurality of packets corresponding to a video frame of an initial state; determining the plurality of packets satisfy a predetermined frame reproduction threshold, wherein the plurality of packets include information configured to reproduce the video frame in a reproduced state; transmitting a low-power state indicator indicating an intention of the UE to enter a second power state, different from the first power state; and providing, while operating in the second power state, the video frame in the second state.

Example 18. A method according to Example 17, wherein the low-power state indicator includes a low-power state notification, and wherein transmitting the low-power state indicator includes: transmitting the low-power state notification to notify a base station that the UE is entering the second power state; and upon transmitting the low-power state notification, transitioning from the first power state to the second power state for a predetermined amount of time until a time corresponding to the beginning of transmission of another video frame.

Example 19. A method according to any one or more of Examples 17 to 18, wherein the low-power state indicator includes a low-power state request, and wherein transmitting the low-power state indicator includes: transmitting the low-power state request to a base station to request permission to enter the second power state, wherein the method further includes: receiving a low-power state grant indicating one or more permissions for the UE to enter the second power state; and transitioning from the first power state to the second power state according to the one or more permissions of the low-power state grant.

Example 20. A method according to any one or more of Examples 17 to 19, wherein determining the plurality of packets satisfy the predetermined frame reproduction threshold includes: utilizing a first layer of the UE to determine that at least a subset of the plurality of packets includes a threshold level of video data to generate the video frame in the reproduced state; passing, from the first layer of the UE to a second layer of the UE, a message from the first layer of the UE to the second layer of the UE indicating that at least the subset of the plurality of packets (e.g., the full plurality of packets, or some portion of the full plurality of packets) includes the threshold level of video data to generate the video frame in the reproduced state; and determining that the plurality of packets satisfies the predetermined frame reproduction threshold.

Example 21. A method according to any one or more of Examples 17 to 20, further including: transitioning from the first power state to the second power state; identifying a time corresponding to a beginning of transmission of a next video frame; and setting at least one timer for a predetermined amount of time based at least in part on the time corresponding to the beginning of transmission of the next video frame.

Example 22. A method according to any one or more of Examples 17 to 21, wherein receiving the plurality of packets corresponding to the video frame of the initial state includes: receiving an extended reality (XR) content burst including the plurality of packets, wherein a time gap separates at least two packets of the plurality of packets in the XR content burst.

Example 23. A method according to any one or more of Examples 17 to 22, wherein receiving the plurality of packets includes: receiving a first subset of packets of the plurality of packets corresponding to at least a first portion of the video frame in the initial state; determining the first subset of packets includes less than a threshold level of video data to reproduce the video frame in the reproduced state; continuing to monitor for an indication of transmission of a second subset of packets of the plurality of packets; and receiving the second subset of packets of the plurality of packets corresponding to at least a second portion of the video frame in the initial state, wherein the plurality of packets corresponding to the video frame in the initial state includes the first subset of packets and the second subset of packets.

Example 24. A method according to any one or more of Examples 17 to 23, wherein operating in the second power state includes: discontinuing monitoring a control channel for a predetermined amount of time until a time corresponding to a beginning of transmission of a next video frame to the UE. The predetermined amount of time may be the difference between when the UE is set to transition to the second power state and the frame generation periodicity (FGP), which may correspond to a particular frame rate (e.g., 16.67 ms between frame intervals to achieve a 60 Hz frame rate, an average time between frame intervals to achieve a particular frame rate, and/or combinations thereof, etc.). That is, the UE may calculate, or in some instances, may be told when the next video frame can be expected to arrive at a future time interval based on a rate at which the video frames would be provided to achieve a certain quality of service.

Example 25: An apparatus for wireless communication that includes: means for receiving, while operating in a first power state, a plurality of packets corresponding to a video frame of an initial state; means for determining the plurality of packets satisfy a predetermined frame reproduction threshold, wherein the plurality of packets include video data configured to reproduce the video frame in a reproduced state; means for transmitting a low-power state indicator that indicates an intention of the apparatus to enter a second power state that utilizes less power of the UE relative to the first power state; and means for operating in the second power state while outputting the video frame in the reproduced state. In some instances, the apparatus may depower a set of power amplifiers to operate in a low-power state. In an example, the apparatus may provide a reassembled video frame for replay on a display device of the apparatus, or in some instances, to an external device for replay.

Example 26: An apparatus according to Example 25, wherein the means for transmitting the low-power state indicator include: means for notifying a base station that the apparatus is entering the second power state, wherein the apparatus further includes: means for entering the second power state.

Example 27: An apparatus according to any one or more of Examples 25 to 26, wherein the means for transmitting the low-power state indicator include: means for requesting permission from a base station to enter the second power state, wherein the apparatus further includes: means for receiving a low-power state grant indicating one or more permissions for the apparatus to enter the second power state; and means for entering the second power state according to the one or more permissions of the low-power state grant.

Example 28: An apparatus according to any one or more of Examples 25 to 27, wherein the apparatus includes a first layer (e.g., an application layer comprising video decoding and/or prediction processing) and a second layer (e.g., a lower layer comprising the MAC and PHY layers). In such examples, the apparatus may include: means for passing, from the first layer to the second layer, a message indicating that the plurality of packets satisfies the predetermined frame reproduction threshold, wherein the apparatus includes means for decoding the plurality of packets to reproduce the video frame in the reproduced state.

Example 29: An apparatus according to any one or more of Examples 25 to 28, further including: means for transitioning from the first power state to the second power state; means for identifying a first frame interval corresponding to a beginning of a next video frame; and means for setting at least one timer for a predetermined amount of time based at least in part on the first frame interval.

Example 30: An apparatus according to any one or more of Examples 25 to 29, wherein at least some packets of the plurality of packets corresponding to the video frame are separated from one another by a time gap of one or more slots.

Example 31: An apparatus according to any one or more of Examples 25 to 30, including: means for determining a first subset of packets of the plurality of packets includes less than a threshold level of video data to reproduce the video frame in the reproduced state; means for continuing to monitor a downlink control channel for an indication of transmission of one or more further packets corresponding to the video frame; means for receiving a second subset of packets of the plurality of packets; means for determining the plurality of packets, including the first subset of packets and the second subset of packets, include a threshold level of video data to satisfy the predetermined frame reproduction threshold; and means for outputting the video frame in the reproduced state to at least one of: a memory device, a video encoder, or a display device, while operating in the second power state.

Example 32: An apparatus according to any one or more of Examples 25 to 31, wherein the second power state includes discontinuing monitoring a downlink (DL) or other control channel (e.g., a physical DL control channel (PDCCH), a physical sidelink control channel (a PSCCH), a network channel established with an extended reality (XR) server network, etc.).

Example 33: A non-transitory computer-readable medium storing computer-executable code, including code for causing a user equipment (UE) to: receive, while operating in a first power state, a first plurality of packets corresponding to a video frame of a deconstructed state; decode the first plurality of packets to generate the video frame in a reproduced state; transmit a low-power state indicator that indicates an intention of the UE to enter a second power state different from the first power state; output, while operating in the second power state, the video frame in the reproduced state; and at a time corresponding to an arrival of a next video frame at the UE, wake from the second power state to receive, while operating in the first power state, a second plurality of packets corresponding to the next video frame.

Example 34: A non-transitory computer-readable medium according to Example 33, wherein the low-power state indicator includes a low-power state notification, wherein to transmit the low-power state indicator, the code, when executed, is configured to cause the UE to: transmit the low-power state notification to notify a base station that the UE is entering the second power state; and upon transmitting the low-power state notification, transition from the first power state to the second power state.

Example 35: A non-transitory computer-readable medium according to any one or more of Examples 33 to 34, wherein the low-power state indicator includes a low-power state request, wherein to transmit the low-power state indicator, the code, when executed, is configured to cause the UE to: transmit the low-power state request to a base station to request permission to enter the second power state; and receive a low-power state grant indicator permitting the UE to enter the second power state.

Example 36: A non-transitory computer-readable medium according to any one or more of Examples 33 to 35, wherein to determine the first plurality of packets includes information sufficient to reproduce the video frame, the code, when executed, is configured to cause the UE to: provide a message from a first layer of the UE to a second layer of the UE indicating that the first plurality of packets include information sufficient to satisfy a predetermined frame decoding threshold, wherein decoding the first plurality of packets provides the video frame in the reproduced state.

Example 37: A non-transitory computer-readable medium according to any one or more of Examples 33 to 36, wherein the code, when executed, is configured to cause the UE to: transition from the first power state to the second power state; identify a time interval corresponding to the arrival of the next video frame; and setting at least one timer for a predetermined amount of time corresponding to the arrival of the next video frame including the second plurality of packets.

Example 38: An apparatus for wireless communication, including: a processor; a transceiver communicatively coupled to the processor; and a memory communicatively coupled to the processor, wherein the processor and the memory are configured to: receive, while operating in a first power state, a plurality of packets corresponding to a video frame of a first state; determine the plurality of packets include a threshold amount of encoded video data that, when decoded, is configured to output the video frame in a second state different from the first state; transmit a low-power state indicator signaling an intention of the apparatus to enter a second power state, different from the first power state; and output the video frame in the second state while operating in the second power state.

Example 39: An apparatus according to Example 38, wherein the low-power state indicator includes a low-power state notification, and wherein to transmit the low-power state indicator, the processor and the memory are configured to: transmit the low-power state notification to notify a base station that the apparatus is entering the second power state; and upon transmitting the low-power state notification, transition from the first power state to the second power state.

Example 40: An apparatus according to any one or more of Examples 38 to 39, wherein the low-power state indicator includes a low-power state request, and wherein to transmit the low-power state indicator, the processor and the memory are configured to: transmit the low-power state request to a base station to request permission to enter the second power state, wherein the processor and the memory are further configured to: receive a low-power state grant indicating one or more permissions for the apparatus to enter the second power state; and transition from the first power state to the second power state according to the one or more permissions of the low-power state grant.

Example 41: An apparatus according to any one or more of Examples 38 to 40, wherein to determine the plurality of packets include the threshold amount of encoded video data, the processor and the memory are configured to: pass a message from a first layer of the apparatus to a second layer of the apparatus indicating that the plurality of packets includes the threshold amount of encoded video data to reproduce the video frame in the reproduced state.

Example 42: An apparatus according to any one or more of Examples 38 to 41, wherein the processor and the memory are further configured to: transition the apparatus from the first power state to the second power state; identify a time interval corresponding to an arrival of a next video frame; and set at least one timer based at least in part on the time interval; and transition from the second power state to the first power state at an expiration of the at least one timer.

Example 43: An apparatus according to any one or more of Examples 38 to 42, wherein the plurality of packets includes a set of transport blocks (TBs), wherein to receive the plurality of packets corresponding to the video frame of the first state, the processor and the memory are configured to: receive a first subset of TBs in a first downlink transmission; transmit a first message indicating successful receipt of the first subset of TBs; receive a second subset of TBs in a second downlink transmission; and transmit a second message indicating successful receipt of the second subset of TBs, wherein the second message further includes the low-power state indicator.

Example 44: An apparatus according to Example 43, wherein to receive the plurality of packets, the processor and the memory are configured to: receive the first subset of TBs at a first time; and receive the second subset of TBs at a second time after a time gap of approximately one or more slots has lapsed relative to the first time.

Example 45: An apparatus according to any one or more of Examples 38 to 44, wherein to receive the plurality of packets, the processor and the memory are configured to: receive a first subset of packets of the plurality of packets corresponding to at least a first portion of the video frame of the first state; determine the first subset of packets includes less than a threshold level of video data; continue to monitor for an indication of transmission of a second subset of packets of the plurality of packets; and receive the second subset of packets of the plurality of packets corresponding to at least a second portion of the video frame of the first state, and wherein to output the video frame in the second state, the processor and the memory are configured to: decode the plurality of packets, including the first subset of packets and the second subset of packets, to provide the video frame in the second state while operating in the second power state.

Example 46. An apparatus according to any one or more of Examples 38 to 45, wherein to receive the plurality of packets corresponding to the video frame of the first state (e.g., a coded state, a deconstructed state, a complete state, a reproducible state, etc.), the processor and the memory are configured to: perform an initial type of decoding for an initial receiving of the plurality of packets; transmit at least one message indicating successful decoding of the plurality of packets using the initial type of decoding; and perform video decoding of the plurality of packets to generate the video frame in the second state (e.g., a decoded state, a reproduced state, a reconstructed state, etc.).

This disclosure presents several aspects of a wireless communication network with reference to an exemplary implementation. The actual telecommunication standard, network architecture, and/or communication standard employed will depend on the specific application and the overall design constraints imposed on the system. NR is an emerging wireless communications technology under development. As those skilled in the art will readily appreciate, various aspects described throughout this disclosure may be extended to other telecommunication systems, network architectures and communication standards.

By way of example, the various aspects of this disclosure may be implemented within systems defined by, and/or described in documents from, an organization named "3rd Generation Partnership Project" (3GPP), such as Long-Term Evolution (LTE), as well as others including the Evolved Packet System (EPS), and/or the Universal Mobile Telecommunication System (UMTS), and/or the Global System for Mobile (GSM). Various aspects may also be extended to systems defined by, and/or described in documents from, an organization named the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. It should be noted that the terms "network" and "system" are often used interchangeably.

The present disclosure uses the word "exemplary" to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

The present disclosure uses the term "coupled" to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The present disclosure uses the terms "circuit" and "circuitry" broadly, to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-15 may be configured to perform one or more of the methods, features, or steps described herein. The novel algorithms described herein may also be efficiently implemented in software and/or embedded in hardware.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Applicant provides this description to enable any person skilled in the art to practice the various aspects described herein. Those skilled in the art will readily recognize various modifications to these aspects, and may apply the generic principles to other aspects. Applicant does not intend the claims to be limited to the aspects shown herein, but to be accorded the full scope consistent with the language of the claims, wherein reference to an element in the singular is not intended to mean "one and only one" unless specifically so stated, but rather "one or more." Unless specifically stated otherwise, the present disclosure uses the term "some" to refer to one or more. A phrase referring to "at least one of" a list of items refers to any combination of those items, including single members. As an example, "at least one of: a, b, or c" is intended to cover: a; b; c; a and b (a-b); a and c (a-c); b and c (b-c); and a, b and c (a-b-c), as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information, such as a reference signal), accessing (e.g., accessing data in a memory) and the like. Also, "determining" may include resolving, selecting, choosing, establishing and the like.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of the disclosed technology may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

It is to be understood that the claims are not limited to the precise configuration and components illustrated above. Various modifications, changes and variations may be made in the arrangement, operation and details of the methods and apparatus described herein without departing from the scope of the claims. The description of the disclosed technology is provided to enable those skilled in the art to practice the various aspects described herein. The claims, however, are not intended to be limited to the aspects shown herein, but are to be accorded the full scope consistent with the language of the claims. Various modifications to these aspects will be readily apparent to those skilled in the art, and the generic principles defined herein may be applied to other aspects.

What is claimed is:

1. A method of wireless communication operable at a user equipment (UE), the method comprising:
   receiving, while operating in a first power state, a first subset of packets of a plurality of packets, the first subset of packets corresponding to at least a first portion of a video frame of an initial state;
   continuing to monitor for, based on the first subset of packets comprising less than a predetermined frame reproduction threshold of video data to reproduce the video frame in a reproduced state, an indication of transmission of a second subset of packets of the plurality of packets;
   receiving the second subset of packets of the plurality of packets corresponding to at least a second portion of the video frame in the initial state, wherein the plurality of packets corresponding to the video frame in the initial state comprises the first subset of packets and the second subset of packets;
   transmitting, based on the plurality of packets satisfying the predetermined frame reproduction threshold, a low-power state indicator indicating an intention of the UE to enter a second power state, different from the first power state; and
   outputting, while operating in the second power state, the video frame in the reproduced state.

2. The method of claim 1, wherein the low-power state indicator comprises a low-power state notification, and wherein transmitting the low-power state indicator comprises:
   transmitting the low-power state notification to notify a base station that the UE is entering the second power state; and
   upon transmitting the low-power state notification, transitioning from the first power state to the second power state for a predetermined amount of time until a time corresponding to a beginning of transmission of a next video frame.

3. The method of claim 1, wherein the low-power state indicator comprises a low-power state request, and wherein transmitting the low-power state indicator comprises:
   transmitting the low-power state request to a base station to request permission to enter the second power state, wherein the method further comprises:
      receiving a low-power state grant indicating one or more permissions for the UE to enter the second power state; and
      transitioning from the first power state to the second power state according to the one or more permissions of the low-power state grant.

4. The method of claim 1, further comprising:
   determining the plurality of packets satisfy the predetermined frame reproduction threshold, wherein determining the plurality of packets satisfy the predetermined frame reproduction threshold comprises:
      utilizing a first layer of the UE to determine that at least a subset of the plurality of packets comprises a threshold level of video data to generate the video frame in the reproduced state; and
      passing, from the first layer of the UE to a second layer of the UE, a message from the first layer of the UE to the second layer of the UE indicating that at least the subset of the plurality of packets comprises the threshold level of video data to generate the video frame in the reproduced state.

5. The method of claim 1, further comprising:
   transitioning from the first power state to the second power state;
   identifying a time corresponding to a beginning of transmission of a next video frame; and
   setting at least one timer for a predetermined amount of time based at least in part on the time corresponding to the beginning of transmission of the next video frame.

6. The method of claim 1, wherein receiving the plurality of packets corresponding to the video frame of the initial state comprises:
   receiving an extended reality (XR) content burst comprising the plurality of packets, wherein a time gap separates at least two packets of the plurality of packets in the XR content burst.

7. The method of claim 1, wherein operating in the second power state comprises:
   discontinuing monitoring a downlink (DL) control channel for a predetermined amount of time until a time corresponding to a beginning of transmission of a next video frame to the UE.

8. A user equipment (UE), comprising:
   a processor;
   a transceiver; and
   a memory comprising instructions,
   wherein the processor configured to execute the instructions and cause the user equipment to:
      receive, via the transceiver while operating in a first power state, a first subset of packets of a plurality of packets, the first subset of packets corresponding to a video frame of an initial state;
      continue to monitor for, based on the first subset of packets comprising less than a predetermined frame reproduction threshold of video data to reproduce the video frame in a reproduced state, an indication of transmission of a second subset of packets of the plurality of packets based on the determination that the first subset of packets comprises less than the predetermined frame reproduction threshold of video data to reproduce the video frame in the reproduced state;
      receive, via the transceiver, the second subset of packets of the plurality of packets corresponding to at least a second portion of the video frame in the initial state, wherein the plurality of packets corresponding to the video frame in the initial state comprises the first subset of packets and the second subset of packets;
      transmit, via the transceiver and based on the plurality of packets satisfying the predetermined frame reproduction threshold, a low-power state indicator signaling an intention of the UE to enter a second power state, different from the first power state; and
      output the video frame in the reproduced state while operating in the second power state.

9. The UE of claim 8, wherein the low-power state indicator comprises a low-power state notification, and wherein to transmit the low-power state indicator, the processor is configured to cause the UE to:
  transmit, via the transceiver, the low-power state notification to notify a base station that the UE is entering the second power state; and
  upon transmitting the low-power state notification, transition from the first power state to the second power state.

10. The UE of claim 8, wherein the low-power state indicator comprises a low-power state request, and wherein to transmit the low-power state indicator, the processor is configured to cause the UE to:
  transmit, via the transceiver, the low-power state request to a base station to request permission to enter the second power state,
  wherein the processor is further configured to cause the UE to:
    receive, via the transceiver, a low-power state grant indicating one or more permissions for the UE to enter the second power state; and
    transition from the first power state to the second power state according to the one or more permissions of the low-power state grant.

11. The UE of claim 8, wherein the processor is further configured to cause the UE to:
  pass a message from a first layer of the UE to a second layer of the UE indicating that the plurality of packets comprise the predetermined frame reproduction threshold to reproduce the video frame in the reproduced state.

12. The UE of claim 8, wherein the processor is further configured to cause the UE to:
  transition the UE from the first power state to the second power state;
  identify a time interval corresponding to an arrival of a next video frame;
  set at least one timer based at least in part on the time interval; and
  transition from the second power state to the first power state at an expiration of the at least one timer.

13. The UE of claim 8, wherein the plurality of packets comprise a set of transport blocks (TBs), wherein the processor is configured to cause the UE to:
  receive, via the transceiver, a first subset of TBs in a first downlink transmission;
  transmit, via the transceiver, a first message indicating successful receipt of the first subset of TBs;
  receive, via the transceiver, a second subset of TBs in a second downlink transmission; and
  transmit, via the transceiver, a second message indicating successful receipt of the second subset of TBs, wherein the second message further includes the low-power state indicator.

14. The UE of claim 13, wherein the processor is configured to cause the UE to:
  receive, via the transceiver, the first subset of TBs at a first time; and
  receive, via the transceiver, the second subset of TBs at a second time after a time gap of approximately one or more slots has lapsed relative to the first time.

15. A method of wireless communication operable at a user equipment (UE), the method comprising:
  receiving, while operating in a first power state, a plurality of packets corresponding to a video frame of an initial state;
  determining the plurality of packets satisfy a predetermined frame reproduction threshold, wherein the plurality of packets comprise information configured to reproduce the video frame in a reproduced state, wherein determining the plurality of packets satisfy the predetermined frame reproduction threshold comprises:
    utilizing a first layer of the UE to determine that at least a subset of the plurality of packets comprises a threshold level of video data to generate the video frame in the reproduced state;
    passing, from the first layer of the UE to a second layer of the UE, a message from the first layer of the UE to the second layer of the UE indicating that at least the subset of the plurality of packets comprises the threshold level of video data to generate the video frame in the reproduced state; and
    determining that the plurality of packets satisfies the predetermined frame reproduction threshold;
  transmitting, based on determining the plurality of packets satisfy the predetermined frame reproduction threshold, a low-power state indicator indicating an intention of the UE to enter a second power state, different from the first power state; and
  outputting, while operating in the second power state, the video frame in the reproduced state.

16. The method of claim 15, wherein the low-power state indicator comprises a low-power state notification, and wherein transmitting the low-power state indicator comprises:
  transmitting the low-power state notification to notify a base station that the UE is entering the second power state; and
  upon transmitting the low-power state notification, transitioning from the first power state to the second power state for a predetermined amount of time until a time corresponding to a beginning of transmission of a next video frame.

17. The method of claim 15, wherein the low-power state indicator comprises a low-power state request, and wherein transmitting the low-power state indicator comprises:
  transmitting the low-power state request to a base station to request permission to enter the second power state, wherein the method further comprises:
    receiving a low-power state grant indicating one or more permissions for the UE to enter the second power state; and
    transitioning from the first power state to the second power state according to the one or more permissions of the low-power state grant.

18. The method of claim 15, further comprising:
  transitioning from the first power state to the second power state;
  identifying a time corresponding to a beginning of transmission of a next video frame; and
  setting at least one timer for a predetermined amount of time based at least in part on the time corresponding to the beginning of transmission of the next video frame.

19. The method of claim 15, wherein receiving the plurality of packets corresponding to the video frame of the initial state comprises:
  receiving an extended reality (XR) content burst comprising the plurality of packets, wherein a time gap separates at least two packets of the plurality of packets in the XR content burst.

20. The method of claim 15, wherein receiving the plurality of packets comprises:

receiving a first subset of packets of the plurality of packets corresponding to at least a first portion of the video frame in the initial state;

determining the first subset of packets comprises less than a threshold level of video data to reproduce the video frame in the reproduced state;

continuing to monitor for an indication of transmission of a second subset of packets of the plurality of packets; and receiving the second subset of packets of the plurality of packets corresponding to at least a second portion of the video frame in the initial state, wherein the plurality of packets corresponding to the video frame in the initial state comprises the first subset of packets and the second subset of packets.

21. The method of claim 15, wherein operating in the second power state comprises:

discontinuing monitoring a downlink (DL) control channel for a predetermined amount of time until a time corresponding to a beginning of transmission of a next video frame to the UE.

22. A user equipment (UE), comprising:

a processor;

a transceiver; and a memory comprising instructions, wherein the processor configured to execute the instructions and cause the user equipment to:

receive, via the transceiver while operating in a first power state, a plurality of packets corresponding to a video frame of an initial state;

determine the plurality of packets comprise a predetermined frame reproduction threshold of encoded video data that, when decoded, is configured to output the video frame in a reproduced state different from the initial state, wherein to determine the plurality of packets comprise the threshold amount of encoded video data, the processor is configured to cause the UE to pass a message from a first layer of the UE to a second layer of the UE indicating that the plurality of packets comprise the threshold amount of encoded video data to reproduce the video frame in the reproduced state;

transmit, via the transceiver and based on the determination that the plurality of packets satisfy the predetermined frame reproduction threshold, a low-power state indicator signaling an intention of the UE to enter a second power state, different from the first power state; and output the video frame in the reproduced state while operating in the second power state.

23. The UE of claim 22, wherein the low-power state indicator comprises a low-power state notification, and wherein to transmit the low-power state indicator, the processor is configured to cause the UE to:

transmit, via the transceiver, the low-power state notification to notify a base station that the UE is entering the second power state; and upon transmitting the low-power state notification, transition from the first power state to the second power state.

24. The UE of claim 22, wherein the low-power state indicator comprises a low-power state request, and wherein to transmit the low-power state indicator, the processor is configured to cause the UE to:

transmit, via the transceiver, the low-power state request to a base station to request permission to enter the second power state, wherein the processor is further configured to cause the UE to:

receive, via the transceiver, a low-power state grant indicating one or more permissions for the UE to enter the second power state; and transition from the first power state to the second power state according to the one or more permissions of the low-power state grant.

25. The UE of claim 22, wherein the processor is further configured to cause the UE to:

transition the UE from the first power state to the second power state;

identify a time interval corresponding to an arrival of a next video frame;

set at least one timer based at least in part on the time interval; and transition from the second power state to the first power state at an expiration of the at least one timer.

26. The UE of claim 22, wherein the plurality of packets comprise a set of transport blocks (TBs), wherein to receive the plurality of packets corresponding to the video frame of the initial state, the processor is configured to cause the UE to:

receive, via the transceiver, a first subset of TBs in a first downlink transmission;

transmit, via the transceiver, a first message indicating successful receipt of the first subset of TBs;

receive, via the transceiver, a second subset of TBs in a second downlink transmission; and transmit, via the transceiver, a second message indicating successful receipt of the second subset of TBs, wherein the second message further includes the low-power state indicator.

27. The UE of claim 26, wherein to receive the plurality of packets, the processor is configured to cause the UE to:

receive, via the transceiver, the first subset of TBs at a first time; and receive, via the transceiver, the second subset of TBs at a second time after a time gap of approximately one or more slots has lapsed relative to the first time.

28. The UE of claim 22, wherein to receive the plurality of packets, the processor is configured to cause the UE to:

receive, via the transceiver, a first subset of packets of the plurality of packets corresponding to at least a first portion of the video frame of the initial state;

determine the first subset of packets comprises less than a threshold level of video data;

continue to monitor for an indication of transmission of a second subset of packets of the plurality of packets; and receive, via the transceiver, the second subset of packets of the plurality of packets corresponding to at least a second portion of the video frame of the initial state, and wherein to output the video frame in the reproduced state, the processor and the memory are configured to:

decode the plurality of packets, including the first subset of packets and the second subset of packets, to output the video frame in the reproduced state while operating in the second power state.

29. The UE of claim 22, wherein to receive the plurality of packets corresponding to the video frame of the initial state, the processor configured to cause the UE to:

perform an initial type of decoding for an initial receiving of the plurality of packets;

transmit, via the transceiver, at least one message indicating successful decoding of the plurality of packets using the initial type of decoding; and perform video decoding of the plurality of packets to generate the video frame in the reproduced state.

* * * * *